US012764275B2

(12) United States Patent
Hendry et al.

(10) Patent No.: US 12,764,275 B2
(45) Date of Patent: Oct. 13, 2026

(54) REFERENCE PICTURE MANAGEMENT IN VIDEO CODING

(71) Applicant: Huawei Technologies Co., Ltd., Shenzhen (CN)

(72) Inventors: FNU Hendry, San Diego, CA (US); Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 29 days.

(21) Appl. No.: 19/059,834

(22) Filed: Feb. 21, 2025

(65) Prior Publication Data

US 2025/0254288 A1 Aug. 7, 2025

Related U.S. Application Data

(63) Continuation of application No. 18/521,714, filed on Nov. 28, 2023, now Pat. No. 12,268,570, which is a continuation of application No. 17/176,595, filed on Feb. 16, 2021, now Pat. No. 11,991,349, which is a continuation of application No. PCT/US2019/046934, filed on Aug. 16, 2019.

(Continued)

(51) Int. Cl.
*H04N 19/105* (2014.01)
*A61C 7/00* (2006.01)

(Continued)

(52) U.S. Cl.
CPC ........... *H04N 19/105* (2014.11); *A61C 7/002* (2013.01); *A61C 7/02* (2013.01); *A61C 7/08* (2013.01);

(Continued)

(58) Field of Classification Search
CPC ........ H04N 19/44; H04N 19/46; H04N 19/58; H04N 19/70; H04N 19/105; H04N 19/159; H04N 19/174; H04N 19/176

(Continued)

(56) References Cited

U.S. PATENT DOCUMENTS

| | | | |
|---|---|---|---|
| 9,008,176 | B2 | 4/2015 | Chen et al. |
| 9,258,559 | B2 | 2/2016 | Chen et al. |

(Continued)

FOREIGN PATENT DOCUMENTS

| | | | |
|---|---|---|---|
| CN | 103814574 | A | 5/2014 |
| CN | 103828374 | A | 5/2014 |

(Continued)

OTHER PUBLICATIONS

Ye-Kui Wang, Hendry (Huawei) et al:"On reference picture management for VVC", Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0128-v1, total 9 pages.

(Continued)

*Primary Examiner* — Albert Kir

(74) *Attorney, Agent, or Firm* — Conley Rose, P.C.

(57) ABSTRACT

A method of decoding a coded video bitstream includes obtaining a reference picture list structure for a current slice represented in the coded video bitstream, wherein the reference picture list structure contains a number of entries; obtaining a default number of active entries in a reference picture list for the current slice; constructing a reference picture list for the current slice, the reference picture list containing a number of active and inactive entries; setting the number of active entries in the reference picture list equal to the number of entries in the reference picture list structure when the default number of active entries in the reference picture list is greater than the number of entries in the reference picture list structure; and obtaining, based on at least one active entry of the reference picture list, at least one reconstructed block of the current slice.

12 Claims, 6 Drawing Sheets

Related U.S. Application Data

(60) Provisional application No. 62/719,360, filed on Aug. 17, 2018.

(51) Int. Cl.

| | |
|---|---|
| ***A61C 7/02*** | (2006.01) |
| ***A61C 7/08*** | (2006.01) |
| ***B29C 51/30*** | (2006.01) |
| ***B29C 51/46*** | (2006.01) |
| ***H04N 19/159*** | (2014.01) |
| ***H04N 19/174*** | (2014.01) |
| ***H04N 19/176*** | (2014.01) |
| ***H04N 19/44*** | (2014.01) |
| ***H04N 19/46*** | (2014.01) |
| ***H04N 19/58*** | (2014.01) |
| ***H04N 19/70*** | (2014.01) |
| ***H04N 21/44*** | (2011.01) |
| *B29L 31/00* | (2006.01) |
| *G06T 1/60* | (2006.01) |

(52) U.S. Cl.
CPC .............. *B29C 51/30* (2013.01); *B29C 51/46* (2013.01); *H04N 19/159* (2014.11); *H04N 19/174* (2014.11); *H04N 19/176* (2014.11); *H04N 19/44* (2014.11); *H04N 19/46* (2014.11); *H04N 19/58* (2014.11); *H04N 19/70* (2014.11); *H04N 21/44004* (2013.01); *B29L 2031/753* (2013.01); *G06T 1/60* (2013.01)

(58) Field of Classification Search
USPC ...................................................... 375/240.02
See application file for complete search history.

(56) References Cited

U.S. PATENT DOCUMENTS

| | | | |
|---|---|---|---|
| 9,451,284 | B2 | 9/2016 | Wang et al. |
| 9,485,503 | B2 | 11/2016 | Zhang et al. |
| 9,521,418 | B2 | 12/2016 | Chen et al. |
| 10,003,817 | B2 | 6/2018 | Sullivan et al. |
| 10,158,881 | B2 | 12/2018 | Chen et al. |
| 10,432,928 | B2 | 10/2019 | Li et al. |
| 10,743,024 | B2 | 8/2020 | Yamaoto et al. |
| 2005/0123056 | A1 | 6/2005 | Wang et al. |
| 2007/0019724 | A1 | 1/2007 | Tourapis et al. |
| 2009/0262804 | A1 | 10/2009 | Pandit et al. |
| 2011/0096835 | A1 | 4/2011 | Lim et al. |
| 2012/0056981 | A1 | 3/2012 | Tian et al. |
| 2012/0183076 | A1* | 7/2012 | Boyce ................ H04N 21/4305 375/E7.026 |
| 2012/0189053 | A1 | 7/2012 | Chen et al. |
| 2013/0057646 | A1 | 3/2013 | Chen et al. |
| 2013/0077677 | A1 | 3/2013 | Wang et al. |
| 2013/0077685 | A1 | 3/2013 | Chen et al. |
| 2013/0077687 | A1 | 3/2013 | Wang et al. |
| 2013/0089134 | A1 | 4/2013 | Wang et al. |
| 2013/0107953 | A1 | 5/2013 | Chen et al. |
| 2013/0107958 | A1 | 5/2013 | Shimada et al. |
| 2013/0114710 | A1 | 5/2013 | Park et al. |
| 2013/0114741 | A1 | 5/2013 | Sullivan et al. |
| 2013/0114742 | A1* | 5/2013 | Hannuksela ........... H04N 19/58 375/240.25 |
| 2013/0155184 | A1 | 6/2013 | Chen et al. |
| 2013/0202034 | A1 | 8/2013 | Yu et al. |
| 2013/0202035 | A1 | 8/2013 | Chen et al. |
| 2013/0208792 | A1 | 8/2013 | He et al. |
| 2013/0215975 | A1 | 8/2013 | Samuelsson et al. |
| 2013/0279589 | A1 | 10/2013 | Gu et al. |
| 2013/0322531 | A1 | 12/2013 | Chen et al. |
| 2013/0329787 | A1 | 12/2013 | Ramasubramonian et al. |
| 2014/0010291 | A1 | 1/2014 | He et al. |
| 2014/0016699 | A1 | 1/2014 | Chen et al. |
| 2014/0049604 | A1 | 2/2014 | Chen et al. |
| 2014/0050270 | A1 | 2/2014 | Lim et al. |
| 2014/0086324 | A1 | 3/2014 | Ramasubramonian et al. |
| 2014/0198857 | A1 | 7/2014 | Deshpande |
| 2014/0286416 | A1 | 9/2014 | Jeon et al. |
| 2014/0301453 | A1 | 10/2014 | Deshpande |
| 2015/0016505 | A1 | 1/2015 | Sjoberg et al. |
| 2015/0023422 | A1 | 1/2015 | Zhang et al. |
| 2015/0071351 | A1 | 3/2015 | Lee et al. |
| 2015/0092839 | A1 | 4/2015 | Chien et al. |
| 2015/0103881 | A1 | 4/2015 | Hendry et al. |
| 2015/0103912 | A1 | 4/2015 | Lee et al. |
| 2015/0124877 | A1 | 5/2015 | Choi et al. |
| 2015/0172655 | A1 | 6/2015 | Hendry et al. |
| 2015/0195506 | A1 | 7/2015 | Lin et al. |
| 2015/0271487 | A1 | 9/2015 | Li et al. |
| 2015/0312591 | A1 | 10/2015 | Takahashi et al. |
| 2015/0326866 | A1 | 11/2015 | Ikai et al. |
| 2015/0373315 | A1 | 12/2015 | Chen et al. |
| 2015/0373361 | A1 | 12/2015 | Wang et al. |
| 2016/0057420 | A1 | 2/2016 | Pang et al. |
| 2016/0100189 | A1 | 4/2016 | Pang et al. |
| 2016/0241850 | A1 | 8/2016 | Deshpande |
| 2016/0353117 | A1 | 12/2016 | Seregin et al. |
| 2017/0094270 | A1 | 3/2017 | Zhao et al. |
| 2017/0150159 | A1 | 5/2017 | Lee et al. |
| 2017/0214938 | A1 | 7/2017 | Zhang et al. |
| 2018/0160122 | A1 | 6/2018 | Xu et al. |
| 2018/0270504 | A1 | 9/2018 | Park et al. |
| 2019/0012839 | A1 | 1/2019 | Wang |
| 2019/0230376 | A1 | 7/2019 | Hu et al. |
| 2019/0238849 | A1 | 8/2019 | Fang et al. |
| 2020/0296392 | A1 | 9/2020 | Choi et al. |
| 2021/0092448 | A1 | 3/2021 | Choi et al. |
| 2021/0168359 | A1 | 6/2021 | Wang et al. |
| 2021/0195236 | A1 | 6/2021 | Hendry et al. |
| 2021/0203923 | A1 | 7/2021 | Sjoberg et al. |
| 2021/0266600 | A1 | 8/2021 | Seregin et al. |
| 2021/0360290 | A1 | 11/2021 | Seregin et al. |
| 2021/0368163 | A1 | 11/2021 | Chen et al. |
| 2021/0385436 | A1 | 12/2021 | Hsiang et al. |
| 2021/0409691 | A1 | 12/2021 | Hendry et al. |
| 2022/0038685 | A1 | 2/2022 | Deshpande |
| 2022/0060712 | A1 | 2/2022 | Zhang et al. |
| 2022/0394243 | A1 | 12/2022 | Deng et al. |
| 2022/0394301 | A1 | 12/2022 | Deshpande et al. |
| 2023/0008778 | A1 | 1/2023 | Wang et al. |
| 2023/0048070 | A1 | 2/2023 | Deshpande |
| 2023/0084006 | A1 | 3/2023 | Wang et al. |
| 2023/0111484 | A1 | 4/2023 | Wang et al. |
| 2023/0120726 | A1 | 4/2023 | Deng et al. |

FOREIGN PATENT DOCUMENTS

| | | | |
|---|---|---|---|
| CN | 103959793 | A | 7/2014 |
| CN | 104662920 | A | 5/2015 |
| CN | 105122816 | A | 12/2015 |
| CN | 106664426 | A | 5/2017 |
| CN | 112585974 | A | 3/2021 |
| GB | 2548739 | A | 9/2019 |
| JP | 2016533077 | A | 10/2016 |
| RU | 2571410 | C2 | 12/2015 |
| WO | 2013043886 | A2 | 3/2013 |
| WO | 2013043887 | A1 | 3/2013 |
| WO | 2013111605 | A1 | 8/2013 |
| WO | 2014004201 | A1 | 1/2014 |
| WO | 2014006854 | A1 | 1/2014 |
| WO | 2014049066 | A1 | 4/2014 |
| WO | 2014097913 | A1 | 6/2014 |

OTHER PUBLICATIONS

"High efficiency video coding; 1-14 H.265," Series H: Audiovisual and Multimedia Systems, Infrastructure of audiovisual services—Coding of moving video, Dec. 22, 2016, pp. 1-664, XP044243418.

Bross, B., et al., "WD4: Working Draft 4 of High-Efficiency Video Coding", JCTVC-F803 d5, Joint Collaborative Team on Video

(56) References Cited

OTHER PUBLICATIONS

Coding (JCT-VC) of ITU-T SG16 WP3 and ISO/IEC JTC1/SC29/WG116th Meeting: Torino, IT, Jul. 14-22, 2011, 225 pages.
Deshpande, S., "On Reference Pictures Signaling and Management for VVC," Joint Video Experts Team (JVET) of ITU-T SG16 WP3 and ISO/IEC JTC1/SC29/WG11, Document: JVET-10450-v2, 12th Meeting: Macao, CN, Oct. 3-12, 2018, 7 pages.
Deshpande, S., et al., "AHG21: Reference Picture Set Signaling Method," Joint Collaborative Team on Video Coding (JCT-VC) of ITU-T SG16 WP3 and ISO/IEC JTC1/SC29/WG11, Document: JCTVC-H0433, WG11 No. m23309, 8th Meeting: San Jose, CA, USA, Feb. 1-10, 2012, 8 pages.
Document: JVET-K0325-v2, "On High Level Syntax Starting Point," Joint Collaborative Team on Video Coding (JCT-VC) of ITU-T SG16 WP3 and ISO/IEC JTC1/SC29/WG11 11th Meeting: Ljubljana, SI, Jul. 10-18, 2018, 6 pages.
Document: JVET-K1001-v1, "Versatile Video Coding (Draft 21)," Joint Video Experts Team (JVET) of ITU-T SG 16 WP 3 and ISO/IEC JTC 1/SC 29/WG 11, 11th Meeting: Ljubljana, SI, Jul. 10-18, 2018, 43 pages.
Hannuksela et al.,"AHG21: On reference picture list construction and reference picture marking," Joint Collaborative Team on Video Coding (JCT-VC) of ITU-T SG16 WP3 and ISO/IEC JTC1/ SC29/WG11, JCTVC-G643r1, 7th Meeting: Geneva, CH, Nov. 21-30, 2011, 17 pages.
Hannuksela, M., et al., "AHG21: On reference picture list construction and reference picture marking," JCTVC-G643, 7th Meeting: Geneva, CH, Nov. 21-30, 2011, JCTVC-G643, 10 pages.
ITU-T H.261, "Line Transmission of Non-Telephone Signals, Video Codec for Audiovisual Services at p x 64 kbits," Mar. 1993, 29 pages.
ITU-T H.262, "Transmission of Non-Telephone Signals, Information Technology—Generic Coding of Moving Pictures and Associated Audio Information: Video," Feb. 2000, 220 pages.
ITU-T H.263, "Series H: Audiovisual and Multimedia Systems, Infrastructure of audiovisual services—Coding of moving video, Video coding for low bit rate communication," Feb. 1998, 167 pages.
ITU-T H.265, "Series H: Audiovisual and Multimedia Systems Infrastructure of audiovisual services—Coding of moving video High Efficiency Video Coding," Recommendation Dec. 2016, 664 pages.
ITU-T H.265, "Series H: Audiovisual and Multimedia Systems, Infrastructure of audiovisual services—Coding of moving video, High Efficiency Video Coding," Apr. 2013, 317 pages.
Wahadaniah, V. et al., "AHG21: Construction and modification of predefined reference picture sets and reference picture lists," JCTVC-G548, Joint Collaborative Team on Video Coding (JCT-VC) of ITU-T SG16 WP3 and ISO/IEC JTC1/SC29/WG11, 7th Meeting: Geneva, CH, Nov. 21-30, 2011, XP030230812, 21 pages.
Sjoberg, "Overview of HEVC High-Level Syntax and Reference Picture Management," IEEE Transactions on Circuits and Systems for Video Technology, XP011487804, vol. 22, No. 12, Dec. 2012, pp. 1858-1870.
Wang, Y., et al., "On reference picture management for VVC," Joint Video Experts Team (JVET) of ITU-T SG 16 WP 3 and ISO/IEC JTC 1/SC 29/WG 11, JVET-M0128-v1, 13th Meeting: Marrakech, MA, Jan. 9-18, 2019, 9 pages.
Wang, Y., et al, "On reference picture management for VVC," Joint Video Experts Team (JVET) of ITU-T SG 16 WP 3 and ISO/IEC JTC 1/SC 29/WG 11, Document: JVET-L0112-v4, 12th Meeting: Macao, CN, Oct. 3-12, 2018, 13 pages.
Wang, Y., et al., "On reference picture management for VVC," Joint Video Experts Team (JVET) of ITU-T SG 16 WP 3 and ISO/IECJTC 1/SC 29/WG11, JVET-L0112-v1, 12th Meeting: Macao, CN, Oct. 3-12, 2018, 11 pages.
Wang, Y.K., et al., "On reference picture management for VVC," Joint Video Experts Team (JVET) of ITU-T SG 16 WP 3 and ISO/IEC JTC 1/SC 29/WG 11, Document: JVET-L0112-v2, 12th Meeting: Macao, CN, Oct. 3-12, 2018, 13 pages.
Document: JCTVC-U1005_v2_defects, Gerhard Tech, et al., "JCT-3V AHG Report: 3D-HEVC Draft and MV-HEVC / 3D-HEVC Test Model editing (AGH2) Defect report," Joint Collaborative Team on 3D Video Coding Extension of ITU-T SG 16 WP 3 and ISO/IEC JTC 1/SC 29/WG 11, 14th Meeting: San Diego, US, Feb. 22-26, 2016, 13 pages.
Sakae Okubo ( et al.), Supervising Editor, "H.265/HEVC Textbook," 1st Ed., Impress Japan Co., Ltd., Oct. 21, 2013, pp. 130-135, 208-214.
Miska M. Hannuksela et al.:"AHG21: On reference picture list construction and reference picture marking", Joint Collaborative Team on Video Coding (JCT-VC) of ITU-T SG16 WP3 and ISO/IEC JTC1/SC29/WG11, JCTVC-G643-v3,Nov. 24, 2011, total 19 pages.

* cited by examiner

REFERENCE PICTURE MANAGEMENT IN VIDEO CODING

CROSS-REFERENCE TO RELATED APPLICATIONS

This application is a continuation of U.S. patent application Ser. No. 18/521,714 filed on Nov. 28, 2023, which is a continuation of U.S. patent application Ser. No. 17/176,595 filed on Feb. 16, 2021, now U.S. Pat. No. 11,991,349, which is a continuation of International Application No. PCT/US2019/046934 filed on Aug. 16, 2019, which claims the benefit of U.S. Provisional Patent Application No. 62/719,360, filed on Aug. 17, 2018, each of which is hereby incorporated by reference.

TECHNICAL FIELD

The present disclosure is generally related to techniques for reference picture management in video coding. More specifically, this disclosure describes techniques for construction of reference picture lists and reference picture marking.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding a coded video bitstream. The method comprises obtaining a reference picture list structure for a current slice represented in the coded video bitstream, wherein the reference picture list structure contains a number of entries; obtaining a default number of active entries in a reference picture list for the current slice; constructing a reference picture list for the current slice, wherein the reference picture list contains a number of active entries and a number of inactive entries; setting the number of active entries in the reference picture list equal to the number of entries in the reference picture list structure when the default number of active entries in the reference picture list is greater than the number of entries in the reference picture list structure; and obtaining, based on at least one active entry of the reference picture list, at least one reconstructed block of the current slice.

The method provides techniques that simplify and make more efficient the signaling of reference picture lists. Therefore, the overall coding process is improved.

In a first implementation form of the method according to the first aspect as such, an order of entries in the reference picture list structure is the same as an order of corresponding reference pictures in the reference picture list.

In a second implementation form of the method according to the first aspect as such or any preceding implementation form of the first aspect, the order is from zero to an indicated value.

In a third implementation form of the method according to the first aspect as such or any preceding implementation form of the first aspect, the indicated value is from zero to a value indicated by sps_max_dec_pic_buffering_minus1.

In a fourth implementation form of the method according to the first aspect as such or any preceding implementation form of the first aspect, the reference picture list is designated RefPictList[0].

In a fifth implementation form of the method according to the first aspect as such or any preceding implementation form of the first aspect, the reference picture list is designated RefPictList[1].

In a sixth implementation form of the method according to the first aspect as such or any preceding implementation form of the first aspect, the at least one reconstructed block is used to generate an image displayed on a display of an electronic device.

In a seventh implementation form of the method according to the first aspect as such or any preceding implementation form of the first aspect, the reference picture list comprises a list of reference pictures used for inter prediction.

In an eighth implementation form of the method according to the first aspect as such or any preceding implementation form of the first aspect, the inter prediction is for a P slice or for a B slice.

In a ninth implementation form of the method according to the first aspect as such or any preceding implementation form of the first aspect, the slice header contains a reference picture list sequence parameter set (SPS) flag designated ref_pic_list_sps_flag[i].

In a tenth implementation form of the method according to the first aspect as such or any preceding implementation form of the first aspect, the slice header contains a number reference index active override flag designated by num_ref_idx_active_override_flag.

In an eleventh implementation form of the method according to the first aspect as such or any preceding implementation form of the first aspect, the reference picture list is designated RefPictList[0] or RefPictList[1], and an order of entries in the reference picture list structure is the same as an order of corresponding reference pictures in the reference picture list.

A second aspect relates to a decoding device that includes a receiver configured to receive a coded video bitstream; a memory coupled to the receiver, the memory storing instructions; and a processor coupled to the memory, the processor configured to execute the instructions stored in the memory to cause the processor to: obtain a reference picture list structure for a current slice represented in the coded video bitstream, wherein the reference picture list structure contains a number of entries; obtain a default number of active entries in a reference picture list for the current slice; construct a reference picture list for the current slice, wherein the reference picture list contains a number of active entries and a number of inactive entries; set the number of active entries in the reference picture list equal to the number of entries in the reference picture list structure when the default number of active entries in the reference picture list is greater than the number of entries in the reference picture list structure; and obtain, based on at least one active entry of the reference picture list, at least one reconstructed block of the current slice.

The decoding device provides techniques that simplify and make more efficient the signaling of reference picture lists. Therefore, the overall coding process is improved.

In a first implementation form of the decoding device according to the second aspect as such, the decoding device further includes a display configured to display an image based on the at least one reconstructed block.

A third aspect relates to a coding apparatus that includes a receiver configured to receive a bitstream to decode; a transmitter coupled to the receiver, the transmitter configured to transmit a decoded image to a display; a memory coupled to at least one of the receiver or the transmitter, the memory configured to store instructions; and a processor coupled to the memory, the processor configured to execute the instructions stored in the memory to perform the method in any of the preceding aspects or implementations.

A fourth aspect relates to a system that includes an encoder and a decoder in communication with the encoder. The encoder or the decoder includes the decoding device or the coding apparatus of any of the preceding aspects or implementations.

The system provides techniques that simplify and make more efficient the signaling of reference picture lists. Therefore, the overall coding process is improved.

A fifth aspect relates to a means for coding that includes receiving means configured to receive a picture to encode or to receive a bitstream to decode, transmission means coupled to the receiving means, the transmission means configured to transmit the bitstream to a decoder or to transmit a decoded image to a display means, storage means coupled to at least one of the receiving means or the transmission means, the storage means configured to store instructions, and processing means coupled to the storage means, the processing means configured to execute the instructions stored in the storage means to perform the methods in any of the preceding aspects or implementations.

The means for coding provides techniques that simplify and make more efficient the signaling of reference picture lists. Therefore, the overall coding process is improved.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
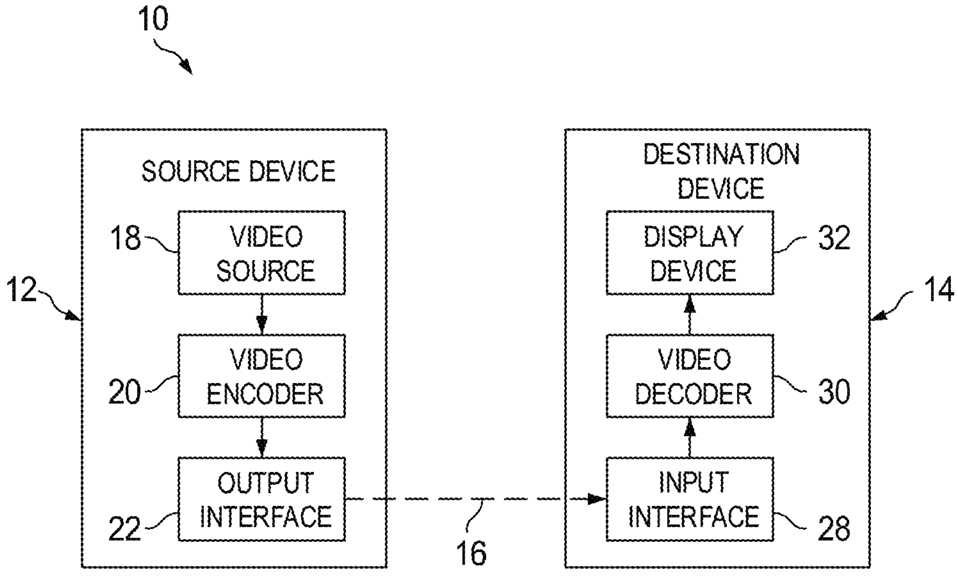
FIG. 1 is a block diagram illustrating an example coding system that may utilize bi-lateral prediction techniques.

FIG. 1 is a block diagram illustrating an example coding system 10 that may utilize video coding techniques as described herein. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called “smart” phones, so-called “smart” pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD) s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of the source device 12 and/or the video decoder 30 of the destination device 14 may be configured to apply the techniques for video coding. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for video coding may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Moving Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
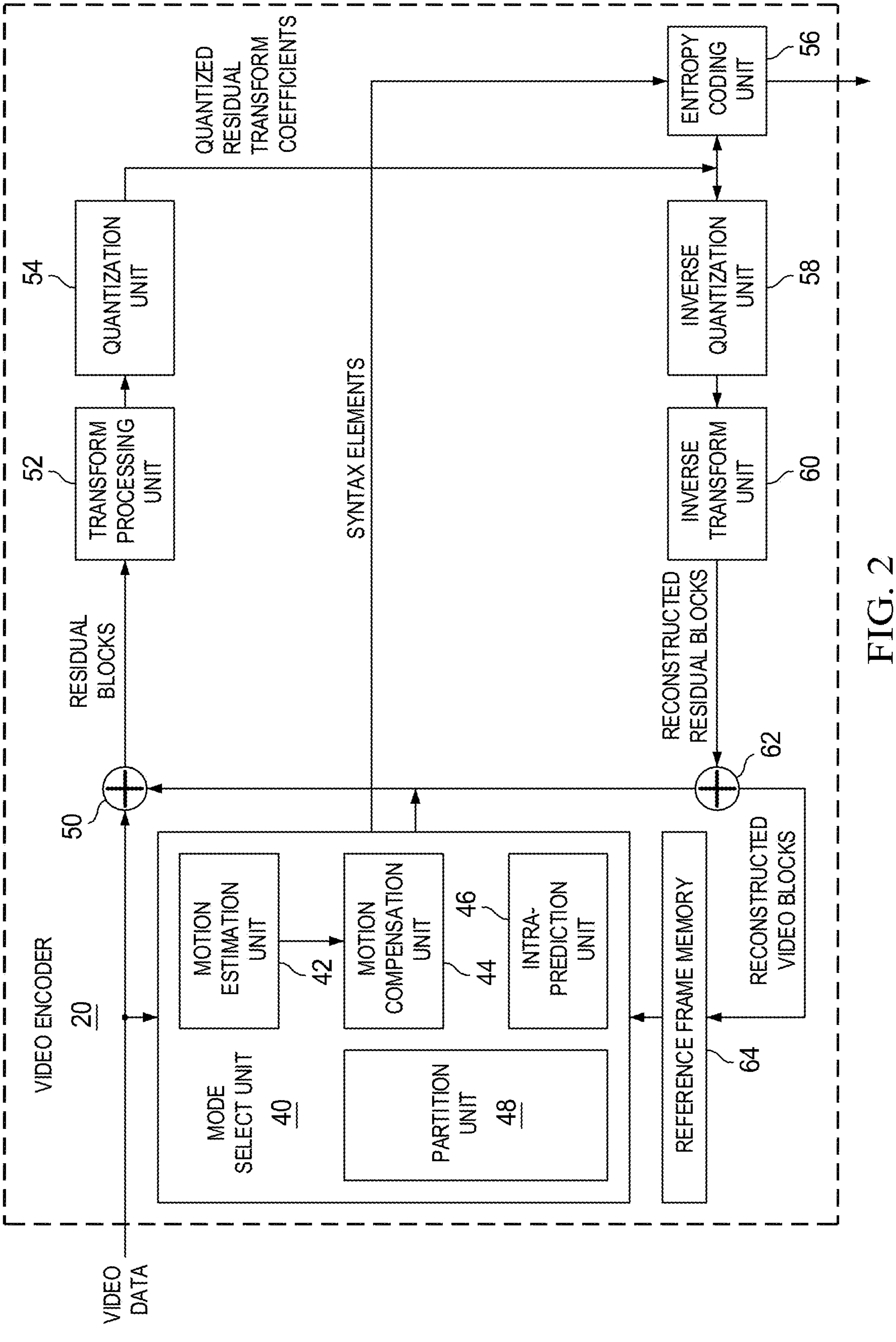
FIG. 2 is a block diagram illustrating an example video encoder that may implement bi-lateral prediction techniques.

FIG. 2 is a block diagram illustrating an example of video encoder 20 that may implement video coding techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional (a.k.a., uni prediction) prediction (P mode) or bi-prediction (a.k.a., bi prediction) (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction (a.k.a., intra prediction) unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs).

The present disclosure uses the term “block” to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction (a.k.a., inter prediction) mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
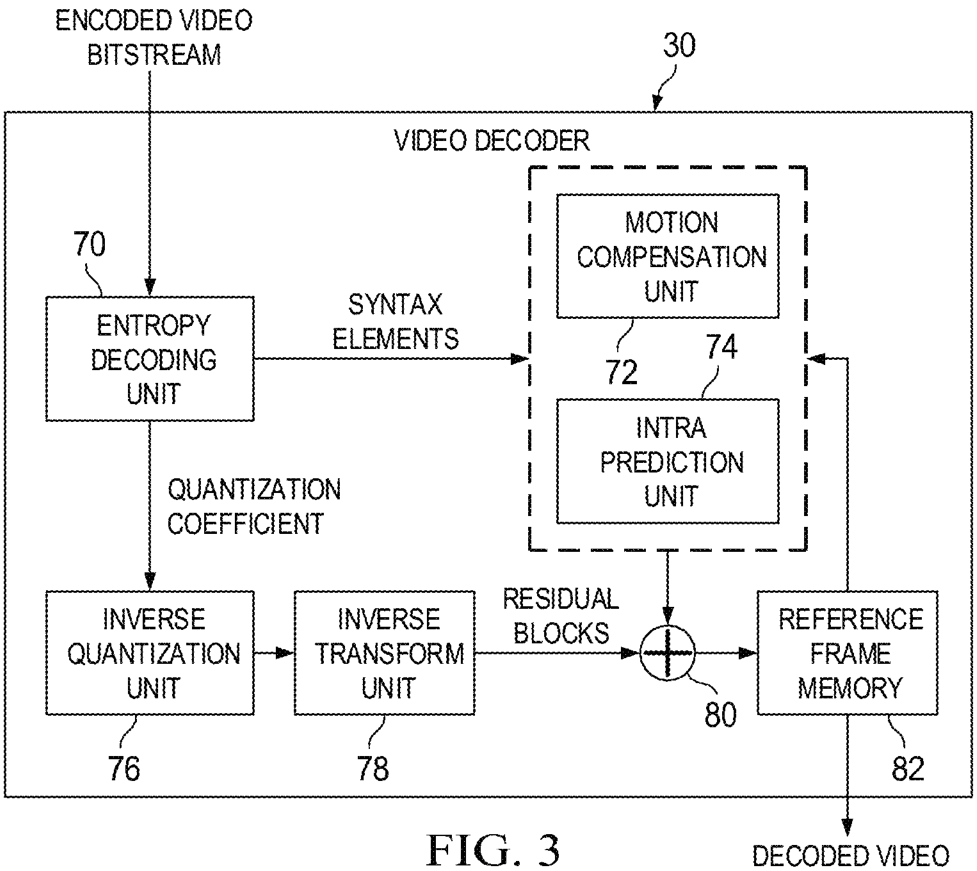
FIG. 3 is a block diagram illustrating an example of a video decoder that may implement bi-lateral prediction techniques.

FIG. 3 is a block diagram illustrating an example of video decoder 30 that may implement video coding techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of the video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

Image and video compression has experienced rapid growth, leading to various coding standards. Such video coding standards include ITU-T H.261, ISO/IEC Motion Picture Experts Group (MPEG)-1 Part 2, ITU-T H.262 or International Organization for Standardization (ISO)/International Electrotechnical Commission (IEC) MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

Versatile Video Coding (VVC) is a new video coding standard under development by the joint video experts team (JVET) of ITU-T and ISO/IEC. At the time of writing, the latest Working Draft (WD) of VVC is included in JVET-K1001-v1. The JVET document JVET-K0325-v3 includes an update to the high-level syntax of VVC.

In general, the present disclosure describes techniques based on the under-development of the VVC standard. However, the techniques also apply to other video/media codec specifications.

Video compression techniques perform spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

In a video codec specification, pictures are identified for multiple purposes, including for use as a reference picture in inter-prediction, for output of pictures from the decoded picture buffer (DPB), for scaling of motion vectors, for weighted prediction, etc. In AVC and HEVC, pictures can be identified by picture order count (POC). In AVC and HEVC, pictures in the DPB can be marked as "used for short-term reference," "used for long-term reference," or "unused for reference." Once a picture has been marked "unused for reference," the picture can no longer be used for prediction. When the picture is no longer needed for output, the picture can be removed from the DPB.

In AVC, there are two types of reference pictures, short-term and long-term. A reference picture may be marked as "unused for reference" when it becomes no longer needed for prediction reference. The conversion among these three statuses (short-term, long-term, and unused for reference) is controlled by the decoded reference picture marking process. There are two alternative decoded reference picture marking mechanisms, the implicit sliding window process and the explicit memory management control operation (MCMO) process. The sliding window process marks a short-term reference picture as "unused for reference" when the number of reference frames is equal to a given maximum number (max_num_ref_frames in the sequence parameter set (SPS)). The short-term reference pictures are stored in a first-in, first-out manner so that the most recently decoded short-term pictures are kept in the DPB.

The explicit MMCO process may include multiple MMCO commands. An MMCO command may mark one or more short-term or long-term reference pictures as "unused for reference," may mark all the pictures as "unused for reference," or may mark the current reference picture or an existing short-term reference picture as long-term and then assign a long-term picture index to that long-term reference picture.

In AVC, the reference picture marking operations as well as the processes for output and removal of pictures from the DPB are performed after a picture has been decoded.

HEVC introduces a different approach for reference picture management, referred to as reference picture set (RPS). The most fundamental difference with the RPS concept compared to the MMCO/sliding window process of AVC is that for each particular slice a complete set of the reference pictures used by the current picture or any subsequent picture is provided. Thus, a complete set of all pictures that must be kept in the DPB for use by the current or future picture is signaled. This is different from the AVC scheme where only relative changes to the DPB are signaled. With the RPS concept, no information from earlier pictures in decoding order is needed to maintain the correct status of reference pictures in the DPB.

The order of picture decoding and DPB operations in HEVC is changed compared to AVC in order to exploit the advantages of RPS and improve error resilience. In AVC, picture marking and buffer operations (both output and removal of decoded pictures from the DPB) are generally applied after a current picture has been decoded. In HEVC, the RPS is first decoded from a slice header of the current picture, then picture marking and buffer operations are generally applied before decoding the current picture.

Each slice header in HEVC must include parameters for signaling of the RPS for the picture containing the slices. The only exception is that no RPS is signaled for Instantaneous Decoding Refresh (IDR) slices. Instead, the RPS is inferred to be empty. For I slices that do not belong to an IDR picture, an RPS may be provided, even if they belong to an I picture since there may be pictures following the I picture in decoding order which use inter-prediction from pictures that preceded the I picture in decoding order. The number of pictures in an RPS shall not exceed the DPB size limit as specified by the sps_max_dec_pic_buffering syntax element in the SPS.

Each picture is associated with a POC value that represents the output order. The slice headers contain a fixed-length codeword, pic_order_cnt_lsb, representing the least significant bits (LSB) of the full POC value, also known as the POC LSB. The length of the codeword is signaled in the SPS and can be, for example, between 4 and 16 bits. The RPS concept uses POC to identify reference pictures. Besides its own POC value, each slice header directly contains or inherits from the SPS a coded representation of the POC values (or the LSBs) of each picture in the RPS.

The RPS for each picture consists of five different lists of reference pictures, also referred to the five RPS subsets. RefPicSetStCurrBefore consists of all short-term reference pictures that are prior to the current picture in both decoding order and output order, and that may be used in inter prediction of the current picture. RefPicSetStCurrAfter consists of all short-term reference pictures that are prior to the current picture in decoding order, that succeed the current picture in output order, and that may be used in inter prediction of the current picture. RefPicSetStFoll consists of all short-term reference pictures that may be used in inter prediction of one or more of the pictures following the current picture in decoding order, and that are not used in inter prediction of the current picture. RefPicSetLtCurr consists of all long-term reference pictures that may be used in inter prediction of the current picture. RefPicSetLtFoll consists of all long-term reference pictures that may be used in inter prediction of one or more of the pictures following the current picture in decoding order, and that are not used in inter prediction of the current picture.

The RPS is signaled using up to three loops iterating over different types of reference pictures; short-term reference pictures with lower POC value than the current picture, short-term reference pictures with higher POC value than the current picture, and long-term reference pictures. In addition, a flag (used_by_curr_pic_X_flag) is sent for each reference picture indicating whether the reference picture is used for reference by the current picture (included in one of the lists RefPicSetStCurrBefore, RefPicSetStCurrAfter or RefPicSetLtCurr) or not (included in one of the lists RefPicSetStFoll or RefPicSetLtFoll).

Figure 4:
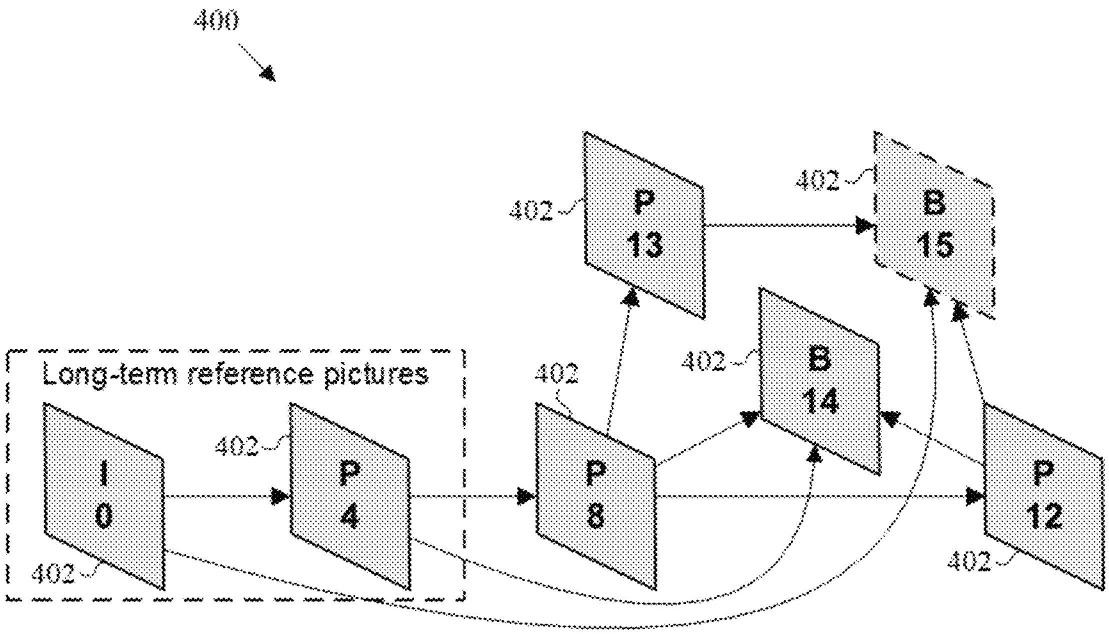
FIG. 4 is a schematic diagram illustrating a reference picture set (RPS) having a picture with entries in all subsets of the RPS.

FIG. 4 illustrates an RPS 400 having a current picture B14 with entries (e.g., a picture) in all subsets 402 of the RPS 400. In the example in FIG. 4, the current picture B14 contains exactly one picture in each of the five subsets 402 (a.k.a., RPS subsets). P8 is the picture in the subset 402 referred to as RefPicSetStCurrBefore because the picture is before in output order and used by B14. P12 is the picture in the subset 402 referred to as RefPicSetStCurrAfter because the picture is after in output order and used by B14. P13 is the picture in the subset 402 referred to as RefPicSetStFoll because the picture is a short-term reference picture not used by B14 (but must be kept in the DPB since it is used by B15). P4 is the picture in the subset 402 referred to as RefPicSetLtCurr because the picture is a long-term reference picture used by B14. I0 is the picture in the subset 402 referred to as RefPicSetLtFoll since the picture is a long-term reference picture not used by the current picture (but must be kept in the DPB since it is used by B15).

The short-term part of the RPS 400 may be included directly in the slice header. Alternatively, the slice header may contain only a syntax element which represents an index, referencing to a predefined list of RPSs sent in the active SPS. The short-term part of the RPS 402 can be signaled using either of two different schemes; Inter RPS, as described below, or Intra RPS, as described here. When Intra RPS is used, num_negative_pics and num_positive_pics are signaled representing the length of two different lists of reference pictures. These lists contain the reference pictures with negative POC difference and positive POC difference compared to the current picture, respectively. Each element in these lists is encoded with a variable length code representing the difference in POC value relative to the previous element in the list minus one. For the first picture in each list, the signaling is relative to the POC value of the current picture minus one.

When encoding the recurring RPSs in the sequence parameter set, it is possible to encode the elements of one RPS (e.g., RPS 400) with reference to another RPS already encoded in the sequence parameter set. This is referred to as Inter RPS. There are no error robustness problems associated with this method as all the RPSs of the sequence parameter set are in the same network abstraction layer (NAL) unit. The Inter RPS syntax exploits the fact that the RPS of the current picture can be predicted from the RPS of a previously decoded picture. This is because all the reference pictures of the current picture must either be reference pictures of the previous picture or the previously decoded picture itself. It is only necessary to indicate which of these pictures should be reference pictures and be used for the prediction of the current picture. Therefore, the syntax comprises the following: an index pointing to the RPS to use as a predictor, a delta_POC to be added to the delta_POC of the predictor to obtain the delta POC of the current RPS, and a set of indicators to indicate which pictures are reference pictures and whether they are only used for the prediction of future pictures.

Encoders that would like to exploit the use of long-term reference pictures must set the SPS syntax element long_term_ref_pics_present_flag to one. Long-term reference pictures can then be signaled in the slice header by fixed-length codewords, poc_lsb_lt, representing the least significant bits of the full POC value of each long-term picture. Each poc_lsb_lt is a copy of the pic_order_cnt_lsb codeword that was signaled for a particular long-term picture. It is also possible to signal a set of long-term pictures in the SPS as a list of POC LSB values. The POC LSB for a long-term picture can then be signaled in the slice header as an index to this list.

The delta_poc_msb_cycle_lt_minus1 syntax element can additionally be signaled to enable the calculation of the full POC distance of a long-term reference picture relative to the current picture. It is required that the codeword delta_poc_msb_cycle_lt_minus1 is signaled for each long-term reference picture that has the same POC LSB value as any other reference picture in the RPS.

For reference picture marking in HEVC, there will typically be a number of pictures present in the DPB before picture decoding. Some of the pictures may be available for prediction and, as such, marked as "used for reference." Other pictures may be unavailable for prediction but are waiting for output and, as such, marked as "unused for reference." When the slice header has been parsed, a picture marking process is carried out before the slice data is decoded. Pictures that are present in the DPB and marked as "used for reference" but are not included in the RPS are marked "unused for reference." Pictures that are not present in the DPB but are included in the reference picture set are ignored when the used_by_curr_pic_X_flag is equal to zero. However, when the used_by_curr_pic_X_flag instead is equal to one, this reference picture was intended to be used for prediction in the current picture but is missing. Then an unintentional picture loss is inferred and the decoder should take appropriate action.

After decoding the current picture, it is marked "used for short-term reference."

Next, reference picture list construction in HEVC is discussed. In HEVC, the term inter prediction is used to denote prediction derived from data elements (e.g., sample values or motion vectors) of reference pictures other than the current decoded picture. Like in AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. Similar to AVC, the reference picture list construction in HEVC includes reference picture list initialization and reference picture list modification.

In AVC, the initialization process for List 0 is different for P slice (for which decoding order is used) and B slices (for which output order is used). In HEVC, output order is used in both cases.

Reference picture list initialization creates default List 0 and List 1 (if the slice is a B slice) based on three RPS subsets: RefPicSetStCurrBefore, RefPicSetStCurrAfter, and RefPicSetLtCurr. Short-term pictures with earlier (later) output order are first inserted into the List 0 (List 1) in ascending order of POC distance to the current picture, then short-term pictures with later (earlier) output order are inserted into the List 0 (List 1) in ascending order of POC distance to the current picture, and then finally the long-term pictures are inserted at the end. In terms of RPS, for List 0, the entries in RefPicSetStCurrBefore are inserted in the initial list, followed by the entries in RefPicSetStCurrAfter. Afterwards, the entries in RefPicSetLtCurr, if available, are appended.

In HEVC, the above process is repeated (reference pictures that have already been added to the reference picture list are added again) when the number of entries in a list is smaller than the target number of active reference pictures (signaled in the picture parameter set or slice header). When the number of entries is larger than the target number, the list is truncated.

After a reference picture list has been initialized, it may be modified such that the reference pictures for the current picture may be arranged in any order, including the case where one particular reference picture may appear in more than one position in the list, based on the reference picture list modification commands. When the flag indicating the presence of list modifications is set to one, a fixed number (equal to the target number of entries in the reference picture list) of commands are signaled, and each command inserts one entry for a reference picture list. A reference picture is identified in the command by the index to the list of reference pictures for the current picture derived from the RPS signaling. This is different from reference picture list modification in H.264/AVC, wherein a picture is identified either by the picture number (derived from the frame_num syntax element) or the long-term reference picture index, and it is possible that fewer commands are needed, e.g., for swapping the first two entries of an initial list or inserting one entry at the beginning of the initial list and shifting the others.

A reference picture list is not allowed to include any reference picture with a TemporalId greater than the current picture. An HEVC bitstream might consist of several temporal sub-layers. Each NAL unit belongs to a specific sub-layer as indicated by the TemporalId (equal to temporal_id_plus1−1).

Reference picture management is directly based on reference picture lists. The JCT-VC document JCTVC-G643 includes an approach to directly use three reference picture lists, reference picture list 0, reference picture list 1, and an idle reference picture list, for management of the reference pictures in the DPB, thereby avoiding the need of the signaling and decoding processes including either 1) the sliding window and the MMCO processes as well as the reference picture list initialization and modification processes in AVC, or 2) the reference picture set as well as the reference picture list initialization and modification processes in HEVC.

Approaches for reference picture management may have several problems. The AVC approach involves the sliding window, the MMCO processes, and the reference picture list initialization and modification processes, which are complex. Furthermore, loss of pictures may lead to loss of the status of the DPB in terms of which pictures should have been in the DPB for further inter prediction referencing purpose. The HEVC approach does not have the DPB status loss issue. However, the HEVC approach involves a complex reference picture set signaling and derivation process, as well as the reference picture list initialization and modification processes, which are complex. The approach in JCTVC-G643 to directly use three reference picture lists, reference picture list 0, reference picture list 1, as well as an idle reference picture list, for management of the reference pictures in the DPB involves the following aspects: a third reference picture list, i.e., the idle reference picture list; the two-part coding of POC differences as a "short-term" part and a ue(v)-coded "long-term" part; the TemporalId-based POC granularity for POC difference coding, use of the two-part coding of POC differences for determining the marking between "used for short-term reference" or "used for long-term reference"; a reference picture list subset description, which enables the ability to specify a reference picture list by removing reference pictures from the tail of a certain earlier reference picture list description; the reference picture list copy mode enabled by the syntax element ref_pic_list_copy_flag; and the reference picture list description process. Each of the preceding aspects makes the approach unnecessarily complex. Furthermore, the decoding process for reference picture lists in JCTVC-G643 is also complex. Signaling of long-term reference pictures may need signaling of the POC cycle in slice headers. This is not efficient.

In order to address the problems listed above, disclosed herein are following solutions, each of which can be applied individually, and some of which can be applied in combination. 1) Reference picture marking is directly based on the two reference picture lists, namely reference picture list 0 and reference picture list 1. 1a) Information for derivation of the two reference picture lists is signaled based on syntax elements and syntax structures in the SPS, PPS, and/or the slice header. 1b) Each of the two reference picture lists for a picture is signaled explicitly in a reference picture list structure. 1b.i) One or more reference picture list structures can be signaled in SPS and each of them can be referred to by an index from the slice header. 1b.ii) Each of the reference picture list 0 and 1 can be signaled directly in the slice header. 2) Information for derivation of the two reference picture lists is signaled for all types of slices, i.e., B (bi-predictive), P (uni-predictive), and I (intra) slices. The term slice refers to a collection of coding tree units such as a slice in HEVC or the latest VVC WD; it may also refer to some other collection of coding tree units such as a tile in HEVC. 3) The two reference picture lists are generated for all types of slices, i.e., B, P, and I slices. 4) The two reference picture lists are directly constructed without using a reference picture list initialization process and a reference picture list modification process. 5) In each of the two reference picture lists, reference pictures that may be used for inter prediction of the current picture can only be referred to by a number of entries at the beginning of the list. These entries are referred to as the active entries in the list, while other entries are referred to as the inactive entries in the list. The number of the total entries and the number of the active entries in the list can both be derived. 6) The picture referred to by an inactive entry in a reference picture list is disallowed to be referred to by another entry in the reference picture list or any entry in the other reference picture list. 7) Long-term reference pictures are only identified by a certain number of POC LSBs, where this number may be greater than the number of POC LSBs signaled in the slice headers for derivation of POC values, and this number is indicated in the SPS. 8) Reference picture list structures are signaled only in slice headers, both short-term reference pictures and long-term reference pictures are identified by their POC LSBs, which may be represented by numbers of bits that are different from the number of bits used for representing the POC LSBs signaled in slice headers for derivation of POC values, and the numbers of bits used to represent the POC LSBs for identifying short-term reference pictures and long-term reference pictures may be different. 9) Reference picture list structures are signaled only in slice headers, no distinction is made between short-term and long-term reference pictures, all reference pictures are just named reference pictures, and reference pictures are identified by their POC LSBs, which may be represented by a number of bits that is different from number of bits used for representing the POC LSBs signaled in slice headers for derivation of POC values.

A first embodiment of the present disclosure is provided. The description is relative to the latest VVC WD. In this embodiment, two sets of reference picture list structures are signaled in the SPS, one for each of reference picture list 0 and reference picture list 1.

Definitions for some of the terms used herein are provided. An intra random access point (IRAP) picture: a coded picture for which each video coding layer (VCL) NAL unit has nal_unit_type equal to IRAP_NUT. Non-IRAP picture: a coded picture for which each VCL NAL unit has nal_unit_type equal to NON_IRAP_NUT. Reference picture list: a list of reference pictures that is used for inter prediction of a P or B slice. Two reference picture lists, reference picture list 0 and reference picture list 1, are generated for each slice of a non-IRAP picture. The set of unique pictures referred to by all entries in the two reference picture lists associated with a picture consists of all reference pictures that may be used for inter prediction of the associated picture or any picture following the associated picture in decoding order. For decoding the slice data of a P slice, only reference picture list 0 is used for inter prediction. For decoding the slice data of a B slice, both reference picture lists are used for inter prediction. For decoding the slice data of an I slice, no reference picture list is used for inter prediction. Long-term reference picture (LTRP): a picture that is marked as "used for long-term reference." Short-term reference picture (STRP): a picture that is marked as "used for short-term reference."

The terms "used for short-term reference," "used for long-term reference," or "unused for reference" are defined in VVC in section 8.3.3 Decoding process for reference picture marking, defined in HEVC in section 8.3.2 Decoding process for reference picture set, and defined in AVC in section 7.4.3.3 Decoded reference picture marking semantics. As used herein, the terms have the same meaning.

The relevant syntax and semantics for the first embodiment are provided below.

NAL unit header syntax.

| | Descriptor |
|---|---|
| nal_unit_header( ) { | |
| forbidden_zero_bit | f(1) |
| nal_unit_type | u(5) |
| nuh_temporal_id_plus1 | u(3) |
| nuh_reserved_zero_7bits | u(7) |
| } | |

Sequence parameter set Raw Byte Sequence Payload (RBSP) syntax.

| | Descriptor |
|---|---|
| seq_parameter_set_rbsp( ) { | |
| sps_seq_parameter_set_id | ue(v) |
| chroma_format_idc | ue(v) |
| if( chroma_format_idc = = 3 ) | |
| separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| log2_max_pic_order_cnt_lsb_minus4 | ue(v) |
| sps_max_dec_pic_buffering_minus1 | ue(v) |
| qtbtt_dual_tree_intra_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| max_mtt_hierarchy_depth_inter_slices | ue(v) |
| max_mtt_hierarchy_depth_intra_slices | ue(v) |
| long_term_ref_pics_flag | u(1) |
| if( long_term_ref_pics_flag ) | |
| additional_lt_poc_lsb | ue(v) |
| for( i = 0; i < 2; i++) { | |
| num_ref_pic_lists_in_sps[ i ] | ue(v) |
| for( j = 0; j < num_ref_pic_lists_in_sps[ i ]; j++) | |
| ref_pic_list_struct( i, j, long_term_ref_pics_flag ) | |
| } | |
| rbsp_trailing_bits( ) | |
| } | |

Picture parameter set RBSP syntax.

| | Descriptor |
|---|---|
| pic_parameter_set_rbsp( ) { | |
| pps_pic_parameter_set_id | ue(v) |
| pps_seq_parameter_set_id | ue(v) |
| for( i = 0; i < 2; i++) | |
| num_ref_idx_default_active_minus1[ i ] | ue(v) |
| rbsp_trailing_bits( ) | |
| } | |

Slice header syntax.

| | Descriptor |
|---|---|
| slice_header( ) { | |
| slice_pic_parameter_set_id | ue(v) |
| slice_address | u(v) |
| slice_type | ue(v) |
| if ( slice_type != I ) | |
| log2_diff_ctu_max_bt_size | ue(v) |
| if( nal_unit_type != IRAP_NUT ) { | |
| slice_pic_order_cnt_lsb | u(v) |
| for(i = 0; i < 2; i++ ) { | |
| ref_pic_list_sps_flag[ i ] | u(1) |
| if( ref_pic_list_sps_flag[ i ] ) { | |
| if( num_ref_pic_lists_in_sps[ i ] > 1) | |
| ref_pic_list_idx[ i ] | u(v) |
| } else | |
| ref_pic_list_struct( i, num_ref_pic_lists_in_sps[ i ], long_term_ref_pics_flag ) | |
| } | |
| if( slice_type = = P \|\| slice_type = = B ) { | |
| num_ref_idx_active_override_flag | u(1) |
| if( num_ref_idx_active_override_flag ) | |
| for( i = 0; i < ( slice_type = = B ? 2: 1); i++ ) | |
| num_ref_idx_active_minus1[ i ] | ue(v) |
| } | |
| } | |
| byte_alignment( ) | |
| } | |

Reference picture list structure syntax.

| | Descriptor |
|---|---|
| ref_pic_list_struct( listIdx, rplsIdx, ltrpFlag ) { | |
| num_strp_entries[ listIdx ][ rplsIdx ] | ue(v) |
| if( ltrpFlag ) | |
| num_ltrp_entries[ listIdx ][ rplsIdx ] | ue(v) |
| for( i = 0; i < NumEntriesInList[ listIdx ][ rplsIdx ]; i++) { | |
| if( num_ltrp_entries[ listIdx ][ rplsIdx ] > 0 ) | |
| lt_ref_pic_flag[ listIdx ][ rplsIdx ][ i ] | |
| if( !lt_ref_pic_flag[ listIdx ][ rplsIdx ][ i ] ) | |
| delta_poc_st[ listIdx ][ rplsIdx ][ i ] // Not using "delta_poc_st_minus1" herein, to allow for the same reference picture being included in multiple positions of a reference picture list. As a side effect, this would also enable current picture referencing (i.e., intra block copy). Note also that it is signed. | se(v) |
| else | |
| poc_lsb_lt[ listIdx ][ rplsIdx ][ i ] | u(v) |
| } | |
| } | |

NAL unit header semantics.

A forbidden_zero_bit shall be equal to 0. nal_unit_type specifies the type of RBSP data structure contained in the NAL unit.

TABLE 7-1

NAL unit type codes and NAL unit type classes

| nal_unit_type | Name of nal_unit_type | Content of NAL unit and RBSP syntax structure | NAL unit type class |
|---|---|---|---|
| 0 | NON_IRAP_NUT | Coded slice segment of a non-IRAP picture slice_layer_rbsp( ) | VCL |
| 1 | IRAP_NUT | Coded slice of an IRAP picture slice_layer_rbsp( ) | VCL |
| 2-15 | RSV_VCL_NUT | Reserved VCL NAL Units | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20, 21 | PREFIX_SEI_NUT SUFFIX_SEI_NUT | Supplemental enhancement information sei_rbsp( ) | non-VCL |
| 22-26 | RSV_NVCL | Reserved | non-VCL |
| 27-31 | UNSPEC | Unspecified | non-VCL |

The nuh_temporal_id_plus1 minus 1 specifies a temporal identifier for the NAL unit. The value of nuh_temporal_id_plus1 shall not be equal to 0. The variable TemporalId is specified as follows: TemporalId=nuh_temporal_id_plus1−1. When nal_unit_type is equal to IRAP_NUT, the coded slice belongs to an IRAP picture, TemporalId shall be equal to 0. The value of TemporalId shall be the same for all VCL NAL units of an access unit. The value of TemporalId of a coded picture or an access unit is the value of the TemporalId of the VCL NAL units of the coded picture or the access unit. The value of TemporalId for non-VCL NAL units is constrained as follows: If nal_unit_type is equal to SPS_NUT, TemporalId shall be equal to 0 and the TemporalId of the access unit containing the NAL unit shall be equal to 0. Otherwise if nal_unit_type is equal to EOS_NUT or EOB_NUT, TemporalId shall be equal to 0. Otherwise, TemporalId shall be greater than or equal to the TemporalId of the access unit containing the NAL unit. When the NAL unit is a non-VCL NAL unit, the value of TemporalId is equal to the minimum value of the TemporalId values of all access units to which the non-VCL NAL unit applies. When nal_unit_type is equal to PPS_NUT, TemporalId may be greater than or equal to the TemporalId of the containing access unit, as all picture parameter sets (PPSs) may be included in the beginning of a bitstream, wherein the first coded picture has TemporalId equal to 0. When nal_unit_type is equal to PREFIX_SEI_NUT or SUFFIX_SEI_NUT, TemporalId may be greater than or equal to the TemporalId of the containing access unit, as an SEI NAL unit may contain information that applies to a bitstream subset that includes access units for which the TemporalId values are greater than the TemporalId of the access unit containing the SEI NAL unit. nuh_reserved_zero_7 bits shall be equal to '0000000'. Other values of nuh_reserved_zero_7 bits may be specified in the future by ITU-T|ISO/IEC. Decoders shall ignore (i.e., remove from the bitstream and discard) NAL units with values of nuh_reserved_zero_7 bits not equal to '0000000'.

Sequence parameter set RBSP semantics.

A log2_max_pic_order_cnt_lsb_minus4 specifies the value of the variable MaxPicOrderCntLsb that is used in the decoding process for picture order count as follows: MaxPicOrderCntLsb=$2^{(log2\_max\_pic\_order\_cnt\_lsb\_minus4+4)}$. The value of log2_max_pic_order_cnt_lsb_minus4 shall be in the range of 0 to 12, inclusive. sps_max_dec_pic_buffering_minus1 plus 1 specifies the maximum required size of the decoded picture buffer for the CVS in units of picture storage buffers. The value of sps_max_dec_pic_buffering_minus1 shall be in the range of 0 to MaxDpbSize−1, inclusive, where MaxDpbSize is as specified somewhere else. long_term_ref_pics_flag equal to 0 specifics that no LTRP is used for inter prediction of any coded picture in the CVS. long_term_ref_pics_flag equal to 1 specifies that LTRPs may be used for inter prediction of one or more coded pictures in the CVS. additional_lt_poc_lsb specifies the value of the variable MaxLtPicOrderCntLsb that is used in the decoding process for reference picture lists as follows: MaxLtPicOrderCntLsb=$2^{(log2\_max\_pic\_order\_cnt\_lsb\_minus4+4+additional\_lt\_poc\_lsb)}$. The value of additional_lt_poc_lsb shall be in the range of 0 to 32−log2_max_pic_order_cnt_lsb_minus4−4, inclusive. When not present, the value of additional_lt_poc_lsb is inferred to be equal to 0. num_ref_pic_lists_in_sps[i] specifies the number of the ref_pic_list_struct(listIdx, rplsIdx, ltrpFlag) syntax structures with listIdx equal to i included in the SPS. The value of num_ref_pic_lists_in_sps[i] shall be in the range of 0 to 64, inclusive. For each value of listIdx (equal to 0 or 1), a decoder should allocate memory for a total number of num_ref_pic_lists_in_sps[i]+1 ref_pic_list_struct(listIdx, rplsIdx, ltrpFlag) syntax structures since there may be one ref_pic_list_struct(listIdx, rplsIdx, ltrpFlag) syntax structure directly signaled in the slice headers of a current picture.

Picture parameter set RBSP semantics.

A num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] shall be in the range of 0 to 14, inclusive.

Slice header semantics.

When present, the value of each of the slice header syntax elements slice_pic_parameter_set_id and slice_pic_order_cnt_lsb shall be the same in all slice headers of a coded picture . . . slice_type specifies the coding type of the slice according to Table 7-3.

TABLE 7-3

| Name association to slice_type | |
|---|---|
| slice_type | Name of slice_type |
| 0 | B (B slice) |
| 1 | P (P slice) |
| 2 | I (I slice) |

When nal_unit_type is equal to IRAP_NUT, i.e., the picture is an IRAP picture, slice_type shall be equal to 2 . . . slice_pic_order_cnt_lsb specifies the picture order count modulo MaxPicOrderCntLsb for the current picture. The length of the slice_pic_order_cnt_lsb syntax element is log2_max_pic_order_cnt_lsb_minus4+4 bits. The value of the slice_pic_order_cnt_lsb shall be in the range of 0 to MaxPicOrderCntLsb−1, inclusive. When slice_pic_order_cnt_lsb is not present, slice_pic_order_cnt_lsb is inferred to be equal to 0. ref_pic_list_sps_flag[i] equal to 1 specifies that reference picture list i of the current picture is derived based on one of the ref_pic_list_struct(listIdx, rplsIdx, ltrpFlag) syntax structures with listIdx equal to i in the active SPS. ref_pic_list_sps_flag[i] equal to 0 specifies that reference picture list i of the current picture is derived based on the ref_pic_list_struct(listIdx, rplsIdx, ltrpFlag) syntax structure with listIdx equal to i that is directly included in the slice headers of the current picture. When num_ref_pic_lists_in_sps[i] is equal to 0, the value of ref_pic_list_sps_flag[i] shall be equal to 0. ref_pic_list_idx[i] specifies the index, into the list of the ref_pic_list_struct(listIdx, rplsIdx, ltrpFlag) syntax structures with listIdx equal to i included in the active SPS, of the ref_pic_list_struct(listIdx, rplsIdx, ltrpFlag) syntax structure with listIdx equal to i that is used for derivation of reference picture list i of the current picture. The syntax element ref_pic_list_idx[i] is represented by Ceil (Log2(num_ref_pic_lists_in_sps[i])) bits. When not present, the value of ref_pic_list_idx[i] is inferred to be equal to 0. The value of ref_pic_list_idx[i] shall be in the range of 0 to num_ref_pic_lists_in_sps[i]−1, inclusive. num_ref_idx_active_override_flag equal to 1 specifies that the syntax element num_ref_idx_active_minus1[0] is present for P and B slices and that the syntax element num_ref_idx_active_minus1[1] is present for B slices. num_ref_idx_active_override_flag equal to 0 specifies that the syntax elements num_ref_idx_active_minus1[0] and num_ref_idx_active_minus1[1] are not present. num_ref_idx_active_minus1[i], when present, specifies the value of the variable NumRefIdxActive[i] as follows: NumRefIdxActive[i]=num_ref_idx_active_minus1[i]+1. The value of num_ref_idx_active_minus1[i] shall be in the range of 0 to 14, inclusive.

The value of NumRefIdxActive[i]−1 specifies the maximum reference index for reference picture list i that may be used to decode the slice. When the value of NumRefIdxActive[i] is equal to 0, no reference index for reference picture list i may be used to decode the slice. For i equal to 0 or 1, when the current slice is a B slice and num_ref_idx_active_override_flag is equal to 0, NumRefIdxActive[i] is inferred to be equal to num_ref_idx_default_active_minus1 [i]+1. When the current slice is a P slice and num_ref_idx_active_override_flag is equal to 0, NumRefIdxActive[0] is inferred to be equal to num_ref_idx_default_active_minus1 [0]+1. When the current slice is a P slice, NumRefIdxActive [1] is inferred to be equal to 0. When the current slice is an I slice, both NumRefIdxActive[0] and NumRefIdxActive[1] are inferred to be equal to 0.

Alternatively, for i equal to 0 or 1, the following applies after the above: Let rplsIdx1 be set equal to ref_pic_list_sps_flag[i]?ref_pic_list_idx[i]:num_ref_pic_lists_in_sps[i], and numRpEntries[i] be equal to num_strp_entries[i][rplsIdx1]+num_ltrp_entries[i][rplsIdx1]. When NumRefIdxActive[i] is greater than numRpEntries[i], the value of NumRefIdxActive[i] is set equal to numRpEntries[i]

Reference picture list structure semantics.

The ref_pic_list_struct(listIdx, rplsIdx, ltrpFlag) syntax structure may be present in an SPS or in a slice header. Depending on whether the syntax structure is included in a slice header or an SPS, the following applies: If present in a slice header, the ref_pic_list_struct(listIdx, rplsIdx, ltrpFlag) syntax structure specifies reference picture list listIdx of the current picture (the picture containing the slice). Otherwise (present in an SPS), the ref_pic_list_struct(listIdx, rplsIdx, ltrpFlag) syntax structure specifies a candidate for reference picture list listIdx, and the term “the current picture” in the semantics specified in the remainder of this section refers to each picture that 1) has one or more slices containing ref_pic_list_idx[listIdx] equal to an index into the list of the ref_pic_list_struct(listIdx, rplsIdx, ltrpFlag) syntax structures included in the SPS, and 2) is in a CVS that has the SPS as the active SPS. num_strp_entries[listIdx] [rplsIdx] specifies the number of STRP entries in the ref_pic_list_struct(listIdx, rplsIdx, ltrpFlag) syntax structure. num_ltrp_entries[listIdx][rplsIdx] specifies the number of LTRP entries in the ref_pic_list_struct(listIdx, rplsIdx, ltrpFlag) syntax structure. When not present, the value of num_ltrp_entries[listIdx][rplsIdx] is inferred to be equal to 0. The variable NumEntriesInList[listIdx][rplsIdx] is derived as follows: NumEntriesInList[listIdx][rplsIdx]= num_strp_entries[listIdx][rplsIdx]+num_ltrp_entries[listIdx][rplsIdx]. The value of NumEntriesInList[listIdx][rplsIdx] shall be in the range of 0 to sps_max_dec_pic_buffering_minus1, inclusive. lt_ref_pic_flag[listIdx][rplsIdx][i] equal to 1 specifies that the i-th entry in the ref_pic_list_struct(listIdx, rplsIdx, ltrpFlag) syntax structure is an LTRP entry. lt_ref_pic_flag[listIdx][rplsIdx][i] equal to 0 specifies that the i-th entry in the ref_pic_list_struct(listIdx, rplsIdx, ltrpFlag) syntax structure is an STRP entry. When not present, the value of lt_ref_pic_flag[listIdx][rplsIdx][i] is inferred to be equal to 0. It is a requirement of bitstream conformance that the sum of lt_ref_pic_flag[listIdx][rplsIdx][i] for all values of i in the range of 0 to NumEntriesInList[listIdx][rplsIdx]−1, inclusive, shall be equal to num_ltrp_entries[listIdx][rplsIdx]. delta_poc_st[listIdx][rplsIdx] [i], when the i-th entry is the first STRP entry in ref_pic_list_struct(rplsIdx, ltrpFlag) syntax structure, specifies the difference between the picture order count values of the current picture and the picture referred to by the i-th entry, or, when the i-th entry is an STRP entry but not the first STRP entry in the ref_pic_list_struct(rplsIdx, ltrpFlag) syntax structure, specifies the difference between the picture order count values of the pictures referred to by the i-th entry and by the previous STRP entry in the ref_pic_list_struct (listIdx, rplsIdx, ltrpFlag) syntax structure. The value of delta_poc_st[listIdx][rplsIdx][i] shall be in the range of $-2^{15}$ to $2^{15}-1$, inclusive. poc_lsb_lt[listIdx][rplsIdx][i] specifies the value of the picture order count modulo MaxLtPicOrderCntLsb of the picture referred to by the i-th entry in the ref_pic_list_struct(listIdx, rplsIdx, ltrpFlag) syntax structure. The length of the poc_lsb_lt[listIdx][rplsIdx][i] syntax element is Log2(MaxLtPicOrderCntLsb) bits.

The decoding process is discussed. The decoding process operates as follows for the current picture CurrPic. The decoding of NAL units is specified below. The processes below specify the following decoding processes using syntax elements in the slice header layer and above. Variables and functions relating to picture order count are derived. This needs to be invoked only for the first slice of a picture. At the beginning of the decoding process for each slice of a non-IRAP picture, the decoding process for reference picture lists construction is invoked for derivation of reference picture list 0 (RefPicList[0]) and reference picture list 1 (RefPicList[1]). The decoding process for reference picture marking is invoked, wherein reference pictures may be marked as “unused for reference” or “used for long-term reference.” This needs to be invoked only for the first slice of a picture. The decoding processes for coding tree units, scaling, transform, in-loop filtering, etc., are invoked. After all slices of the current picture have been decoded, the current decoded picture is marked as “used for short-term reference.”

The NAL unit decoding process is discussed. Inputs to this process are NAL units of the current picture and their associated non-VCL NAL units. Outputs of this process are the parsed RBSP syntax structures encapsulated within the NAL units. The decoding process for each NAL unit extracts the RBSP syntax structure from the NAL unit and then parses the RBSP syntax structure.

The slice decoding process is discussed, including the decoding process for picture order count. Output of this process is PicOrderCntVal, the picture order count of the current picture. Picture order counts are used to identify pictures, for deriving motion parameters in merge mode and motion vector prediction, and for decoder conformance checking. Each coded picture is associated with a picture order count variable, denoted as PicOrderCntVal. When the current picture is not an IRAP picture, the variables prevPicOrderCntLsb and prevPicOrderCntMsb are derived as follows: Let prevTid0Pic be the previous picture in decoding order that has TemporalId equal to 0. The variable prevPicOrderCntLsb is set equal to slice_pic_order_cnt_lsb of prevTid0Pic. The variable prevPicOrderCntMsb is set equal to PicOrderCntMsb of prevTid0Pic.

The variable PicOrderCntMsb of the current picture is derived as follows: If the current picture is an IRAP picture, PicOrderCntMsb is set equal to 0. Otherwise, PicOrderCntMsb is derived as follows:

```
if( ( slice_pic_order_cnt_lsb < prevPicOrderCntLsb ) &&
    ( ( prevPicOrderCntLsb − slice_pic_order_cnt_lsb ) >= ( MaxPicOrderCntLsb / 2 ) ) )
  PicOrderCntMsb = prevPicOrderCntMsb + MaxPicOrderCntLsb
else if( (slice_pic_order_cnt_lsb > prevPicOrderCntLsb ) &&
    ( ( slice_pic_order_cnt_lsb − prevPicOrderCntLsb ) > ( MaxPicOrderCntLsb / 2 ) ) )
  PicOrderCntMsb = prevPicOrderCntMsb − MaxPicOrderCntLsb
else
  PicOrderCntMsb = prevPicOrderCntMsb
```

PicOrderCntVal is derived as follows: PicOrderCntVal=PicOrderCntMsb+slice_pic_order_cnt_lsb.

All IRAP pictures will have PicOrderCntVal equal to 0 since slice_pic_order_cnt_lsb is inferred to be 0 for IRAP pictures and prevPicOrderCntLsb and prevPicOrderCntMsb are both set equal to 0. The value of PicOrderCntVal shall be in the range of $-2^{31}$ to $2^{31}-1$, inclusive. In one CVS, the PicOrderCntVal values for any two coded pictures shall not be the same.

At any moment during the decoding process, the values of PicOrderCntVal & (MaxLtPicOrderCntLsb−1) for any two reference pictures in the DPB shall not be the same. The function PicOrderCnt(picX) is specified as follows: PicOrderCnt(picX)=PicOrderCntVal of the picture picX. The function DiffPicOrderCnt(picA, picB) is specified as follows: DiffPicOrderCnt(picA, picB)=PicOrderCnt(picA)−PicOrderCnt(picB). The bitstream shall not contain data that result in values of DiffPicOrderCnt(picA, picB) used in the decoding process that are not in the range of $-2^{15}$ to $2^{15}-1$, inclusive. Let X be the current picture and Y and Z be two other pictures in the same coded video sequence (CVS), Y and Z are considered to be in the same output order direction from X when both DiffPicOrderCnt(X, Y) and DiffPicOrderCnt(X, Z) are positive or both are negative.

The decoding process for reference picture lists construction is discussed. This process is invoked at the beginning of the decoding process for each slice of a non-IRAP picture. Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list 1 (i.e., RefPicList[1]) are used in decoding of the slice data. At the beginning of the decoding process for each slice of a non-IRAP picture, the reference picture lists RefPicList[0] and RefPicList[1] are derived. The reference picture lists are used in marking of reference pictures or in decoding of the slice data. For an I slice of a non-IRAP picture that it is not the first slice of the picture, RefPicList[0] and RefPicList[1] may be derived for bitstream conformance checking purpose, but their derivation is not necessary for decoding of the current picture or pictures following the current picture in decoding order. For a P slice that it is not the first slice of a picture, RefPicList[1] may be derived for bitstream conformance checking purpose, but its derivation is not necessary for decoding of the current picture or pictures following the current picture in decoding order. The reference picture lists RefPicList[0] and RefPicList[1] are constructed as follows:

```
for( i = 0; i < 2; i++ ) {
    if( ref_pic_list_sps_flag[ i ] )
        RplsIdx[ i ] = ref_pic_list_idx[ i ]
    else
        RplsIdx[ i ] = num_ref_pic_lists_in_sps[ i ]
    for( j = 0, pocBase = PicOrderCntVal; j < NumEntriesInList[ i ][ RplsIdx[ i ] ]; j++) {
        if( !lt_ref_pic_flag[ i ][ RplsIdx[ i ] ][ j ] ) {
            RefPicPocList[ i ][ j ] = pocBase − delta_poc_st[ i ][ RplsIdx[ i ] ][ j ]
            if( there is a reference picture picA in the DPB with PicOrderCntVal equal to
RefPicPocList[ i ][ j ] )
              RefPicList[ i ][ j ] = picA
            else
              RefPicList[ i ][ j ] = "no reference picture"
            pocBase = RefPicPocList[ i ][ j ]
        } else {
            if( there is a reference picA in the DPB with
PicOrderCntVal & ( MaxLtPicOrderCntLsb − 1 )
                equal to poc_lsb_lt[ i ][ RplsIdx[ i ] ][ j ] )
              RefPicList[ i ][ j ] = picA
            else
              RefPicList[ i ][ j ] = "no reference picture"
        }
    }
}
```

For each i equal to 0 or 1, the following applies: The first NumRefIdxActive[i] entries in RefPicList[i] are referred to as the active entries in RefPicList[i], and the other entries in RefPicList[i] are referred to as the inactive entries in RefPicList[i]. Each entry in RefPicList[i][j] for j in the range of 0 to NumEntriesInList[i][RplsIdx[i]]−1, inclusive, is referred to as an STRP entry if lt_ref_pic_flag[i][RplsIdx[i]][j] is equal to 0, and as an LTRP entry otherwise. It is possible that a particular picture is referred to by both an entry in RefPicList[0] and an entry in RefPicList[1]. It is also possible that a particular picture is referred to by more than one entry in RefPicList[0] or by more than one entry in RefPicList[1]. The active entries in RefPicList[0] and the active entries in RefPicList[1] collectively refer to all reference pictures that may be used for inter prediction of the current picture and one or more pictures that follow the current picture in decoding order. The inactive entries in RefPicList[0] and the inactive entries in RefPicList[1] collectively refer to all reference pictures that are not used for inter prediction of the current picture but may be used in inter prediction for one or more pictures that follow the current picture in decoding order. There may be one or more entries in RefPicList[0] or RefPicList[1] that are equal to "no reference picture" because the corresponding pictures are not present in the DPB. Each inactive entry in RefPicList[0] or RefPicList[0] that is equal to "no reference picture" should be ignored. An unintentional picture loss should be inferred for each active entry in RefPicList[0] or RefPicList[1] that is equal to "no reference picture."

It is a requirement of bitstream conformance that the following constraints apply: For each i equal to 0 or 1, NumEntriesInList[i][RplsIdx[i]] shall not be less than NumRefIdxActive[i]. The picture referred to by each active entry in RefPicList[0] or RefPicList[1] shall be present in the DPB and shall have TemporalId less than or equal to that of the current picture. Optionally, the following constraint may be further specified: the entry index of any inactive entry in RefPicList[0] or RefPicList[1] shall not be used as a reference index for decoding of the current picture. Optionally, the following constraint may be further specified: an inactive entry in RefPicList[0] or RefPicList[1] shall not refer to the same picture as any other entry in RefPicList[0] or RefPicList[1]. An STRP entry in RefPicList[0] or RefPicList[1] of a slice of a picture and an LTRP entry in RefPicList[0] or RefPicList[1] of the same slice or a different slice of the same picture shall not refer to the same picture. The current picture itself shall not be referred to by any entry in RefPicList[0] or RefPicList[1]. There shall be no LTRP entry in RefPicList[0] or RefPicList[1] for which the difference between the PicOrderCntVal of the current picture and the PicOrderCntVal of the picture referred to by the entry is greater than or equal to 224. Let setOfRefPics be the set of unique pictures referred to by all entries in RefPicList[0] and all entries in RefPicList[1]. The number of pictures in setOfRefPics shall be less than or equal to sps_max_dec_pic_buffering_minus1 and setOfRefPics shall be the same for all slices of a picture.

Decoding process for reference picture marking.

This process is invoked once per picture, after decoding of a slice header and the decoding process for reference picture list construction for the slice, but prior to the decoding of the slice data. This process may result in one or more reference pictures in the DPB being marked as "unused for reference" or "used for long-term reference." A decoded picture in the DPB can be marked as "unused for reference," "used for short-term reference," or "used for long-term reference," but only one among these three at any given moment during the operation of the decoding process. Assigning one of these markings to a picture implicitly removes another of these markings when applicable. When a picture is referred to as being marked as "used for reference," this collectively refers to the picture being marked as "used for short-term reference" or "used for long-term reference" (but not both). When the current picture is an IRAP picture, all reference pictures currently in the DPB (if any) are marked as "unused for reference." STRPs are identified by their PicOrderCntVal values. LTRPs are identified by the Log2(MaxLtPicOrderCntLsb) LSBs of their PicOrderCntVal values. The following applies: for each LTRP entry in RefPicList[0] or RefPicList[1], when the referred picture is an STRP, the picture is marked as "used for long-term reference." Each reference picture in the DPB that is not referred to by any entry in RefPicList[0] or RefPicList[1] is marked as "unused for reference."

Detailed description of the second embodiment of the disclosure is provided. This section documents a second embodiment of disclosure as described above. The description is relative to the latest VVC WD. In this embodiment, one set of reference picture list structures is signaled in the SPS, shared by reference picture list 0 and reference picture list 1.

Sequence parameter set RBSP syntax.

| | Descriptor |
|---|---|
| seq_parameter_set_rbsp( ) { | |
| sps_seq_parameter_set_id | ue(v) |
| chroma_format_idc | ue(v) |
| if( chroma_format idc = = 3 ) | |
| separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| log2_max_pic_order_cnt_lsb_minus4 | ue(v) |
| sps_max_dec_pic_buffering_minus1 | ue(v) |
| qtbtt_dual_tree_intra_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| max_mtt_hierarchy_depth_inter_slices | ue(v) |
| max_mtt_hierarchy_depth_intra_slices | ue(v) |
| num_ref_pic_lists_in_sps | ue(v) |
| long_term_ref_pics_flag | u(1) |
| if( long_term_ref_pics_flag ) | |
| additional_lt_poc_lsb | ue(v) |
| for( i = 0; i < num_ref_pic_lists_in_sps; i++) | |
| ref_pic_list_struct( i, long_term_ref_pics_flag ) | |
| rbsp_trailing_bits( ) | |
| } | |

Slice header syntax.

| | Descriptor |
|---|---|
| slice_header( ) { | |
| slice_pic_parameter_set_id | ue(v) |
| slice_address | u(v) |
| slice_type | ue(v) |
| if ( slice_type != I ) | |
| log2_diff_ctu_max_bt_size | ue(v) |
| if( nal_unit_type != IRAP_NUT ) { | |
| slice_pic_order_cnt_lsb | u(v) |
| for( i = 0; i < 2; i++ ) { | |
| ref_pic_list_sps_flag[ i ] | u(1) |
| if( ref_pic_list_sps_flag[ i ] ) { | |
| if( num_ref_pic_lists_in_sps > 1) | |
| ref_pic_list_idx[ i ] | u(v) |
| } else | |
| ref_pic_list_struct( num_ref_pic_lists_in_sps + i, long_term_ref_pics_flag ) | |
| } | |
| if( slice_type = = P \|\| slice_type = = B ) { | |
| num_ref_idx_active_override_flag | u(1) |
| if( num_ref_idx_active_override_flag ) | |
| for( i = 0; i < ( slice_type = = B ? 2: 1); i++ ) | |
| num_ref_idx_active_minus1[ i ] | ue(v) |
| } | |
| } | |
| byte_alignment( ) | |
| } | |

Reference picture list structure syntax.

| | Descriptor |
|---|---|
| ref_pic_list_struct( rplsIdx, ltrpFlag ) { | |
| num_strp_entries [ rplsIdx ] | ue(v) |
| if( ltrpFlag ) | |
| num_ltrp_entries[ rplsIdx ] | ue(v) |
| for( i = 0; i < NumEntriesInList[ rplsIdx ]; i++) { | |
| if( num_ltrp_entries[ rplsIdx ] > 0 ) | |
| lt_ref_pic_flag[ rplsIdx ][ i ] | |
| if( !lt_ref_pic_flag[ rplsIdx ][ i ] ) | |
| delta_poc_st[ rplsIdx ][ i ] // Not to have _minus1 herein, to allow for the same ref pic being included in multiple positions of a ref pic list. As a side effect, this would also enable current picture referencing (i.e., intra block copy). Note also that it is signed. | se(v) |
| else | |
| poc_lsb_lt[ rplsIdx ][ i ] | u(v) |
| } | |
| } | |

Picture parameter set RBSP syntax.

| | Descriptor |
|---|---|
| pic_parameter_set_rbsp( ) { | |
| pps_pic_parameter_set_id | ue(v) |
| pps_seq_parameter_set_id | ue(v) |
| for( i = 0; i < 2; i++) | |
| num_ref_idx_default_active_minus1[ i ] | ue(v) |
| rbsp_trailing_bits( ) | |
| } | |

NAL unit header semantics are discussed.

Sequence parameter set RBSP semantics.

A log2_max_pic_order_cnt_lsb_minus4 specifies the value of the variable MaxPicOrderCntLsb that is used in the decoding process for picture order count as follows: MaxPicOrderCntLsb=2(log2_max_pic_order_cnt_lsb_minus4+4). The value of log2_max_pic_order_cnt_lsb_minus4 shall be in the range of 0 to 12, inclusive. sps_max_dec_pic_buffering_minus1 plus 1 specifies the maximum required size of the decoded picture buffer for the CVS in units of picture storage buffers. The value of sps_max_dec_pic_buffering_minus1 shall be in the range of 0 to MaxDpbSize−1, inclusive, where MaxDpbSize is as specified somewhere else. num_ref_pic_lists_in_sps specifies the number of ref_pic_list_struct(rplsIdx, ltrpFlag) syntax structures included in the SPS. The value of num_ref_pic_lists_in_sps shall be in the range of 0 to 128, inclusive. A decoder should allocate memory for total a number of num_short_term_ref_pic_sets+2 ref_pic_list_struct(rplsIdx, ltrpFlag) syntax structures since there may be two ref_pic_list_struct(rplsIdx, ltrpFlag) syntax structures directly signaled in the slice headers of a current picture. long_term_ref_pics_flag equal to 0 specifies that no LTRP is used for inter prediction of any coded picture in the CVS. long_term_ref_pics_flag equal to 1 specifies that LTRPs may be used for inter prediction of one or more coded pictures in the CVS. additional_lt_poc_lsb specifies the value of the variable MaxLtPicOrderCntLsb that is used in the decoding process for reference picture lists as follows: MaxLtPicOrderCntLsb=2(log2_max_pic_order_cnt_lsb_minus4+4+additional_lt_poc_lsb))

The value of additional_lt_poc_lsb shall be in the range of 0 to 32−log2_max_pic_order_cnt_lsb_minus4−4, inclusive. When not present, the value of additional_lt_poc_lsb is inferred to be equal to 0.

Picture parameter set RBSP semantics are discussed.

Slice header semantics.

When present, the value of each of the slice header syntax elements slice_pic_parameter_set_id and slice_pic_order_cnt_lsb shall be the same in all slice headers of a coded picture. slice_type specifies the coding type of the slice according to Table 7-3.

TABLE 7-3

Name association to slice_type

| slice_type | Name of slice_type |
|---|---|
| 0 | B (B slice) |
| 1 | P (P slice) |
| 2 | I (I slice) |

When nal_unit_type is equal to IRAP_NUT, i.e., the picture is an IRAP picture, slice_type shall be equal to 2 . . . slice_pic_order_cnt_lsb specifies the picture order count modulo MaxPicOrderCntLsb for the current picture. The length of the slice_pic_order_cnt_lsb syntax element is log2_max_pic_order_cnt_lsb_minus4+4 bits. The value of the slice_pic_order_cnt_lsb shall be in the range of 0 to MaxPicOrderCntLsb−1, inclusive. When slice_pic_order_cnt_lsb is not present, slice_pic_order_cnt_lsb is inferred to be equal to 0. ref_pic_list_sps_flag[i] equal to 1 specifies that reference picture list i of the current picture is derived based on one of the ref_pic_list_struct(rplsIdx, ltrpFlag) syntax structure in the active SPS. ref_pic_list_sps_flag[i] equal to 0 specifies that reference picture list i of the current picture are derived based on the ref_pic_list_struct(rplsIdx, ltrpFlag) syntax structure that is directly included in the slice headers of the current picture. When num_ref_pic_lists_in_sps is equal to 0, the value of ref_pic_list_sps_flag[i] shall be equal to 0. ref_pic_list_idx[i] specifies the index, into the list of the ref_pic_list_struct(rplsIdx, ltrpFlag) syntax structures included in the active SPS, of the ref_pic_list_struct (rplsIdx, ltrpFlag) syntax structure that is used for derivation of reference picture list i of the current picture. The syntax element ref_pic_list_idx[i] is represented by Ceil (Log2 (num_ref_pic_lists_in_sps)) bits. When not present, the value of ref_pic_list_idx[i] is inferred to be equal to 0. The value of ref_pic_list_idx[i] shall be in the range of 0 to num_ref_pic_lists_in_sps−1, inclusive. num_ref_idx_active_override_flag equal to 1 specifies that the syntax element num_ref_idx_active_minus1[0] is present for P and B slices and that the syntax element num_ref_idx_active_minus1[1] is present for B slices. num_ref_idx_active_override_flag equal to 0 specifies that the syntax elements num_ref_idx_active_minus1[0] and num_ref_idx_active_minus1[1] are not present.

num_ref_idx_active_minus1[i], when present, specifies the value of the variable NumRefIdxActive[i] as follows: NumRefIdxActive[i]=num_ref_idx_active_minus1[i]+1. The value of num_ref_idx_active_minus1[i] shall be in the range of 0 to 14, inclusive. The value of NumRefIdxActive[i]−1 specifies the maximum reference index for reference picture list i that may be used to decode the slice. When the value of NumRefIdxActive[i] is equal to 0, no reference index for reference picture list i may be used to decode the slice. For i equal to 0 or 1, when the current slice is a B slice and num_ref_idx_active_override_flag is equal to 0, NumRefIdxActive[i] is inferred to be equal to num_ref_idx_default_active_minus1[i]+1. When the current slice is a P slice and num_ref_idx_active_override_flag is equal to 0, NumRefIdxActive[0] is inferred to be equal to num_ref_idx_default_active_minus1[0]+1. When the current slice is a P slice, NumRefIdxActive[1] is inferred to be equal to 0. When the current slice is an I slice, both NumRefIdxActive[0] and NumRefIdxActive[1] are inferred to be equal to 0.

Alternatively, for i equal to 0 or 1, the following applies after the above: Let rplsIdx1 be set equal to ref_pic_list_sps_flag[i]?ref_pic_list_idx[i]:num_ref_pic_lists_in_sps[i], and numRpEntries[i] be equal to num_strp_entries[i][rplsIdx1]+num_ltrp_entries[i][rplsIdx1]. When NumRefIdxActive[i] is greater than numRpEntries[i], the value of NumRefIdxActive[i] is set equal to numRpEntries[i].

Reference picture list structure semantics.

The ref_pic_list_struct(rplsIdx, ltrpFlag) syntax structure may be present in an SPS or in a slice header. Depending on whether the syntax structure is included in a slice header or an SPS, the following applies: If present in a slice header, the ref_pic_list_struct(rplsIdx, ltrpFlag) syntax structure specifies a reference picture list of the current picture (the picture containing the slice). Otherwise (present in an SPS), the ref_pic_list_struct(rplsIdx, ltrpFlag) syntax structure specifies a candidate reference picture list, and the term "the current picture" in the semantics specified in the remainder of this section refers to each picture that 1) has one or more slices containing ref_pic_list_idx[i] equal to an index into the list of the ref_pic_list_struct(rplsIdx, ltrpFlag) syntax structures included in the SPS, and 2) is in a CVS that has the SPS as the active SPS. num_strp_entries[rplsIdx] specifies the number of STRP entries in the ref_pic_list_struct (rplsIdx, ltrpFlag) syntax structure. num_ltrp_entries[rplsIdx] specifies the number of LTRP entries in the ref_pic_list_struct(rplsIdx, ltrpFlag) syntax structure. When not present, the value of num_ltrp_entries[rplsIdx] is inferred to be equal to 0.

The variable NumEntriesInList[rplsIdx] is derived as follows: NumEntriesInList[rplsIdx]=num_strp_entries[rplsIdx]+num_ltrp_entries[rplsIdx]. The value of NumEntriesInList[rplsIdx] shall be in the range of 0 to sps_max_dec_pic_buffering_minus1, inclusive. lt_ref_pic_flag[rplsIdx][i] equal to 1 specifies that the i-th entry in the ref_pic_list_struct(rplsIdx, ltrpFlag) syntax structure is an LTRP entry. lt_ref_pic_flag[rplsIdx][i] equal to 0 specifies that the i-th entry in the ref_pic_list_struct(rplsIdx, ltrpFlag)

syntax structure is an STRP entry. When not present, the value of lt_ref_pic_flag[rplsIdx][i] is inferred to be equal to 0. It is a requirement of bitstream conformance that the sum of lt_ref_pic_flag[rplsIdx][i] for all values of i in the range of 0 to NumEntriesInList[rplsIdx]−1, inclusive, shall be equal to num_ltrp_entries[rplsIdx]. delta_poc_st[rplsIdx][i], when the i-th entry is the first entry in STRP ref_pic_list_struct(rplsIdx, ltrpFlag) syntax structure, specifies the difference between the picture order count values of the current picture and the picture referred to by the i-th entry, or, when the i-th entry is an STRP entry but not the first STRP entry in the ref_pic_list_struct(rplsIdx, ltrpFlag) syntax structure, specifies the difference between the picture order count values of the pictures referred to by the i-th entry and by the previous STRP entry in the ref_pic_list_struct(rplsIdx, ltrpFlag) syntax structure. The value of delta_poc_st[rplsIdx][i] shall be in the range of 0 to $2^{15}-1$, inclusive. poc_lsb_lt[rplsIdx][i] specifies the value of the picture order count modulo MaxLtPicOrderCntLsb of the picture referred to by the i-th entry in the ref_pic_list_struct(rplsIdx, ltrpFlag) syntax structure. The length of the poc_lsb_lt[rplsIdx][i] syntax element is Log2(MaxLtPicOrderCntLsb) bits.

The general decoding process specified as part of the detailed description of the first embodiment of this disclosure applies. The NAL unit decoding process is described. The NAL unit decoding process specified as part of the detailed description of the first embodiment of this disclosure applies.

The slice decoding process is provided.

Decoding process for picture order count.

The decoding process for picture order count specified as part of the detailed description of the first embodiment of this disclosure applies.

Decoding process for reference picture lists construction.

This process is invoked at the beginning of the decoding process for each slice of a non-IRAP picture. Reference pictures are addressed through reference indices. A reference index is an index into a reference picture list. When decoding an I slice, no reference picture list is used in decoding of the slice data. When decoding a P slice, only reference picture list 0 (i.e., RefPicList[0]) is used in decoding of the slice data. When decoding a B slice, both reference picture list 0 and reference picture list 1 (i.e., RefPicList[1]) are used in decoding of the slice data. At the beginning of the decoding process for each slice of a non-IRAP picture, the reference picture lists RefPicList[0] and RefPicList[1] are derived. The reference picture lists are used in marking of reference pictures or in decoding of the slice data. For an I slice of a non-IRAP picture that it is not the first slice of the picture, RefPicList[0] and RefPicList[1] may be derived for bitstream conformance checking purpose, but their derivation is not necessary for decoding of the current picture or pictures following the current picture in decoding order. For a P slice that it is not the first slice of a picture, RefPicList[1] may be derived for bitstream conformance checking purpose, but its derivation is not necessary for decoding of the current picture or pictures following the current picture in decoding order.

The reference picture lists RefPicList[0] and RefPicList[1] are constructed as follows:

```
for( i = 0; i < 2; i++ ) {
  if( ref_pic_list_sps_flag[ i ] )
      RplsIdx[ i ] = ref_pic_list_idx[ i ]
  else
      RplsIdx[ i ] = num_ref_pic_lists_in_sps
  for( j = 0, pocBase = PicOrderCntVal; j < NumEntriesInList[ RplsIdx[ i ] ]; j++) {
      if( !lt_ref_pic_flag[ RplsIdx[ i ] ][ j ] ) {
        RefPicPocList[ i ][ j ] = pocBase − delta_poc_st[ RplsIdx[ i ] ][ j ]
        if( there is a reference picture picA in the DPB with PicOrderCntVal equal to
RefPicPocList[ i ][ j ] )
          RefPicList[ i ][ j ] = picA
        else
          RefPicList[ i ][ j ] = "no reference picture"
        pocBase = RefPicPocList[ i ][ j ]
      } else {
        if( there is a reference picA in the DPB with
PicOrderCntVal & ( MaxLtPicOrderCntLsb − 1 )
            equal to poc_lsb_lt[ RplsIdx[ i ] ][ j ] )
          RefPicList[ i ][ j ] = picA
        else
          RefPicList[ i ][ j ] = "no reference picture"
    }
  }
}
```

For each i equal to 0 or 1, the following applies: the first NumRefIdxActive[i] entries in RefPicList[i] are referred to as the active entries in RefPicList[i], and the other entries in RefPicList[i] are referred to as the inactive entries in RefPicList[i]. Each entry RefPicList[i][j] for j in the range of 0 to NumEntriesInList[RplsIdx[i]]−1, inclusive, is referred to as an STRP entry if lt_ref_pic_flag[RplsIdx[i]][j] is equal to 0, and as an LTRP entry otherwise. It is possible that a particular picture is referred to by both an entry in RefPicList[0] and an entry in RefPicList[1]. It is also possible that a particular picture is referred to by more than one entry in RefPicList[0] or by more than one entry in RefPicList[1]. The active entries in RefPicList[0] and the active entries in RefPicList[1] collectively refer to all reference pictures that may be used for inter prediction of the current picture and one or more pictures that follow the current picture in decoding order. The inactive entries in RefPicList[0] and the inactive entries in RefPicList[1] collectively refer to all reference pictures that are not used for inter prediction of the current picture but may be used in inter prediction for one or more pictures that follow the current picture in decoding order. There may be one or more entries in RefPicList[0] or RefPicList[1] that are equal to "no reference picture" because the corresponding pictures are not present in the DPB. Each inactive entry in RefPicList[0] or RefPicList[1] that is equal to "no reference picture" should be ignored. An unintentional picture loss should be inferred for each active entry in RefPicList[0] or RefPicList[1] that is equal to "no reference picture."

It is a requirement of bitstream conformance that the following constraints apply: For each i equal to 0 or 1, NumEntriesInList[RplsIdx[i]] shall not be less than NumRefIdxActive[i]. The picture referred to by each active entry in RefPicList[0] or RefPicList[1] shall be present in the DPB and shall have TemporalId less than or equal to that of the current picture. Optionally, the following constraint may be further specified: the entry index of any inactive entry in RefPicList[0] or RefPicList[1] shall not be used as a reference index for decoding of the current picture. Optionally, the following constraint may be further specified: an inactive entry in RefPicList[0] or RefPicList[1] shall not refer to the same picture as any other entry in RefPicList[0] or RefPicList[1]. An STRP entry in RefPicList[0] or RefPicList[1] of a slice of a picture and an LTRP entry in RefPicList[0] or RefPicList[1] of the same slice or a different slice of the same picture shall not refer to the same picture. The current picture itself shall not be referred to by any entry in RefPicList[0] or RefPicList[1]. There shall be no LTRP entry in RefPicList[0] or RefPicList[1] for which the difference between the PicOrderCntVal of the current picture and the PicOrderCntVal of the picture referred to by the entry is greater than or equal to 224. Let setOfRefPics be the set of unique pictures referred to by all entries in RefPicList[0] and all entries in RefPicList[1]. The number of pictures in setOfRefPics shall be less than or equal to sps_max_dec_pic_buffering_minus1 and setOfRefPics shall be the same for all slices of a picture.

The decoding process for reference picture marking is discussed.

This process is invoked once per picture, after decoding of a slice header and the decoding process for reference picture list construction for the slice, but prior to the decoding of the slice data. This process may result in one or more reference pictures in the DPB being marked as "unused for reference" or "used for long-term reference." A decoded picture in the DPB can be marked as "unused for reference," "used for short-term reference" or "used for long-term reference," but only one among these three at any given moment during the operation of the decoding process. Assigning one of these markings to a picture implicitly removes another of these markings when applicable. When a picture is referred to as being marked as "used for reference," this collectively refers to the picture being marked as "used for short-term reference" or "used for long-term reference" (but not both). When the current picture is an IRAP picture, all reference pictures currently in the DPB (if any) are marked as "unused for reference." STRPs are identified by their PicOrderCntVal values. LTRPs are identified by the Log2(MaxLtPicOrderCntLsb) LSBs of their PicOrderCntVal values.

The following applies: for each LTRP entry in RefPicList[0] or RefPicList[1], when the referred picture is an STRP, the picture is marked as "used for long-term reference." Each reference picture in the DPB that is not referred to by any entry in RefPicList[0] or RefPicList[1] is marked as "unused for reference."

Figure 5:
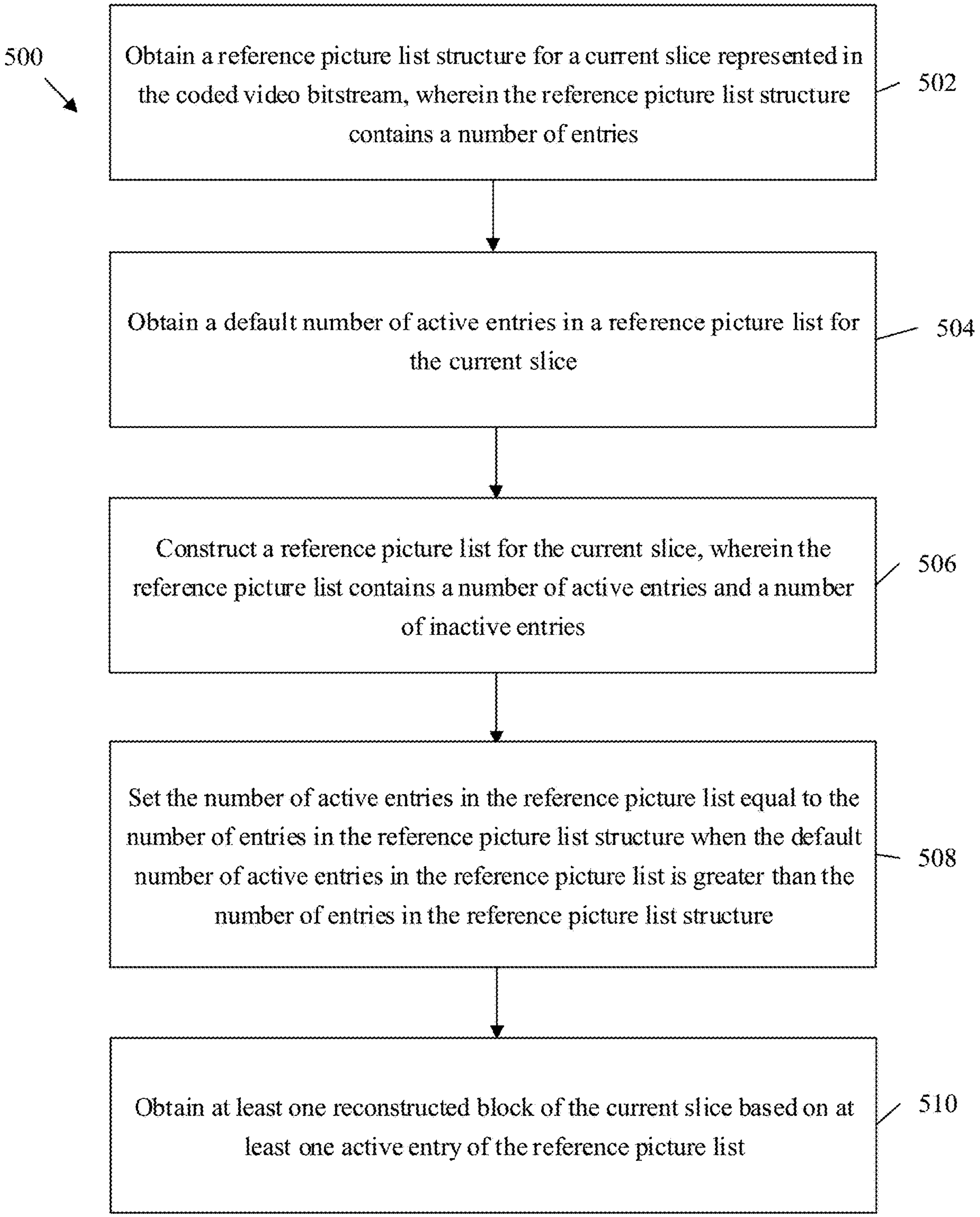
FIG. 5 is an embodiment of a method of decoding a coded video bitstream.

FIG. 5 is an embodiment of a method 500 of decoding a coded video bitstream implemented by a video decoder (e.g., video decoder 30). The method 500 may be performed after the decoded bitstream has been directly or indirectly received from a video encoder (e.g., video encoder 20). The method 500 may be performed to improve the decoding process (e.g., make the decoding process more efficient, faster, etc., than conventional decoding processes) because the number of active entries in the reference picture list is set equal to the number of entries in the reference picture list structure when the default number of active entries in the reference picture list is greater than the number of entries in the reference picture list structure. This is in contrast to the manner in which the reference picture list is handled in HEVC and AVC. Therefore, as a practical matter, the performance of a codec can be improved, which leads to a better user experience.

In block 502, a reference picture list structure is obtained for a current slice represented in the coded video bitstream. In an embodiment, the reference picture list structure contains a number of entries. In an embodiment, an order of entries in the reference picture list structure is the same as an order of corresponding reference pictures in the reference picture list. In an embodiment, the order is from zero to an indicated value. In an embodiment, the indicated value is from zero to a value indicated by sps_max_dec_pic_buffering_minus1.

In block 504, a default number of active entries in a reference picture list is obtained for the current slice. In an embodiment, the reference picture list is designated RefPictList[0] or RefPictList[1].

In block 506, a reference picture list is constructed for the current slice. In an embodiment, the reference picture list contains a number of active entries and a number of inactive entries.

In block 508, the number of active entries in the reference picture list is set equal to the number of entries in the reference picture list structure when the default number of active entries in the reference picture list is greater than the number of entries in the reference picture list structure.

In block 510, at least one reconstructed block of the current slice is obtained based on at least one active entry of the reference picture list. In an embodiment, the at least one reconstructed block is used to generate an image displayed on a display of an electronic device.

In an embodiment, the reference picture list comprises a list of reference pictures used for inter prediction. In an embodiment, the inter prediction is for a P slice or for a B slice.

In an embodiment, the slice header contains a reference picture list sequence parameter set (SPS) flag designated ref_pic_list_sps_flag[i]. When this flag is equal to 1, the i-th reference picture list, i.e., RefPictList[i], is not directly signalled in the slice header but referenced from the SPS. When this flag is equal to 0, the i-th reference picture list, i.e., RefPictList[i], is directly signalled in the slice header, not referenced from the SPS. In an embodiment, the slice header contains a number reference index active override flag designated by num_ref_idx_active_override_flag. When this flag is equal to 1, the number of active entries in each reference picture list is the default value signalled in the PPS. When this flag is equal to 0, the number of active entries in each reference picture lists is the explicitly signalled in the slice header.

In an embodiment, the reference picture list is designated RefPictList[0] or RefPictList[1], and an order of entries in the reference picture list structure is the same as an order of corresponding reference pictures in the reference picture list.

A summary of alternative embodiments based on the first and the second embodiments is provided.

This section provides brief summaries of other alternative embodiments of the disclosure. The summaries are relative to the description of the first embodiment. However, the basic concept of the disclosure for the following alternative embodiments is also applicable for implementation on top of the disclosure for the second embodiment. Such implementation is in the same spirit of how the aspects are implemented on top of the first embodiment.

Semantics of delta POC of short-term reference picture entries.

In one alternative embodiment of the disclosure, the semantic of the syntax element that specifies the delta POC of the i-th entry in a reference picture list structure ref_pic_list_struct( ) is defined as the POC difference between the current picture and the reference picture associated with that i-th entry. Some of the description used herein is relative to the present standard draft (e.g., the VVC working draft) where only the delta is shown or described. Removed text is indicated by strikethrough and any added text is highlighted.

The semantic of delta_poc_st[listIdx][rplsIdx][i] is defined as follows: delta_poc_st[listIdx][rplsIdx][i] specifies the difference between the picture order count values of the current picture and the picture referred to by the i-th entry. The value of delta_poc_st[listIdx][rplsIdx][i] shall be in the range of $-2^{15}$ to $2^{15}-1$, inclusive.

The equation in the reference picture list construction process needs to be updated. The reference picture lists RefPicList[0] and RefPicList[1] are constructed as follows:

```
    for( i = 0; i < 2; i++ ) {
    if( ref_pic_list_sps_flag[ i ] )
        RplsIdx[ i ] = ref_pic_list_idx[ i ]
    else
        RplsIdx[ i ] = num_ref_pic_lists_in_sps[ i ]
    for( j = 0; j < NumEntriesInList[ i ][ RplsIdx[ i ] ]; j++) {
        if( !lt_ref_pic_flag[ i ][ RplsIdx[ i ] ][ j ] ) {
          RefPicPocList[ i ][ j ] = PicOrderCntVal − delta_poc_st[ i ][ RplsIdx[ i ] ][ j ]
          if( there is a reference picture picA in the DPB with PicOrderCntVal equal to
RefPicPocList[ i ][ j ] )
            RefPicList[ i ][ j ] = picA
          else
            RefPicList[ i ][ j ] = "no reference picture"
        } else {
          if( there is a reference picA in the DPB with
PicOrderCntVal & ( MaxLtPicOrderCntLsb − 1 )
              equal to poc_lsb_lt[ i ][ RplsIdx[ i ] ][ j ] )
            RefPicList[ i ][ j ] = picA
          else
            RefPicList[ i ][ j ] = "no reference picture"
      }
  }
}
```

Signaling of long-term reference picture entries.

In one alternative embodiment of the disclosure, long-term reference picture entries are not signaled in the same reference picture list structure that contains short-term reference picture entries. Long-term reference picture entries are signaled in a separate structure and for each entry in the structure there is a syntax element that describes the intended position of the long-term reference picture entry for derivation of the corresponding entry index in the final reference picture list.

Sequence parameter set RBSP syntax.

| | Descriptor |
|---|---|
| seq_parameter_set_rbsp( ) { | |
| sps_seq_parameter_set_id | ue(v) |
| chroma_format_idc | ue(v) |
| if( chroma_format_idc = = 3 ) | |
| separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| log2_max_pic_order_cnt_lsb_minus4 | ue(v) |
| sps_max_dec_pic_buffering_minus1 | ue(v) |
| qtbtt_dual_tree_intra_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| max_mtt_hierarchy_depth_inter_slices | ue(v) |
| max_mtt_hierarchy_depth_intra_slices | ue(v) |
| for( i = 0; i < 2; i++ ) { | |
| num_ref_pic_lists_in_sps[ i ] | ue(v) |
| for( j = 0; j < num_ref_pic_lists_in_sps[ i ]; j++) | |
| ref_pic_list_struct( i, j ) | |
| long_term_ref_pics_flag | u(1) |
| if( long_term_ref_pics_flag ) { | |
| additional_lt_poc_lsb | ue(v) |
| num_ref_pic_lists_lt_in_sps | ue(v) |
| } | |
| for( i = 0; i < num_ref_pic_lists_lt in sps; i++) | |
| ref_pic_list_lt_struct( i) | |
| rbsp_trailing_bits( ) | |
| } | |

Slice header syntax.

| | Descriptor |
|---|---|
| slice_header( ) { | |
| slice_pic_parameter_set_id | ue(v) |
| slice_address | u(v) |
| slice_type | ue(v) |
| if ( slice_type != I ) | |
| log2_diff_ctu_max_bt_size | ue(v) |
| if( nal_unit_type != IRAP_NUT ) { | |
| slice_pic_order_cnt_lsb | u(v) |
| for( i = 0; i < 2; i++ ) { | |
| ref_pic_list_sps_flag[ i ] | u(1) |
| if( ref_pic_list_sps_flag[ i ] ) { | |
| if( num_ref_pic_lists_in_sps[ i ] > 1) | |
| ref_pic_list_idx[ i ] | u(v) |
| if(long_term_ref_pics_flag ) | |
| ref_pic_list_lt_idx[ i ] | u(v) |
| } else { | |
| ref_pic_list_struct( i, num_ref_pic_lists_in_sps[ i ] ) | |
| if(long_term_ref_pics_flag ) | |
| ref_pic_list_lt_struct( num_ref pic_lists_lt_in_sps + 1 ) | |
| } | |
| } | |
| if( slice_type = = P \| \| slice_type = = B ) { | |
| num_ref_idx_active_override_flag | u(1) |
| if( num_ref_idx_active_override_flag ) | |
| for( i= 0; i < ( slice_type = = B ? 2: 1); i++ ) | |
| num_ref_idx_active_minus1[ i ] | ue(v) |
| } | |
| } | |
| byte_alignment( ) | |
| } | |

Reference picture list structure syntax.

| | Descriptor |
|---|---|
| ref_pic_list_struct( listIdx, rplsIdx ) { | |
| num_strp_entries[ listIdx ][ rplsIdx ] | ue(v) |
| for( i = 0; i < NumEntriesInList[ listIdx ][ rplsIdx ]; i++) { | |
| delta_poc_st[ listIdx ][ rplsIdx ][ i ] | se(v) |
| } | |
| } | |

Long-term reference picture list structure syntax.

| | Descriptor |
|---|---|
| ref_pic_list_lt_struct( ltRplsIdx ) { | |
| num_ltrp_entries[ ltRplsIdx ] | ue(v) |
| for( i = 0; i < num_ltrp_entries[ ltRplsIdx ]; i++) { | |
| poc_lsb_lt[ ltRplsIdx ][ i ] | u(v) |
| lt_pos_idx[ ltRplsIdx ][ i ] // specifies the index of this LT ref pic in this RPL | u(v) |
| } | |
| } | |

Sequence parameter set RBSP semantics.

A num_ref_pic_lists_lt_in_sps specifies the number of the ref_pic_list_lt_struct(ltRplsIdx) syntax structures included in the SPS. The value of num_ref_pic_lists_lt_in_sps shall be in the range of 0 to 64, inclusive. When not present, the value of num_ref_pic_lists_lt_in_sps is inferred to be equal to 0.

Slice header semantics.

A ref_pic_list_lt_idx[i] specifies the index into the list of the ref_pic_list_lt_struct(ltRplsIdx) syntax structures included in the active SPS that is used for derivation of reference picture list i of the current picture. The syntax element ref_pic_list_lt_idx[i] is represented by Ceil(Log2 (num_ref_pic_lists_lt_in_sps)) bits. The value of ref_pic_list_lt_idx shall be in the range of 0 to num_ref_pic_lists_lt_in_sps−1, inclusive.

Reference picture list structure semantics.

The ref_pic_list_struct(listIdx, rplsIdx) syntax structure may be present in an SPS or in a slice header. Depending on whether the syntax structure is included in a slice header or an SPS, the following applies: if present in a slice header, the ref_pic_list_struct(listIdx, rplsIdx) syntax structure specifies short-term reference picture list listIdx of the current picture (the picture containing the slice). Otherwise (present in an SPS), the ref_pic_list_struct(listIdx, rplsIdx) syntax structure specifies a candidate for short-term reference picture list listIdx, and the term "the current picture" in the semantics specified in the remainder of this section refers to each picture that 1) has one or more slices containing ref_pic_list_idx[listIdx] equal to an index into the list of the ref_pic_list_struct(listIdx, rplsIdx) syntax structures included in the SPS, and 2) is in a CVS that has the SPS as the active SPS. num_strp_entries[listIdx][rplsIdx] specifies the number of STRP entries in the ref_pic_list_struct(listIdx, rplsIdx) syntax structure.

delta_poc_st[listIdx][rplsIdx][i], when the i-th entry is the first STRP entry in ref_pic_list_struct(listIdx, rplsIdx) syntax structure, specifies the difference between the picture order count values of the current picture and the picture referred to by the i-th entry, or, when the i-th entry is an STRP entry but not the first STRP entry in the ref_pic_list_struct(listIdx, rplsIdx) syntax structure, specifies the difference between the picture order count values of the pictures referred to by the i-th entry and by the previous STRP entry in the ref_pic_list_struct (listIdx, rplsIdx) syntax structure. The value of delta_poc_st[listIdx][rplsIdx][i] shall be in the range of $-2^{15}$ to $2^{15}-1$, inclusive.

Long-term reference picture list structure semantics.

The ref_pic_list_lt_struct(ltRplsIdx) syntax structure may be present in an SPS or in a slice header. Depending on whether the syntax structure is included in a slice header or an SPS, the following applies: if present in a slice header, the ref_pic_list_lt_struct(ltRplsIdx) syntax structure specifies long-term reference picture list of the current picture (the picture containing the slice). Otherwise (present in an SPS), the ref_pic_list_struct(listIdx, rplsIdx) syntax structure specifies a candidate for long-term reference picture list, and the term "the current picture" in the semantics specified in the remainder of this section refers to each picture that 1) has one or more slices containing ref_pic_list_lt_idx[i] equal to an index into the list of the ref_pic_list_lt_struct(ltRplsIdx) syntax structures included in the SPS, and 2) is in a CVS that has the SPS as the active SPS. num_ltrp_entries[ltRplsIdx] specifies the number of LTRP entries in the ref_pic_list_lt_struct(ltRplsIdx) syntax structure. poc_lsb_lt[rplsIdx][i] specifies the value of the picture order count modulo MaxLtPicOrderCntLsb of the picture referred to by the i-th entry in the ref_pic_list_lt_struct(rplsIdx) syntax structure. The length of the poc_lsb_lt[rplsIdx][i] syntax element is Log2 (MaxLtPicOrderCntLsb) bits. lt_pos_idx[rplsIdx][i] specifies the index of the i-th entry in the ref_pic_list_lt_struct (rplsIdx) syntax structure in the reference picture list after reference picture list construction. The length of the lt_pos_idx[rplsIdx][i] syntax element is Log2(sps_max_dec_pic_buffering_minus1+1) bits. When num_ltrp_entries [ltRplsIdx] is greater than 1, poc_lsb_lt[rplsIdx][i] and lt_pos_idx[rplsIdx][i] shall be in the descending order of lt_pos_idx[rplsIdx][i] values.

The decoding process is described.

Decoding process for reference picture lists construction.

This process is invoked at the beginning of the decoding process for each slice of a non-IRAP picture. Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list 1 (i.e., RefPicList[1]) are used in decoding of the slice data. At the beginning of the decoding process for each slice of a non-IRAP picture, the reference picture lists RefPicList[0] and RefPicList[1] are derived. The reference picture lists are used in marking of reference pictures or in decoding of the slice data. For an I slice of a non-IRAP picture that it is not the first slice of the picture, RefPicList[0] and RefPicList[1] may be derived for bitstream conformance checking purpose, but their derivation is not necessary for decoding of the current picture or pictures following the current picture in decoding order. For a P slice that it is not the first slice of a picture, RefPicList[1] may be derived for bitstream conformance checking purpose, but its derivation is not necessary for decoding of the current picture or pictures following the current picture in decoding order. The reference picture lists RefPicList[0] and RefPicList[1] are constructed as follows:

```
for( i = 0; i < 2; i++ ) {
    if( ref_pic_list_sps_flag[ i ] )
        RplsIdx[ i ] = ref_pic_list_idx[ i ]
    else
        RplsIdx[ i ] = num_ref_pic_lists_in_sps[ i ]
    for( j = 0, pocBase = PicOrderCntVal; j < NumEntriesInList[ i ][ RplsIdx[ i ] ]; j++) {
        RefPicPocList[ i ][ j ] = pocBase − delta_poc_st[ i ][ RplsIdx[ i ] ][ j ]
        if( there is a reference picture picA in the DPB with PicOrderCntVal equal to
RefPicPocList[ i ][ j ] )
          RefPicList[ i ][ j ] = picA
        else
          RefPicList[ i ][ j ] = "no reference picture"
        pocBase = RefPicPocList[ i ][ j ]
      }
    if( ref_pic_list_lt_sps_flag[ i ] )
        LtRplsIdx = ref_pic_list_lt_idx[ i]
    else
        LtRplsIdx = num_ref_pic_lists_lt_in_sps[ i ]
    for( j = 0; j < num_ltrp_entries[ LtRplsIdx[ i ] ]; j++) {
        if( there is a reference picA in the DPB with
PicOrderCntVal & ( MaxLtPicOrderCntLsb − 1 ) {
              equal to poc_lsb_lt[ LtRplsIdx[ i ] ][ j ] )
          for( k = sps_max_dec_pic_buffering_minus1; k > lt_pos_idx[ LtRplsIdx[ i ] ] [ j ];
k−−)
            RefPicList[ i ][ k ] = RefPicList[ i ][ k − 1 ]
          RefPicList[ i ][ lt_pos_idx[ LtRplsIdx[ i ] ] [ j ] ] = picA
        } else {
          for( k = sps_max_dec_pic_buffering_minus1; k > lt_pos_idx[ LtRplsIdx[ i ] ] [ j ];
k−−)
            RefPicList[ i ][ k ] = RefPicList[ i ][ k − 1 ]
          RefPicList[ i ][ lt_pos_idx[ RplsIdx[ i ] ] [ j ] ] = "no reference picture"
      }
    }
}
```

For each i equal to 0 or 1, the following applies: the first NumRefIdxActive[i] entries in RefPicList[i] are referred to as the active entries in RefPicList[i], and the other entries in RefPicList[i] are referred to as the inactive entries in RefPicList[i]. Each entry in RefPicList[i][j] for j in the range of 0 to NumEntriesInList[i][RplsIdx[i]]−1, inclusive, is referred to as an STRP entry if lt_ref_pic_flag[i][RplsIdx[i]][j] is equal to 0, and as an LTRP entry otherwise. It is possible that a particular picture is referred to by both an entry in RefPicList[0] and an entry in RefPicList[1]. It is also possible that a particular picture is referred to by more than one entry in RefPicList[0] or by more than one entry in RefPicList[1]. The active entries in RefPicList[0] and the active entries in RefPicList[1] collectively refer to all reference pictures that may be used for inter prediction of the current picture and one or more pictures that follow the current picture in decoding order. The inactive entries in RefPicList[0] and the inactive entries in RefPicList[1] collectively refer to all reference pictures that are not used for inter prediction of the current picture but may be used in inter prediction for one or more pictures that follow the current picture in decoding order. There may be one or more entries in RefPicList[0] or RefPicList[1] that are equal to "no reference picture" because the corresponding pictures are not present in the DPB. Each inactive entry in RefPicList [0] or RefPicList[0] that is equal to "no reference picture" should be ignored. An unintentional picture loss should be inferred for each active entry in RefPicList[0] or RefPicList [1] that is equal to "no reference picture."

It is a requirement of bitstream conformance that the following constraints apply: for each i equal to 0 or 1, the number of entries in RefPicList[i] shall not be less than NumRefIdxActive[i]. The picture referred to by each active entry in RefPicList[0] or RefPicList[1] shall be present in the DPB and shall have TemporalId less than or equal to that of the current picture. Optionally, the following constraint may be further specified: the entry index of any inactive entry in RefPicList[0] or RefPicList[1] shall not be used as a reference index for decoding of the current picture. Optionally, the following constraint may be further specified: an inactive entry in RefPicList[0] or RefPicList[1] shall not refer to the same picture as any other entry in RefPicList [0] or RefPicList[1]. An STRP entry in RefPicList[0] or RefPicList[1] of a slice of a picture and an LTRP entry in RefPicList[0] or RefPicList[1] of the same slice or a different slice of the same picture shall not refer to the same picture. The current picture itself shall not be referred to by any entry in RefPicList[0] or RefPicList[1]. There shall be no LTRP entry in RefPicList[0] or RefPicList[1] for which the difference between the PicOrderCntVal of the current picture and the PicOrderCntVal of the picture referred to by the entry is greater than or equal to 224. Let setOfRefPics be the set of unique pictures referred to by all entries in RefPicList[0] and all entries in RefPicList[1]. The number of pictures in setOfRefPics shall be less than or equal to sps_max_dec_pic_buffering_minus1 and setOfRefPics shall be the same for all slices of a picture.

Signaling of the number of short-term reference picture entries is discussed.

In one alternative embodiment of the disclosure, the syntax element that specifies the number of entries associated with short-term reference pictures in a reference picture list structure ref_pic_list_struct( ) is defined as num_strp_entries_minus1[listIdx][rplsIdx], instead of num_strp_entries[listIdx][rplsIdx]. The change has two effects for the signaling of reference picture list: It may save bits for signaling the number of entries associated with short-term reference picture in the reference picture list structure as the element is coded using ue(v). It implicitly imposes a constraint such that each reference picture list shall contain at least one short-term reference picture. To accommodate this idea some changes relative to the first embodiment are needed.

For reference picture list signaling in slice headers, only the necessary reference picture list is signaled according to the slice type, i.e., one reference picture list (i.e., reference picture list 0) for I or P slices and two reference picture lists (i.e., both reference picture list 0 and reference picture list 1) for B slices. The slice header syntax is changed as follows:

| | Descriptor |
|---|---|
| slice_header( ) { | |
|   slice_pic_parameter_set_id | ue(v) |
|   slice_address | u(v) |
|   slice_type | ue(v) |
|   if ( slice_type != I ) | |
|     log2_diff_ctu_max_bt_size | ue(v) |
|   if( nal_unit_type != IRAP_NUT ) { | |
|     slice_pic_order_cnt_lsb | u(v) |
|     for( i = 0; i < ( slice_type = = B ? 2: 1 ); i++ ) { | |
|       ref_pic_list_sps_flag[ i ] | u(1) |
|       if( ref_pic_list_sps_flag[ i ] ) { | |
|         if( num_ref_pic_lists_in_sps[ i ] > 1) | |
|           ref_pic_list_idx[ i ] | u(v) |
|       } else | |
|         ref_pic_list_struct( i, num_ref_pic_lists_in_sps[ i ], long_term_ref_pics_flag ) | |
|     } | |
|     if( slice_type = = P \| \| slice_type = = B ) { | |
|       num_ref_idx_active_override_flag | u(1) |
|       if( num_ref_idx_active_override_flag ) | |
|         for( i= 0; i < ( slice_type = = B ? 2: 1); i++ ) | |
|           num_ref_idx_active_minus1[ i ] | ue(v) |
|     } | |
|   } | |
|   byte_alignment( ) | |
| } | |

By applying the above change in slice header (i.e., reference picture list 0 for I or P slices; reference picture 0 and reference picture 1 for B slices), it would avoid the scheme from the problem where for a P slice there is only one short-term reference picture. However, a duplicated short-term reference picture cannot be signaled in reference picture list 0 and reference picture list 1, where the entry in reference picture list 1 is an inactive entry as the number of active entries in reference picture list 1 has to be equal to 0. The semantic of num_strp_entries_minus1[listIdx][rplsIdx] is changed as follows: num_strp_entries_minus1[listIdx] [rplsIdx] plus 1 specifies the number of STRP entries in the ref_pic_list_struct(listIdx, rplsIdx, ltrpFlag) syntax structure. The variable NumEntriesInList[listIdx][rplsIdx] is derived as follows: NumRefPicEntriesInRpl[listIdx][rplsIdx]=num_strp_entries_minus1[listIdx][rplsIdx]+1+ num_ltrp_entries[listIdx][rplsIdx]. The value of NumRefPicEntries[listIdx][rplsIdx] shall be in the range of 1 to sps_max_dec_pic_buffering_minus1, inclusive.

Allowing inclusion of the current picture in reference picture lists.

In one alternative embodiment of the disclosure, the current picture is allowed to be included in its reference picture lists. To support this feature, there is no syntax and semantics change required relative to those descriptions in the first and the second embodiments. However, the bitstream conformance constraints which are described in the decoding process for reference picture list construction would need to be modified as follows: It is a requirement of bitstream conformance that the following constraints apply: For each i equal to 0 or 1, NumEntriesInList[i][RplsIdx[i]] shall not be less than NumRefIdxActive[i]. The picture referred to by each active entry in RefPicList[0] or RefPicList[1] shall be present in the DPB and shall have TemporalId less than or equal to that of the current picture. Optionally, the following constraint may be further specified: The entry index of any inactive entry in RefPicList[0] or RefPicList[1] shall not be used as a reference index for decoding of the current picture. Optionally, the following constraint may be further specified: An inactive entry in RefPicList[0] or RefPicList[1] shall not refer to the same picture as any other entry in RefPicList[0] or RefPicList[1]. An STRP entry in RefPicList[0] or RefPicList[1] of a slice of a picture and an LTRP entry in RefPicList[0] or RefPicList[1] of the same slice or a different slice of the same picture shall not refer to the same picture. When the current picture is referred to by an entry in RefPicList[i], for i equal to 0 or 1, the entry index shall be less than NumRefIdxActive[i]. There shall be no LTRP entry in RefPicList[0] or RefPicList[1] for which the difference between the PicOrderCntVal of the current picture and the PicOrderCntVal of the picture referred to by the entry is greater than or equal to 224. Let setOfRefPics be the set of unique pictures referred to by all entries in RefPicList[0] and all entries in RefPicList[1]. If the current picture is not included in the setOfRefPics, the number of pictures in setOfRefPics shall be less than or equal to sps_max_dec_pic_buffering_minus1, otherwise, the number of pictures in setOfRefPics shall be less than or equal to sps_max_dec_pic_buffering_minus1+1. The setOfRefPics shall be the same for all slices of a picture.

Using different POC LSB bits for LTRP entries in reference picture lists.

In one alternative embodiment of the disclosure, the number of bits used to identify long-term reference pictures in a reference picture list structure is allowed to be different between reference picture list 0 and reference picture list 1. To support this feature, the following changes are needed:

| | Descriptor |
|---|---|
| seq_parameter_set_rbsp( ) { | |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   bit_depth_luma_minus8 | ue(v) |
|   bit_depth_chroma_minus8 | ue(v) |
|   log2_max_pic_order_cnt_lsb_minus4 | ue(v) |
|   sps_max_dec_pic_buffering_minus1 | ue(v) |
|   qtbtt_dual_tree_intra_flag | ue(v) |
|   log2_ctu_size_minus2 | ue(v) |
|   log2_min_qt_size_intra_slices_minus2 | ue(v) |
|   log2_min_qt_size_inter_slices_minus2 | ue(v) |
|   max_mtt_hierarchy_depth_inter_slices | ue(v) |
|   max_mtt_hierarchy_depth_intra_slices | ue(v) |
|   long_term_ref_pics_flag | u(1) |
|   for( i = 0; i < 2; i++) { | |
|     if( long_term_ref_pics_flag ) | |
|       additional_lt_poc_lsb[ i ] | ue(v) |
|     num_ref_pic_lists_in_sps[ i ] | ue(v) |
|     for( j = 0; j < num_ref_pic_lists_in_sps[ i ]; j++) | |
|       ref_pic_list_struct( i, j, long_term_ref_pics_flag ) | |
|   } | |
|   rbsp_trailing_bits( ) | |
| } | |

An additional_lt_poc_lsb[i] specifies the value of the variable MaxLtPicOrderCntLsb[i] that is used in the decoding process for reference picture list listIdx equal to i as follows: MaxLtPicOrderCntLsb[i]=2(log2_max_pic_order_cnt_lsb_minus4+4+additional_lt_poc_lsb[i]). The value of additional_lt_poc_lsb[i] shall be in the range of 0 to 32-log2_max_pic_order_cnt_lsb_minus4-4, inclusive. When not present, the value of additional_lt_poc_lsb[i] is inferred to be equal to 0.

A poc_lsb_lt[listIdx][rplsIdx][i] specifies the value of the picture order count modulo MaxLtPicOrderCntLsb[listIdx] of the picture referred to by the i-th entry in the ref_pic_list_struct(listIdx, rplsIdx, ltrpFlag) syntax structure. The length of the poc_lsb_lt[listIdx][rplsIdx][i] syntax element is Log2 (MaxLtPicOrderCntLsb[listIdx]) bits.

The reference picture lists RefPicList[0] and RefPicList [1] are constructed as follows:

```
for( i = 0; i < 2; i++ ) {
    if( ref_pic_list_sps_flag[ i ] )
        RplsIdx[ i ] = ref_pic_list_idx[ i ]
    else
        RplsIdx[ i ] = num_ref_pic_lists_in_sps[ i ]
    for( j = 0, pocBase = PicOrderCntVal; j < NumEntriesInList[ i ][ RplsIdx[ i ] ]; j++) {
        if( !lt_ref_pic_flag[ i ][ RplsIdx[ i ] ][ j ] ) {
          RefPicPocList[ i ][ j ] = pocBase − delta_poc_st[ i ][ RplsIdx[ i ] ][ j ]
          if( there is a reference picture picA in the DPB with PicOrderCntVal equal to
RefPicPocList[ i ][ j ] )
            RefPicList[ i ][ j ] = picA
          else
            RefPicList[ i ][ j ] = "no reference picture"
          pocBase = RefPicPocList[ i ][ j ]
        } else {
          if( there is a reference picA in the DPB with
```

-continued

```
PicOrderCntVal & ( MaxLtPicOrderCntLsb[ i ] − 1)
                    equal to poc_lsb_lt[ i ][ RplsIdx[ i ] ][ j ] )
                RefPicList[ i ][ j ] = picA
            else
                RefPicList[ i ][ j ] = "no reference picture"
        }
    }
}
```

Using the same ref_pic_list_sps_flag for reference picture lists 0 and 1.

In one alternative embodiment of the disclosure, instead of using two flags to indicate whether reference picture list 0 and reference picture list 1 are derived based ref_pic_list_struct( ) syntax structures in the active SPS, one flag is used for both reference picture lists. Such alternative constrains that either both reference picture lists are derived based on ref_pic_list_struct( ) in the active SPS or they are derived based on ref_pic_list_struct( ) syntax structures that are directly included in the slice headers of the current picture. To support this feature, the following changes are needed:

| | Descriptor |
|---|---|
| slice_header( ) { | |
| slice_pic_parameter_set_id | ue(v) |
| slice_address | u(v) |
| slice_type | ue(v) |
| if ( slice_type != I ) | |
| log2_diff_ctu_max_bt_size | ue(v) |
| if( nal_unit_type != IRAP_NUT ) { | |
| slice_pic_order_cnt_lsb | u(v) |
| ref_pic_list_sps_flag | u(1) |
| for( i = 0; i < 2; i++ ) { | |
| if( ref_pic_list_sps_flag) { | |
| if( num_ref_pic_lists_in_sps[ i ] > 1) | |
| ref_pic_list_idx[ i ] | u(v) |
| } else | |
| ref_pic_list_struct( i, num_ref_pic_lists_in_sps[ i ], long_term_ref_pics_flag ) | |
| } | |
| if( slice_type = = P \| \| slice_type = = B ) { | |
| num_ref_idx_active_override_flag | u(1) |
| if( num_ref_idx_active_override_flag ) | |
| for( i= 0; i < ( slice_type = = B ? 2: 1 ); i++ ) | |
| num_ref_idx_active_minus1[ i ] | ue(v) |
| } | |
| } | |
| byte_alignment( ) | |
| } | |

A ref_pic_list_sps_flag equal to 1 specifies that reference picture lists of the current picture are derived based on the ref_pic_list_struct(listIdx, rplsIdx, ltrpFlag) syntax structures in the active SPS. ref_pic_list_sps_flag equal to 0 specifies that reference picture lists of the current picture are derived based on the ref_pic_list_struct(listIdx, rplsIdx, ltrpFlag) syntax structures that are directly included in the slice headers of the current picture. When either num_ref_pic_lists_in_sps[0] or num_ref_pic_lists_in_sps[1] is equal to 0, the value of ref_pic_list_sps_flag shall be equal to 0. pic_lists_in_sps[1] is equal to 0, the value of ref_pic_list_sps_flag shall be equal to 0.

The reference picture lists RefPicList[0] and RefPicList[1] are constructed as follows:

```
for( i = 0; i < 2; i++ ) {
    if( ref_pic_list_sps_flag )
        RplsIdx[ i ] = ref_pic_list_idx[ i ]
    else
        RplsIdx[ i ] = num_ref_pic_lists_in_sps[ i ]
  for( j = 0, pocBase = PicOrderCntVal; j < NumEntriesInList[ i ][ RplsIdx[ i ] ]; j++) {
        if( !lt_ref_pic_flag[ i ][ RplsIdx[ i ] ][ j ] ) {
            RefPicPocList[ i ][ j ] = pocBase − delta_poc_st[ i ][ RplsIdx[ i ] ][ j ]
            if( there is a reference picture picA in the DPB with PicOrderCntVal equal to
RefPicPocList[ i ][ j ] )
                RefPicList[ i ][ j ] = picA
            else
```

-continued

```
            RefPicList[ i ][ j ] = "no reference picture"
          pocBase = RefPicPocList[ i ][ j ]
        } else {
          if( there is a reference picA in the DPB with
PicOrderCntVal & ( MaxLtPicOrderCntLsb − 1 )
              equal to poc_lsb_lt[ i ][ RplsIdx[ i ] ][ j ] )
            RefPicList[ i ][ j ] = picA
          else
            RefPicList[ i ][ j ] = "no reference picture"
        }
      }
}
```

Signaling of delta POC Most Significant Bit (MSB) for long-term reference picture entries.

In one alternative embodiment of the disclosure, instead of using additional bits to represent POC LSB of long-term reference picture entries in ref_pic_list_struct( ) POC MSB cycle is signaled to differentiate long-term reference pictures. When signaled, POC MSB cycle information is signaled for each entry in ref_pic_list_struct( ) that refers to a long-term reference picture. The ref_pic_list_struct( ) syntax structure is not signaled in SPS but only in slice headers. To support this feature, the following changes are needed:

| | Descriptor |
|---|---|
| seq_parameter_set_rbsp( ) { | |
| sps_seq_parameter_set_id | ue(v) |
| chroma_format_idc | ue(v) |
| if( chroma_format idc = = 3 ) | |
| separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| log2_max_pic_order_cnt_lsb_minus4 | ue(v) |
| sps_max_dec_pic_buffering_minus1 | ue(v) |
| qtbtt_dual_tree_intra_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| max_mtt_hierarchy_depth_inter_slices | ue(v) |
| max_mtt_hierarchy_depth_intra_slices | ue(v) |
| long_term_ref_pics_flag | u(1) |
| rbsp_trailing_bits( ) | |
| } | |

| | Descriptor |
|---|---|
| slice_header( ) { | |
| slice_pic_parameter_set_id | ue(v) |
| slice_address | u(v) |
| slice_type | ue(v) |
| if ( slice_type != I ) | |
| log2_diff_ctu_max_bt_size | ue(v) |
| if( nal_unit_type != IRAP_NUT ) { | |
| slice_pic_order_cnt_lsb | u(v) |
| for( i = 0; i < 2; i++ ) { | |
| ref_pic_list_struct( i, long_term_ref_pics_flag ) | |
| } | |
| if( slice_type = = P \| \| slice_type = = B ) { | |
| num_ref_idx_active_override_flag | u(1) |
| if( num_ref_idx_active_override_flag ) | |
| for( i = 0; i < ( slice_type = = B ? 2: 1 ); i++ ) | |
| num_ref_idx_active_minus1[ i ] | ue(v) |
| } | |
| } | |
| byte_alignment( ) | |
| } | |

| | Descriptor |
|---|---|
| ref_pic_list_struct( listIdx, ltrpFlag ) { | |
| num_strp_entries[ listIdx ] | ue(v) |
| if( ltrpFlag ) | |
| num_ltrp_entries[ listIdx ] | ue(v) |
| for( i = 0; i < NumEntriesInList[ listIdx ]; i++) { | |
| if( num_ltrp_entries[ listIdx ] > 0 ) | |
| lt_ref_pic_flag[ listIdx ] [ i ] | |
| if( !lt_ref_pic_flag[ listIdx ] [ i ] ) | |
| delta_poc_st[ listIdx ] [ i ] | se(v) |
| else { | |
| poc_lsb_lt[ listIdx ] [ i ] | u(v) |
| delta_poc_msb_present_flag[ listIdx ][ i ] | u(1) |
| if( delta_poc_msb_present_flag[ listIdx ][ i ] ) | |
| delta_poc_msb_cycle_lt[ listIdx ][ i ] | ue(v) |
| } | |
| } | |
| } | |

The ref_pic_list_struct(listIdx, ltrpFlag) syntax structure may be present in a slice header. When it is present in a slice header, the ref_pic_list_struct(listIdx, ltrpFlag) syntax structure specifies reference picture list listIdx of the current picture (the picture containing the slice). num_strp_entries [listIdx] specifies the number of STRP entries in the ref_pic_list_struct(listIdx, ltrpFlag) syntax structure. num_ltrp_entries[listIdx] specifies the number of LTRP entries in the ref_pic_list_struct(listIdx, ltrpFlag) syntax structure. When not present, the value of num_ltrp_entries[listIdx] [rplsIdx] is inferred to be equal to 0.

The variable NumEntriesInList[listIdx] is derived as follows:

NumRefPicEntriesInRpl[listIdx]=num_strp_entries [listIdx]+num_ltrp_entries[listIdx]

The value of NumRefPicEntries[listIdx] shall be in the range of 0 to sps_max_dec_pic_buffering_minus1, inclusive. lt_ref_pic_flag[listIdx][i] equal to 1 specifies that the i-th entry in the ref_pic_list_struct(listIdx, ltrpFlag) syntax structure is an LTRP entry. lt_ref_pic_flag[listIdx][i] equal to 0 specifies that the i-th entry in the ref_pic_list_struct (listIdx, ltrpFlag) syntax structure is an STRP entry. When not present, the value of lt_ref_pic_flag[listIdx][i] is inferred to be equal to 0. It is a requirement of bitstream conformance that the sum of lt_ref_pic_flag[listIdx][i] for all values of i in the range of 0 to NumRefPicEntries[listIdx]−1, inclusive, shall be equal to num_ltrp_entries[listIdx]. delta_poc_st [listIdx][i], when the i-th entry is the first STRP entry in ref_pic_list_struct(listIdx, ltrpFlag) syntax structure, specifies the difference between the picture order count values of the current picture and the picture referred to by the i-th entry, or, when the i-th entry is an STRP entry but not the first STRP entry in the ref_pic_list_struct(listIdx, ltrpFlag) syntax structure, specifies the difference between the picture order count values of the pictures referred to by the i-th entry and by the previous STRP entry in the ref_pic_list_struct (listIdx, ltrpFlag) syntax structure. The value of delta_poc_st [listIdx][i] shall be in the range of $-2^{15}$ to $2^{15}-1$, inclusive. poc_lsb_lt[listIdx][i] specifies the value of the picture order count modulo MaxLtPicOrderCntLsb of the picture referred to by the i-th entry in the ref_pic_list_struct(listIdx, ltrpFlag) syntax structure. The length of the poc_lsb_lt[listIdx][i] syntax element is Log2(MaxPicOrderCntLsb) bits. delta_poc_msb_present_flag[listIdx][i] equal to 1 specifies that delta_poc_msb_cycle_lt[listIdx][i] is present. delta_poc_msb_present_flag[listIdx][i] equal to 0 specifies that delta_poc_msb_cycle_lt[listIdx][i] is not present. When num_ltrp_entries[listIdx] is greater than 0 and there is more than one reference picture in the DPB at the time when this slice header is decoded for which PicOrderCntVal modulo MaxPicOrderCntLsb is equal to poc_lsb_lt[listIdx][i], delta_poc_msb_present_flag[listIdx][i] shall be equal to 1. When not present, the value of delta_poc_msb_cycle_lt [listIdx][i] is inferred to be equal to 0. delta_poc_msb_cycle_lt[listIdx][i] is used to determine the value of the most significant bits of the picture order count value of the i-th entry in the ref_pic_list_struct(listIdx, ltrpFlag) syntax structure. When delta_poc_msb_cycle_lt[listIdx][i] is not present, it is inferred to be equal to 0. Changes to the decoding process for picture order count:

The reference picture lists RefPicList[0] and RefPicList [1] are constructed as follows:

```
for( i = 0; i < 2; i++ ) {
        for( j = 0, pocBase = PicOrderCntVal; j < NumEntriesInList[ i ]; j++) {
        if( !lt_ref_pic_flag[ i ] [ j ] ) {
           RefPicPocList[ i ][ j ] = pocBase − delta_poc_st[ i ] [ j ]
           if( there is a reference picture picA in the DPB with PicOrderCntVal equal to
RefPicPocList[ i ][ j ] )
              RefPicList[ i ][ j ] = picA
           else
              RefPicList[ i ][ j ] = "no reference picture"
           pocBase = RefPicPocList[ i ][ j ]
        } else {
           if( delta_poc_msb_cycle_lt[ i ][ j ] is equal to 0 &&
                 there is a reference picture picA in the DPB with PicOrderCntVal &
                 ( MaxPicOrderCntLsb − 1 ) equal to poc_lsb_lt[ i ][ j ] )
              RefPicList[ i ][ j ] = picA
           else if( delta_poc_msb_cycle_lt[ i ][ j ] is equal to 1 &&
                 there is a reference picture picA in the DPB with PicOrderCntVal equal to
( MaxPicOrderCntLsb * delta_poc_msb_cycle_lt[ i ][ j ] ) + poc_lsb_lt[ i ][ j] ) )
              RefPicList[ i ][ j ] = picA
           else
              RefPicList[ i ][ j ] = "no reference picture"
      }
    }
}
```

Alternatively, the semantics of delta_poc_msb_cycle_lt [listIdx][i] can be expressed as delta of delta such that the reference picture list construction can be updated as follows: the reference picture lists RefPicList[0] and RefPicList[1] are constructed as follows:

```
for( i = 0; i < 2; i++ ) {
        prevMsbCycle = 0
    for( j = 0, pocBase = PicOrderCntVal; j < NumEntriesInList[ i ]; j++) {            (8-5)
        if( !lt_ref_pic_flag[ i ] [ j ] ) {
           RefPicPocList[ i ][ j ] = pocBase − delta_poc_st[ i ] [ j ]
           if( there is a reference picture picA in the DPB with PicOrderCntVal equal to
RefPicPocList[ i ][ j ] )
              RefPicList[ i ][ j ] = picA
           else
              RefPicList[ i ][ j ] = "no reference picture"
           pocBase = RefPicPocList[ i ][ j ]
        } else {
           if( delta_poc_msb_cycle_lt[ i ][ j ] is equal to 0 &&
                 there is a reference picture picA in the DPB with PicOrderCntVal &
                 ( MaxPicOrderCntLsb − 1 ) equal to poc_lsb_lt[ i ][ j ] )
              RefPicList[ i ][ j ] = picA
           else if( delta_poc_msb_cycle_lt[ i ][ j ] is equal to 1 &&
                 there is a reference picA in the DPB with       PicOrderCntVal equal to
                 ( MaxPicOrderCntLsb * ( delta_poc_msb_cycle_lt[ i ][ j ] +
prevMsbCycle ) )
              + poc_lsb_lt[ i ][ j ] ) ) {
              RefPicList[ i ][ j ] = picA
              prevMsbCycle += delta_poc_msb_cycle_lt[ i ][ j ]
           } else
              RefPicList[ i ][ j ] = "no reference picture"
        }
    }
}
```

It is a requirement of bitstream conformance that the following constraints apply: for each i equal to 0 or 1, NumEntriesInList[i][RplsIdx[i]] shall not be less than NumRefIdxActive[i]. The picture referred to by each active entry in RefPicList[0] or RefPicList[1] shall be present in the DPB and shall have TemporalId less than or equal to that of the current picture. Optionally, the following constraint may be further specified: the entry index of any inactive entry in RefPicList[0] or RefPicList[1] shall not be used as a reference index for decoding of the current picture. Optionally, the following constraint may be further specified: An inactive entry in RefPicList[0] or RefPicList[1] shall not refer to the same picture as any other entry in RefPicList[0] or RefPicList[1]. An STRP entry in RefPicList[0] or RefPicList[1] of a slice of a picture and an LTRP entry in RefPicList[0] or RefPicList[1] of the same slice or a different slice of the same picture shall not refer to the same picture. The current picture itself shall not be referred to by any entry in RefPicList[0] or RefPicList[1]. There shall be no LTRP entry in RefPicList[0] or RefPicList[1] for which the difference between the PicOrderCntVal of the current picture and the PicOrderCntVal of the picture referred to by the entry is greater than or equal to 224. Let setOfRefPics be the set of unique pictures referred to by all entries in RefPicList[0] and all entries in RefPicList[1]. The number of pictures in setOfRefPics shall be less than or equal to sps_max_dec_pic_buffering_minus1 and setOfRefPics shall be the same for all slices of a picture.

Each STRP is identified by its PicOrderCntVal value. For each LTRP, if it is referred to by an entry in RefPicList[0] or RefPicList[1] with delta_poc_msb_present_flag[listIdx][i] equal to 1, it is identified by its PicOrderCntVal value, otherwise, it is identified by Log2(MaxPicOrderCntLsb) LSBs of its PicOrderCntVal value.

Alternative 1 of signaling of delta POC MSB for long-term reference picture entries.

This embodiment provides an alternative to the embodiment described in the previous section. Similar to the idea in the previous section, instead of using additional bits to represent POC LSB of long-term reference picture in ref_pic_list_struct( ), POC MSB cycle is signaled to differentiate long-term reference pictures. However, in this alternative, when signaled, POC MSB cycle information is not signaled within ref_pic_list_struct( ), instead, when POC MSB cycle information is needed, it is signaled in slice header. The ref_pic_list_struct( ) syntax structure may be signaled in the SPS and in slice headers.

| | Descriptor |
|---|---|
| seq_parameter_set_rbsp( ) { | |
| sps_seq_parameter_set_id | ue(v) |
| chroma_format_idc | ue(v) |
| if( chroma_format idc = = 3 ) | |
| separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| log2_max_pic_order_cnt_lsb_minus4 | ue(v) |
| sps_max_dec_pic_buffering_minus1 | ue(v) |
| qtbtt_dual_tree_intra_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| max_mtt_hierarchy_depth_inter_slices | ue(v) |
| max_mtt_hierarchy_depth_intra_slices | ue(v) |
| long_term_ref_pics_flag | u(1) |
| for( i = 0; i < 2; i++) { | |
| num_ref_pic_lists_in_sps[ i ] | ue(v) |
| for( j = 0; j < num_ref_pic_lists_in_sps[ i ]; j++) | |
| ref_pic_list_struct( i, j, long_term_ref_pics_flag ) | |
| } | |
| rbsp_trailing_bits( ) | |
| } | |

| | Descriptor |
|---|---|
| slice_header( ) { | |
| slice_pic_parameter_set_id | ue(v) |
| slice_address | u(v) |
| slice_type | ue(v) |
| if ( slice_type != I ) | |
| log2_diff_ctu_max_bt_size | ue(v) |
| if( nal_unit_type != IRAP_NUT ) { | |
| slice_pic_order_cnt_lsb | u(v) |
| for( i = 0; i < 2; i++ ) { | |
| ref_pic_list_sps_flag[ i ] | u(1) |
| if( ref_pic_list_sps_flag[ i ] ) { | |
| if( num_ref_pic_lists_in_sps[ i ] > 1) | |
| ref_pic_list_idx[ i ] | u(v) |
| } else | |
| ref_pic_list_struct( i, num_ref_pic_lists_in_sps[ i ], long_term_ref_pics_flag ) | |
| if( long_term_ref_pics_flag ) { | |
| NumLtrpEntries[ i ] = ref_pic_list_sps_flag[ i ] ? | |
| num_ltrp_entries[ i ][ ref_pic_list_idx[ i ] ] : | |
| num_ltrp_entries[ i ][ num_ref pic_lists_in_sps[ i ] ] | |
| for( j = 0; j < NumLtrpEntries[ i ]; j++ ) { | |
| delta_poc_msb_present_flag[ i ][ j ] | u(1) |
| if( delta_poc_msb_present_flag[ i ][ j ] ) | |
| delta_poc_msb_cycle_lt[ i ][ j ] | ue(v) |
| } | |
| } | |
| } | |
| if( slice_type = = P \| \| slice_type = = B ) { | |
| num_ref_idx_active_override_flag | u(1) |
| if( num_ref_idx_active_override_flag ) | |

-continued

```
                                                                Descriptor
      for( i = 0; i < ( slice_type = = B ? 2: 1 ); i++ )
        num_ref_idx_active_minus1[ i ]                          ue(v)
    }
  }
  byte_alignment( )
}
```

A delta_poc_msb_present_flag[i][j] equal to 1 specifies that delta_poc_msb_cycle_lt[i][j] is present. delta_poc_msb_present_flag[i][j] equal to 0 specifies that delta_poc_msb_cycle_lt[i][j] is not present. When NumLtrpEntries[i] is greater than 0 and for the j-th LTRP entry in the ref_pic_list_struct(i, rplsIdx, 1) syntax structure there is more than one reference picture in the DPB at the time when this slice header is decoded for which PicOrderCntVal modulo MaxPicOrderCntLsb is equal to poc_lsb_lt[i][rplsIdx][jj], where jj is the entry index of the entry in the ref_pic_list_struct(i, rplsIdx, 1) syntax structure that is the j-th LTRP entry in the ref_pic_list_struct(i, rplsIdx, 1) syntax structure, delta_poc_msb_present_flag[i][j] shall be equal to 1. When not present, the value of delta_poc_msb_cycle_lt[i][j] is inferred to be equal to 0. delta_poc_msb_cycle_lt[i][j] is used to determine the value of the most significant bits of the picture order count value of the j-th LTRP entry in the ref_pic_list_struct(i, rplsIdx, 1) syntax structure. When delta_poc_msb_cycle_lt[i][j] is not present, it is inferred to be equal to 0.

A delta_poc_msb_present_flag[i][j] equal to 1 specifies that delta_poc_msb_cycle_lt[i][j] is present. delta_poc_msb_present_flag[i][j] equal to 0 specifies that delta_poc_msb_cycle_lt[i][j] is not present. When NumLtrpEntries[i] is greater than 0 and there is more than one reference picture in the DPB at the time when this slice header is decoded for which PicOrderCntVal modulo MaxPicOrderCntLsb is equal to poc_lsb_lt[i][rplsIdx][j], delta_poc_msb_present_flag[i][j] shall be equal to 1. When not present, the value of delta_poc_msb_cycle_lt[i][j] is inferred to be equal to 0. delta_poc_msb_cycle_lt[i][j] is used to determine the value of the most significant bits of the picture order count value of the j-th entry in the ref_pic_list_struct(i, rplsIdx, 1) syntax structure. When delta_poc_msb_cycle_lt[i][j] is not present, it is inferred to be equal to 0. poc_lsb_lt[listIdx][rplsIdx][i] specifies the value of the picture order count modulo MaxPicOrderCntLsb of the picture referred to by the i-th entry in the ref_pic_list_struct(listIdx, rplsIdx, ltrpFlag) syntax structure. The length of the poc_lsb_lt[listIdx][rplsIdx][i] syntax element is Log2(MaxPicOrderCntLsb) bits.

```
                                                                Descriptor
slice_header( ) {
  slice_pic_parameter_set_id                                    ue(v)
  slice_address                                                 u(v)
  slice_type                                                    ue(v)
  if ( slice_type != I )
    log2_diff_ctu_max_bt_size                                   ue(v)
  if( nal_unit_type != IRAP_NUT ) {
    slice_pic_order_cnt_lsb                                     u(v)
    for( i = 0; i < 2; i++ ) {
      ref_pic_list_sps_flag[ i ]                                u(1)
      if( ref_pic_list_sps_flag[ i ] ) {
        if( num_ref_pic_lists_in_sps[ i ] > 1)
          ref_pic_list_idx[ i ]                                 u(v)
      } else
        ref_pic_list_struct( i, num_ref_pic_lists_in_sps[ i ], long_term_ref_pics_flag )
      if( long_term_ref_pics_flag ) {
        rplsIdx = ref_pic_list_sps_flag[ i ] ? ref_pic_list_idx[ i ] :
              num_ref_pic_lists_in_sps[ i ]
        numRpEntries[ i ] = num_strp_entries[ i ][ rplsIdx ] +
              num_ltrp_entries[ i ][ rplsIdx ]
        NumLtrpEntries[ i ] = num_ltrp_entries[ i ][ rplsIdx ]
        for( j = 0; j < numRpEntries[ i ]; j++ ) {
          if( lt_ref_pic_flag[ i ][ rplsIdx ][ j ] )
            delta_poc_msb_present_flag[ i ][ j ]                u(1)
          if( delta_poc_msb_present_flag[ i ][ j ] )
            delta_poc_msb_cycle_lt[ i ][ j ]                    ue(v)
        }
      }
    }
    if( slice_type = = P | | slice_type = = B ) {
      num_ref_idx_active_override_flag                          u(1)
      if( num_ref_idx_active_override_flag )
        for( i = 0; i < ( slice_type = = B ? 2: 1 ); i++ )
          num_ref_idx_active_minus1 [ i ]                       ue(v)
    }
  }
  byte_alignment( )
}
```

Changes to the decoding process for picture order count.

For slice header design 1, the reference picture lists RefPicList[0] and RefPicList[1] are constructed as follows:

```
for( i = 0; i < 2; i++ ) {
    if( ref_pic_list_sps_flag[ i ] )
        RplsIdx[ i ] = ref_pic_list_idx[ i ]
    else
        RplsIdx[ i ] = num_ref_pic_lists_in_sps[ i ]
    msbCycleIdx = 0
    for( j = 0, pocBase = PicOrderCntVal; j < NumEntriesInList[ i ][ RplsIdx[ i ] ]; j++) {
        if( !lt_ref_pic_flag[ i ][ RplsIdx[ i ] ][ j ] ) {
            RefPicPocList[ i ][ j ] = pocBase − delta_poc_st[ i ][ RplsIdx[ i ] ][ j ]
            if( there is a reference picture picA in the DPB with PicOrderCntVal equal to
RefPicPocList[ i ][ j ] )
                RefPicList[ i ][ j ] = picA
            else
                RefPicList[ i ][ j ] = "no reference picture"
            pocBase = RefPicPocList[ i ][ j ]
        } else {
            if( delta_poc_msb_cycle_lt[ i ][ msbCycleIdx ] is equal to 0 &&
                there is a reference picture picA in the DPB with PicOrderCntVal &
                ( MaxPicOrderCntLsb − 1 ) equal to poc_lsb_lt[ i ][ RplsIdx[ i ] ][ j ] )
                RefPicList[ i ][ j ] = picA
            else if( delta_poc_msb_cycle_lt[ i ][ msbCycleIdx ] is equal to 1 &&
                there is a reference picture picA in the DPB with PicOrderCntVal equal to
( MaxPicOrderCntLsb *
delta_poc_msb_cycle_lt[ i ][ msbCycleIdx ] ) + poc_lsb_lt[ i ][ RplsIdx[ i ] ][ j ] ) ) {
                RefPicList[ i ][ j ] = picA
                msbCycleIdx++
            } else
                RefPicList[ i ][ j ] = "no reference picture"
        }
    }
}
```

Alternatively, for slice header design 1, the semantics of delta_poc_msb_cycle_lt[listIdx][i] can be expressed as delta of delta such that the reference picture list construction can be updated as follows: The reference picture lists RefPicList[0] and RefPicList[1] are constructed as follows:

```
for( i = 0; i < 2; i++ ) {
    if( ref_pic_list_sps_flag[ i ] )
        RplsIdx[ i ] = ref_pic_list_idx[ i ]
    else
        RplsIdx[ i ] = num_ref_pic_lists_in_sps[ i ]
    pevMsbCycle = 0
    msbCycleIdx = 0
    for( j = 0, pocBase = PicOrderCntVal; j < NumEntriesInList[ i ][ RplsIdx[ i ] ]; j++) {
        if( !lt_ref_pic_flag[ i ][ RplsIdx[ i ] ][ j ] ) {
            RefPicPocList[ i ][ j ] = pocBase − delta_poc_st[ i ][ RplsIdx[ i ] ][ j ]
            if( there is a reference picture picA in the DPB with PicOrderCntVal equal to
RefPicPocList[ i ][ j ] )
                RefPicList[ i ][ j ] = picA
            else
                RefPicList[ i ][ j ] = "no reference picture"
            pocBase = RefPicPocList[ i ][ j ]
        } else {
            if( delta_poc_msb_cycle_lt[ i ][ msbCycleIdx ] is equal to 0 &&
                there is a reference picutre picA in the DPB with PicOrderCntVal &
                ( MaxPicOrderCntLsb − 1 ) equal to poc_lsb_lt[ i ][ RplsIdx[ i ] ][ j ] )
                RefPicList[ i ][ j ] = picA
            else if( delta_poc_msb_cycle_lt[ i ][ msbCycleIdx ] is equal to 1 &&
                there is a reference picture picA in the DPB with PicOrderCntVal equal to
                ( MaxPicOrderCntLsb * ( delta_poc_msb_cycle_lt[ i ][ msbCycleIdx ] +
                prevMsbCycle ) + poc_lsb_lt[ i ][ RplsIdx[ i ] ][ j ] ) ) {
                RefPicList[ i ][ j ] = picA
                prevMsbCycle += delta_poc_msb_cycle_lt[ i ][ msbCycleIdx ]
                msbCycleIdx++
            } else
                RefPicList[ i ][ j ] = "no reference picture"
        }
    }
}
```

For slice header design 2, the reference picture lists RefPicList[0] and RefPicList[1] are constructed as follows:

```
for( i = 0; i < 2; i++ ) {
      if( ref_pic_list_sps_flag[ i ] )
            RplsIdx[ i ] = ref_pic_list_idx[ i ]
      else
            RplsIdx[ i ] = num_ref_pic_lists_in_sps[ i ]
      for( j = 0, pocBase = PicOrderCntVal; j < NumEntriesInList[ i ][ RplsIdx[ i ] ]; j++) {
            if( !lt_ref_pic_flag[ i ][ RplsIdx[ i ] ][ j ] ) {
               RefPicPocList[ i ][ j ] = pocBase − delta_poc_st[ i ][ RplsIdx[ i ] ][ j ]
               if( there is a reference picture picA in the DPB with PicOrderCntVal equal to
RefPicPocList[ i ][ j ] )
                  RefPicList[ i ][ j ] = picA
               else
                  RefPicList[ i ][ j ] = "no reference picture"
               pocBase = RefPicPocList[ i ][ j ]
            } else {
               if( delta_poc_msb_cycle_lt[ i ][ j ] is equal to 0 &&
                     there is a reference picture picA in the DPB with PicOrderCntVal &
                     ( MaxPicOrderCntLsb − 1 ) equal to poc_lsb_lt[ i ][ RplsIdx[ i ] ][ j ] )
                  RefPicList[ i ][ j ] = picA
               else if( delta_poc_msb_cycle_lt[ i ][ j ] is equal to 1 &&
                     there is a reference picture picA in the DPB with PicOrderCntVal equal to
(
                     MaxPicOrderCntLsb *
                     delta_poc_msb_cycle_lt[ i ][ j ] ) + poc_lsb_lt[ i ][ RplsIdx[ i ] ][ j ] ) )
                  RefPicList[ i ][ j ] = picA
               else
                  RefPicList[ i ][ j ] = "no reference picture"
         }
   }
}
```

Alternatively, for slice header design 2, the semantics of delta_poc_msb_cycle_lt[listIdx][i] can be expressed as delta of delta such that the reference picture list construction can be updated as follows: The reference picture lists RefPicList [0] and RefPicList[1] are constructed as follows:

```
for( i = 0; i < 2; i++ ) {
      if( ref_pic_list_sps_flag[ i ] )
            RplsIdx[ i ] = ref_pic_list_idx[ i ]
      else
            RplsIdx[ i ] = num_ref_pic_lists_in_sps[ i ]
      prevMsbCycle = 0
      for( j = 0, pocBase = PicOrderCntVal; j < NumEntriesInList[ i ][ RplsIdx[ i ] ]; j++) {
               if( !lt_ref_pic_flag[ i ][ RplsIdx[ i ] ][ j ] ) {
               RefPicPocList[ i ][ j ] = pocBase − delta_poc_st[ i ][ RplsIdx[ i ] ][ j ]
               if( there is a reference picture picA in the DPB with PicOrderCntVal equal to
RefPicPocList[ i ][ j ] )
                  RefPicList[ i ][ j ] = picA
               else
                  RefPicList[ i ][ j ] = "no reference picture"
               pocBase = RefPicPocList[ i ][ j ]
            } else {
               if( delta_poc_msb_cycle_lt[ i ][ j ] is equal to 0 &&
                     there is a reference picture picA in the DPB with PicOrderCntVal &
                     ( MaxPicOrderCntLsb − 1 ) equal to poc_lsb_lt[ i ][ RplsIdx[ i ] ][ j ] )
                  RefPicList[ i ][ j ] = picA
               else if( delta_poc_msb_cycle_lt[ i ][ msbCycleIdx ] is equal to 1 &&
                     there is a reference picture picA in the DPB with PicOrderCntVal equal to
                     ( MaxPicOrderCntLsb * ( delta_poc_msb_cycle_lt[ i ][ j ] +
                     prevMsbCycle ) + poc_lsb_lt[ i ][ RplsIdx[ i ] ][ j ] ) ) {
                  RefPicList[ i ][ j ] = picA
                  prevMsbCycle += delta_poc_msb_cycle_lt[ i ][ j ]
               } else
                  RefPicList[ i ][ j ] = "no reference picture"
         }
   }
}
```

It is a requirement of bitstream conformance that the following constraints apply: For each i equal to 0 or 1, NumEntriesInList[i][RplsIdx[i]] shall not be less than NumRefIdxActive[i]. The picture referred to by each active entry in RefPicList[0] or RefPicList[1] shall be present in the DPB and shall have TemporalId less than or equal to that of the current picture. Optionally, the following constraint may be further specified: The entry index of any inactive entry in RefPicList[0] or RefPicList[1] shall not be used as a reference index for decoding of the current picture. Optionally, the following constraint may be further specified: An inactive entry in RefPicList[0] or RefPicList[1] shall not refer to the same picture as any other entry in RefPicList[0] or RefPicList[1]. An STRP entry in RefPicList[0] or RefPicList [1] of a slice of a picture and an LTRP entry in RefPicList[0] or RefPicList[1] of the same slice or a different slice of the same picture shall not refer to the same picture. The current picture itself shall not be referred to by any entry in RefPicList[0] or RefPicList[1]. There shall be no LTRP entry in RefPicList[0] or RefPicList[1] for which the difference between the PicOrderCntVal of the current picture to 1, it is identified by its PicOrderCntVal value, otherwise, it is identified by its Log2(MaxPicOrderCntLsb) LSBs of its PicOrderCntVal value.

Alternative 2 of signaling of delta POC MSB for long-term reference picture entries.

In one alternative embodiment of the disclosure, the disclosure described in the first embodiment or the second embodiment can be combined with the embodiments described above and named "Signaling of delta POC MSB for long-term reference picture entries" and "Alternative 1 of signaling of delta POC MSB for long-term reference picture entries," respectively. The aspects of the disclosures to be combined are signaling of additional_lt_poc_lsb (i.e., from the first embodiment or the second embodiment) and POC MSB cycle information (i.e., from the embodiment described above and named "Signaling of delta POC MSB for long-term reference picture entries" or "Alternative 1 of signaling of delta POC MSB for long-term reference picture entries"). One example of how the combination, combining the first embodiment and the embodiment described above and named "Alternative 1 of signaling of delta POC MSB for long-term reference picture entries," can be done is described as follows:

| | Descriptor |
|---|---|
| slice_header( ) { | |
|   slice_pic_parameter_set_id | ue(v) |
|   slice_address | u(v) |
|   slice_type | ue(v) |
|   if ( slice_type != I ) | |
|     log2_diff_ctu_max_bt_size | ue(v) |
|   if( nal_unit_type != IRAP_NUT ) { | |
|     slice_pic_order_cnt_lsb | u(v) |
|     for( i = 0; i < 2; i++ ) { | |
|       ref_pic_list_sps_flag[ i ] | u(1) |
|       if( ref_pic_list_sps_flag[ i ] ) { | |
|         if( num_ref_pic_lists_in_sps[ i ] > 1) | |
|           ref_pic_list_idx[ i ] | u(v) |
|       } else | |
|         ref_pic_list_struct( i, num_ref_pic_lists_in_sps[ i ], long_term_ref_pics_flag ) | |
|       if( long_term_ref_pics_flag ) { | |
|         NumLtrpEntries[ i ] = ref_pic_list_sps_flag[ i ] ? | |
|             num_ltrp_entries[ i ][ ref_pic_list_idx[ i ] ] : | |
|             num_ltrp_entries[ i ][ num_ref_pic_lists_in_sps[ i ] ] | |
|         for( j = 0; j < NnumLtrpEntries[ i ]; j++ ) { | |
|           delta_poc_msb_present_flag[ i ][ j ] | u(1) |
|           if( delta_poc_msb_present_flag[ i ][ j ] ) | |
|             delta_poc_msb_cycle_lt[ i ][ j ] | ue(v) |
|         } | |
|       } | |
|     } | |
|     if( slice_type = = P \| \| slice_type = = B ) { | |
|       num_ref_idx_active_override_flag | u(1) |
|       if( num_ref_idx_active_override_flag ) | |
|         for( i= 0; i < ( slice_type = = B ? 2: 1); i++ ) | |
|           num_ref_idx_active_minus1[ i ] | ue(v) |
|     } | |
|   } | |
|   byte_alignment( ) | |
| } | |

and the PicOrderCntVal of the picture referred to by the entry is greater than or equal to 224. Let setOfRefPics be the set of unique pictures referred to by all entries in RefPicList [0] and all entries in RefPicList[1]. The number of pictures in setOfRefPics shall be less than or equal to sps_max_dec_pic_buffering_minus1 and setOfRefPics shall be the same for all slices of a picture.

Each STRP is identified by its PicOrderCntVal value. For each LTRP, if it is referred to by an entry in RefPicList[0] or RefPicList[1] with delta_poc_msb_present_flag[i][j] equal A delta_poc_msb_present_flag[i][j] equal to 1 specifies that delta_poc_msb_cycle_lt[i][j] is present. delta_poc_msb_present_flag[i][i] equal to 0 specifies that delta_poc_msb_cycle_lt[i][j] is not present. When NumLtrpEntries[i] is greater than 0 and for the j-th LTRP entry in the ref_pic_list_struct(i, rplsIdx, 1) syntax structure there is more than one reference picture in the DPB at the time when this slice header is decoded for which PicOrderCntVal modulo MaxPicOrderLtCntLsb is equal to poc_lsb_lt[i] [rplsIdx][jj], where jj is the entry index of the entry in the ref_pic_list_struct(i, rplsIdx, 1) syntax structure that is the j-th LTRP entry in ref_pic_list_struct(i, rplsIdx, 1) the rplsIdx, syntax structure, delta_poc_msb_present_flag[i][j] shall be equal to 1. When not present, the value of delta_poc_msb_cycle_lt[i][j] is inferred to be equal to 0. delta_poc_msb_cycle_lt[i][j] is used to determine the value of the most significant bits of the picture order count value of the j-th LTRP entry in the ref_pic_list_struct(i, rplsIdx, 1) syntax structure. When delta_poc_msb_cycle_lt[i][j] is not present, it is inferred to be equal to 0.

Changes to the decoding process for picture order count.

The reference picture lists RefPicList[0] and RefPicList[1] are constructed as follows:

```
for( i = 0; i < 2; i++ ) {
    if( ref_pic_list_sps_flag[ i ] )
        RplsIdx[ i ] = ref_pic_list_idx[ i ]
    else
        RplsIdx[ i ] = num_ref_pic_lists_in_sps[ i ]
    msbCycleIdx = 0
    for( j = 0, pocBase = PicOrderCntVal; j < NumEntriesInList[ i ][ RplsIdx[ i ] ]; j++) {
            if( !lt_ref_pic_flag[ i ][ RplsIdx[ i ] ][ j ] ) {
            RefPicPocList[ i ][ j ] = pocBase − delta_poc_st[ i ][ RplsIdx[ i ] ][ j ]
            if( there is a reference picture picA in the DPB with PicOrderCntVal equal to
RefPicPocList[ i ][ j ] )
                RefPicList[ i ][ j ] = picA
            else
                RefPicList[ i ][ j ] = "no reference picture"
            pocBase = RefPicPocList[ i ][ j ]
        } else {
            if( delta_poc_msb_cycle_lt[ i ][ msbCycleIdx ] is equal to 0 &&
                    there is a reference picture picA in the DPB with PicOrderCntVal &
                    ( MaxLtPicOrderCntLsb − 1 ) equal to poc_lsb_lt[ i ][ RplsIdx[ i ] ][ j ] )
                RefPicList[ i ][ j ] = picA
            else if( delta_poc_msb_cycle_lt[ i ][ msbCycleIdx ] is equal to 1 &&
                    there is a reference picture picA in the DPB with PicOrderCntVal equal to
(
                    MaxLtPicOrderCntLsb *
                    delta_poc_msb_cycle_lt[ i ][ msbCycleIdx ]) + poc_lsb_lt[ i ][ RplsIdx[ i ] ][ j ] ) )
{
                RefPicList[ i ][ j ] = picA
                msbCycleIdx++
            } else
                RefPicList[ i ][ j ] = "no reference picture"
        }
    }
}
```

Alternatively, the semantics of delta_poc_msb_cycle_lt[listIdx][i] can be expressed as delta of delta such that the reference picture list construction can be updated as follows: The reference picture lists RefPicList[0] and RefPicList[1] are constructed as follows:

```
for( i = 0; i < 2; i++ ) {
    if( ref_pic_list_sps_flag[ i ] )
        RplsIdx[ i ] = ref_pic_list_idx[ i ]
    else
        RplsIdx[ i ] = num_ref_pic_lists_in_sps[ i ]
    prevMsbCycle = 0
    msbCycleIdx = 0
    for( j = 0, pocBase = PicOrderCntVal; j < NumEntriesInList[ i ][ RplsIdx[ i ] ]; j++) {
        if( !lt_ref_pic_flag[ i ][ RplsIdx[ i ] ][ j ] ) {
            RefPicPocList[ i ][ j ] = pocBase − delta_poc_st[ i ][ RplsIdx[ i ] ][ j ]
            if( there is a reference picture picA in the DPB with PicOrderCntVal equal to
RefPicPocList[ i ][ j ] )
                RefPicList[ i ][ j ] = picA
            else
                RefPicList[ i ][ j ] = "no reference picture"
            pocBase = RefPicPocList[ i ][ j ]
        } else {
            if( delta_poc_msb_cycle_lt[ i ][ msbCycleIdx ] is equal to 0 &&
                there is a reference picture picA in the DPB with PicOrderCntVal &
                ( MaxLtPicOrderCntLsb − 1 ) equal to poc_lsb_lt[ i ][ RplsIdx[ i ] ][ j ] )
                RefPicList[ i ][ j ] = picA
```

-continued

```
            else if( delta_poc_msb_cycle_lt[ i ][ msbCycleIdx ] is equal to 1 &&
                there is a reference picture picA in the DPB with PicOrderCntVal equal to
                ( MaxLtPicOrderCntLsb *
( delta_poc_msb_cycle_lt[ i ][ msbCycleIdx ] +
                prevMsbCycle ) + poc_lsb_lt[ i ][ RplsIdx[ i ] ][ j ] ) ) {
              RefPicList[ i ][ j ] = picA
              prevMsbCycle += delta_poc_msb_cycle_lt[ i ][ msbCycleIdx ]
              msbCycleIdx++
            } else
              RefPicList[ i ][ j ] = "no reference picture"
        }
    }
}
```

It is a requirement of bitstream conformance that the following constraints apply: For each i equal to 0 or 1, NumEntriesInList[i][RplsIdx[i]] shall not be less than NumRefIdxActive[i]. The picture referred to by each active entry in RefPicList[0] or RefPicList[1] shall be present in the DPB and shall have TemporalId less than or equal to that of the current picture. Optionally, the following constraint may be further specified: The entry index of any inactive entry in RefPicList[0] or RefPicList[1] shall not be used as a reference index for decoding of the current picture. Optionally, the following constraint may be further specified: An inactive entry in RefPicList[0] or RefPicList[1] shall not refer to the same picture as any other entry in RefPicList[0] or RefPicList[1]. An STRP entry in RefPicList[0] or RefPicList[1] of a slice of a picture and an LTRP entry in RefPicList[0] or RefPicList[1] of the same slice or a different slice of the same picture shall not refer to the same picture. The current picture itself shall not be referred to by any entry in RefPicList[0] or RefPicList[1]. There shall be no LTRP entry in RefPicList[0] or RefPicList[1] for which the difference between the PicOrderCntVal of the current picture and the PicOrderCntVal of the picture referred to by the entry is greater than or equal to 224. Let setOfRefPics be the set of unique pictures referred to by all entries in RefPicList[0] and all entries in RefPicList[1]. The number of pictures in setOfRefPics shall be less than or equal to sps_max_dec_pic_buffering_minus1 and setOfRefPics shall be the same for all slices of a picture.

Each STRP is identified by its PicOrderCntVal value. For each LTRP, if it is referred to by an entry in RefPicList[0] or RefPicList[1] with delta_poc_msb_present_flag[i][j] equal to 1, it is identified by its PicOrderCntVal value, otherwise, it is identified by its Log2(MaxLtPicOrderCntLsb) LSBs of its PicOrderCntVal value.

Always signaling reference picture lists in slice headers with differentiation between short-term and long-term reference pictures.

This section describes another alternative embodiment of the disclosure. The description is relative to the latest VVC WD (i.e., only the delta relative to the latest VVC WD in JVET-K1001-v1 is described, while the texts in the latest VVC WD that are not mentioned below apply as they are). This alternative embodiment is summarized as follows: Reference picture list structures are signaled only in slice headers. Both short-term reference pictures and long-term reference pictures are identified by their POC LSBs, which may be represented by numbers of bits that are different from the number of bits used for representing the POC LSBs signaled in slice headers for derivation of POC values. Furthermore, the numbers of bits used to represent the POC LSBs for identifying short-term reference pictures and long-term reference pictures may be different.

NAL unit header syntax.

| | Descriptor |
|---|---|
| nal_unit_header( ) { | |
| forbidden_zero_bit | f(1) |
| nal_unit_type | u(5) |
| nuh_temporal_id_plus1 | u(3) |
| nuh_reserved_zero_7bits | u(7) |
| } | |

Sequence parameter set RBSP syntax.

| | Descriptor |
|---|---|
| seq_parameter_set_rbsp( ) { | |
| sps_seq_parameter_set_id | ue(v) |
| chroma_format_idc | ue(v) |
| if( chroma_format_idc = = 3 ) | |
| separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| log2_max_pic_order_cnt_lsb_minus4 | ue(v) |
| sps_max_dec_pic_buffering_minus1 | ue(v) |
| qtbtt_dual_tree_intra_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| max_mtt_hierarchy_depth_inter_slices | ue(v) |
| max_mtt_hierarchy_depth_intra_slices | ue(v) |
| additional_st_poc_lsb | ue(v) |
| long_term_ref_pics_flag | u(1) |
| if( long_term_ref_pics_flag ) | |
| additional_lt_poc_lsb | ue(v) |
| rbsp_trailing_bits( ) | |
| } | |

Picture parameter set RBSP syntax.

| | Descriptor |
|---|---|
| pic_parameter_set_rbsp( ) { | |
| pps_pic_parameter_set_id | ue(v) |
| pps_seq_parameter_set_id | ue(v) |
| for( i = 0; i < 2; i++ ) | |
| num_ref_idx_default_active_minus1[ i ] | ue(v) |
| rbsp_trailing_bits( ) | |
| } | |

Slice header syntax.

| | Descriptor |
|---|---|
| slice_header( ) { | |
| slice_pic_parameter_set_id | ue(v) |
| slice_address | u(v) |
| slice_type | ue(v) |
| if ( slice_type != I ) | |
| log2_diff_ctu_max_bt_size | ue(v) |
| if( nal_unit_type != IRAP_NUT ) { | |
| slice_pic_order_cnt_lsb | u(v) |
| for( i = 0; i < 2; i++ ) | |
| ref_pic_list_struct( i, long_term_ref_pics_flag ) | |
| if( slice_type = = P \| \| slice_type = = B ) { | |
| num_ref_idx_active_override_flag | u(1) |
| if( num_ref_idx_active_override_flag ) | |
| for( i = 0; i < ( slice_type = = B ? 2: 1 ); i++ ) | |
| num_ref_idx_active_minus1[ i ] | ue(v) |
| } | |
| } | |
| byte_alignment( ) | |
| } | |

Reference picture list structure syntax.

| | Descriptor |
|---|---|
| ref_pic_list_struct( listIdx, ltrpFlag ) { | |
| num_strp_entries[ listIdx ] | ue(v) |
| if( ltrpFlag ) | |
| num_ltrp_entries[ listIdx ] | ue(v) |
| for( i = 0; i < NumEntriesInList[ listIdx ]; i++) { | |
| if( num_ltrp_entries[ listIdx ] > 0 ) | |
| lt_ref_pic_flag[ listIdx ][ i ] | |
| if( !lt_ref_pic_flag[ listIdx ][ i ] ) | |
| poc_lsb_st[ listIdx ][ i ] | u(v) |
| else | |
| poc_lsb_lt[ listIdx ][ i ] | u(v) |
| } | |
| } | |

NAL unit header semantics.

A forbidden_zero_bit shall be equal to 0. nal_unit_type specifies the type of RBSP data structure contained in the NAL unit.

TABLE 7-1

NAL unit type codes and NAL unit type classes

| nal_unit_type | Name of nal_unit_type | Content of NAL unit and RBSP syntax structure | NAL unit type class |
|---|---|---|---|
| 0 | NON_IRAP_NUT | Coded slice segment of a non-IRAP picture slice_layer_rbsp( ) | VCL |
| 1 | IRAP_NUT | Coded slice of an IRAP picture slice_layer_rbsp( ) | VCL |
| 2-15 | RSV_VCL_NUT | Reserved VCL NAL Units | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | EOS_NUT | End of sequence end_of_seq_rbsp( ) | |
| 19 | EOB_NUT | End of bitstream end_of_bitstream_rbsp( ) | non-VCL |
| 20, 21 | PREFIX_SEI_NUT SUFFIX_SEI_NUT | Supplemental enhancement information sei_rbsp( ) | non-VCL |
| 22-26 | RSV_NVCL | Reserved | non-VCL |
| 27-31 | UNSPEC | Unspecified | non-VCL |

A nuh_temporal_id_plus1 minus 1 specifies a temporal identifier for the NAL unit. The value of nuh_temporal_id_plus1 shall not be equal to 0. The variable TemporalId is specified as follows: TemporalId=nuh_temporal_id_plus1−1.

When nal_unit_type is equal to IRAP_NUT, the coded slice belongs to an IRAP picture, and TemporalId shall be equal to 0. The value of TemporalId shall be the same for all VCL NAL units of an access unit. The value of TemporalId of a coded picture or an access unit is the value of the TemporalId of the VCL NAL units of the coded picture or the access unit. The value of TemporalId for non-VCL NAL units is constrained as follows: If nal_unit_type is equal to SPS_NUT, TemporalId shall be equal to 0 and the TemporalId of the access unit containing the NAL unit shall be equal to 0. Otherwise, if nal_unit_type is equal to EOS_NUT or EOB_NUT, TemporalId shall be equal to 0. Otherwise, TemporalId shall be greater than or equal to the TemporalId of the access unit containing the NAL unit. When the NAL unit is a non-VCL NAL unit, the value of TemporalId is equal to the minimum value of the TemporalId values of all access units to which the non-VCL NAL unit applies. When nal_unit_type is equal to PPS_NUT, TemporalId may be greater than or equal to the TemporalId of the containing access unit, as all picture parameter sets (PPSs) may be included in the beginning of a bitstream, wherein the first coded picture has TemporalId equal to 0. When nal_unit_type is equal to PREFIX_SEI_NUT or SUFFIX_SEI_NUT, TemporalId may be greater than or equal to the TemporalId of the containing access unit, as an supplemental enhancement information (SEI) NAL unit may contain information that applies to a bitstream subset that includes access units for which the TemporalId values are greater than the TemporalId of the access unit containing the SEI NAL unit. nuh_reserved_zero_7 bits shall be equal to '0000000'. Other values of nuh_reserved_zero_7 bits may be specified in the future by ITU-T|ISO/IEC. Decoders shall ignore (i.e., remove from the bitstream and discard) NAL units with values of nuh_reserved_zero_7 bits not equal to '0000000'.

Sequence parameter set RBSP semantics.

A log2_max_pic_order_cnt_lsb_minus4 specifies the value of the variable MaxPicOrderCntLsb that is used in the decoding process for picture order count as follows:

$$\text{Max}PicOrderCntLsb = 2^{(log2\_max\_pic\_order\_cnt\_lsb\_minus4+4)}$$

The value of log2_max_pic_order_cnt_lsb_minus4 shall be in the range of 0 to 12, inclusive. sps_max_dec_pic_buffering_minus1 plus 1 specifies the maximum required size of the decoded picture buffer for the CVS in units of picture storage buffers. The value of sps_max_dec_pic_buffering_minus1 shall be in the range of 0 to MaxDpbSize−1, inclusive, where MaxDpbSize is as specified somewhere else. additional_st_poc_lsb specifies the value of the variable MaxStPicOrderCntLsb that is used in the decoding process for reference picture lists as follows:

$$\mathrm{Max}StPicOrderCntLsb = 2^{(log2\_max\_pic\_order\_cnt\_lsb\_minus4+4+additional\_st\_poc\_lsb)}$$

The value of additional_st_poc_lsb shall be in the range of 0 to 32−log2_max_pic_order_cnt_lsb_minus4−4, inclusive. long_term_ref_pics_flag equal to 0 specifies that no LTRP is used for inter prediction of any coded picture in the CVS. long_term_ref_pics_flag equal to 1 specifies that LTRPs may be used for inter prediction of one or more coded pictures in the CVS. additional_lt_poc_lsb specifies the value of the variable MaxLtPicOrderCntLsb that is used in the decoding process for reference picture lists as follows:

$$\mathrm{Max}LtPicOrderCntLsb = 2^{(log2\_max\_pic\_order\_cnt\_lsb\_minus4+4+additional\_st\_poc\_lsb+additional\_lt\_poc\_lsb)}$$

The value of additional_lt_poc_lsb shall be in the range of 0 to 32−log2_max_pic_order_cnt_lsb_minus4−4-additional_st_poc_lsb, inclusive. When not present, the value of additional_lt_poc_lsb is inferred to be equal to 0.

Picture parameter set RBSP semantics.

A num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] shall be in the range of 0 to 14, inclusive.

Slice header semantics.

When present, the value of each of the slice header syntax elements slice_pic_parameter_set_id and slice_pic_order_cnt_lsb shall be the same in all slice headers of a coded picture. slice_type specifies the coding type of the slice according to Table 7-3.

TABLE 7-3

| Name association to slice_type | |
|---|---|
| slice_type | Name of slice_type |
| 0 | B (B slice) |
| 1 | P (P slice) |
| 2 | I (I slice) |

When nal_unit_type is equal to IRAP_NUT, i.e., the picture is an IRAP picture, slice_type shall be equal to 2.

A slice_pic_order_cnt_lsb specifies the picture order count modulo MaxPicOrderCntLsb for the current picture. The length of the slice_pic_order_cnt_lsb syntax element is log2_max_pic_order_cnt_lsb_minus4+4 bits. The value of the slice_pic_order_cnt_lsb shall be in the range of 0 to MaxPicOrderCntLsb−1, inclusive. When slice_pic_order_cnt_lsb is not present, slice_pic_order_cnt_lsb is inferred to be equal to 0. num_ref_idx_active_override_flag equal to 1 specifies that the syntax element num_ref_idx_active_minus1[0] is present for P and B slices and that the syntax element num_ref_idx_active_minus1[1] is present for B slices. num_ref_idx_active_override_flag equal to 0 specifies that the syntax elements num_ref_idx_active_minus1[0] and num_ref_idx_active_minus1[1] are not present. num_ref_idx_active_minus1[i], when present, specifies the value of the variable NumRefIdxActive[i] as follows:

$$NumRefIdxActive[i]=num\_ref\_idx\_active\_minus1[i]+1$$

The value of num_ref_idx_active_minus1[i] shall be in the range of 0 to 14, inclusive. The value of NumRefIdxActive[i]−1 specifies the maximum reference index for reference picture list i that may be used to decode the slice. When the value of NumRefIdxActive[i] is equal to 0, no reference index for reference picture list i may be used to decode the slice. For i equal to 0 or 1, when the current slice is a B slice and num_ref_idx_active_override_flag is equal to 0, NumRefIdxActive[i] is inferred to be equal to num_ref_idx_default_active_minus1[i]+1. When the current slice is a P slice and num_ref_idx_active_override_flag is equal to 0, NumRefIdxActive[0] is inferred to be equal to num_ref_idx_default_active_minus1[0]+1. When the current slice is a P slice, NumRefIdxActive[1] is inferred to be equal to 0. When the current slice is an I slice, both NumRefIdxActive[0] and NumRefIdxActive[1] are inferred to be equal to 0. Alternatively, for i equal to 0 or 1, the following applies after the above: Let rplsIdx1 be set equal to ref_pic_list_sps_flag[i]?ref_pic_list_idx[i]:num_ref_pic_lists_in_sps[i], and numRpEntries[i] be equal to num_strp_entries[i][rplsIdx1]+num_ltrp_entries[i][rplsIdx1]. When NumRefIdxActive[i] is greater than numRpEntries[i], the value of NumRefIdxActive[i] is set equal to numRpEntries[i].

Reference picture list structure semantics.

The ref_pic_list_struct(listIdx, ltrpFlag) syntax structure may be present in a slice header. When it is present in a slice header, the ref_pic_list_struct(listIdx, ltrpFlag) syntax structure specifies the reference picture list listIdx of the current picture (the picture containing the slice). num_strp_entries[listIdx] specifies the number of STRP entries in the ref_pic_list_struct(listIdx, ltrpFlag) syntax structure. num_ltrp_entries[listIdx] specifies the number of LTRP entries in the ref_pic_list_struct(listIdx, ltrpFlag) syntax structure. When not present, the value of num_ltrp_entries[listIdx] is inferred to be equal to 0. The variable NumEntriesInList[listIdx] is derived as follows:

$$NumEntriesInList[listIdx]=num\_strp\_entries[listIdx]+num\_ltrp\_entries[listIdx]$$

The value of NumEntriesInList[listIdx] shall be in the range of 0 to sps_max_dec_pic_buffering_minus1, inclusive. lt_ref_pic_flag[listIdx][i] equal to 1 specifics that the i-th entry in the ref_pic_list_struct(listIdx, ltrpFlag) syntax structure is an LTRP entry. lt_ref_pic_flag[listIdx][i] equal to 0 specifies that the i-th entry in the ref_pic_list_struct(listIdx, ltrpFlag) syntax structure is an STRP entry. When not present, the value of lt_ref_pic_flag[listIdx][i] is inferred to be equal to 0. It is a requirement of bitstream conformance that the sum of lt_ref_pic_flag[listIdx][i] for all values of i in the range of 0 to NumEntriesInList[listIdx]−1, inclusive, shall be equal to num_ltrp_entries[listIdx]. poc_lsb_st[listIdx][i], when lt_ref_pic_flag[listIdx][i] is equal to 0, specifies the value of the picture order count modulo MaxStPicOrderCntLsb of the picture referred to by the i-th entry in the ref_pic_list_struct(listIdx, ltrpFlag) syntax structure. The length of the poc_lsb_st[listIdx][i] syntax element is Log2(MaxStPicOrderCntLsb) bits. poc_lsb_lt[listIdx][i], when lt_ref_pic_flag[listIdx][i] is equal to 1, specifies the value of the picture order count modulo MaxLtPicOrderCntLsb of the picture referred to by the i-th entry in the ref_pic_list_struct(listIdx, ltrpFlag) syntax structure. The length of the poc_lsb_lt[listIdx][i] syntax element is Log2 (MaxLtPicOrderCntLsb) bits.

The decoding process is discussed.

General decoding process.

The decoding process operates as follows for the current picture CurrPic: The decoding of NAL units is specified below. The processes below specify the following decoding processes using syntax elements in the slice header layer and above: Variables and functions relating to picture order count are derived. This needs to be invoked only for the first slice of a picture. At the beginning of the decoding process for each slice of a non-IRAP picture, the decoding process for reference picture lists construction is invoked for derivation of reference picture list 0 (RefPicList[0]) and reference picture list 1 (RefPicList[1]). The decoding process for reference picture marking is invoked, wherein reference pictures may be marked as "unused for reference" or "used for long-term reference." This needs to be invoked only for the first slice of a picture. The decoding processes for coding tree units, scaling, transform, in-loop filtering, etc., are invoked. After all slices of the current picture have been decoded, the current decoded picture is marked as "used for short-term reference."

NAL unit decoding process.

Inputs to this process are NAL units of the current picture and their associated non-VCL NAL units. Outputs of this process are the parsed RBSP syntax structures encapsulated within the NAL units. The decoding process for each NAL unit extracts the RBSP syntax structure from the NAL unit and then parses the RBSP syntax structure.

Slice decoding process.

Decoding process for picture order count.

Output of this process is PicOrderCntVal, the picture order count of the current picture. Picture order counts are used to identify pictures, for deriving motion parameters in merge mode and motion vector prediction, and for decoder conformance checking. Each coded picture is associated with a picture order count variable, denoted as PicOrderCntVal. When the current picture is not an IRAP picture, the variables prevPicOrderCntLsb and prevPicOrderCntMsb are derived as follows: Let prevTid0Pic be the previous picture in decoding order that has TemporalId equal to 0. The variable prevPicOrderCntLsb is set equal to slice_pic_order_cnt_lsb of prevTid0Pic. The variable prevPicOrderCntMsb is set equal to PicOrderCntMsb of prevTid0Pic. The variable PicOrderCntMsb of the current picture is derived as follows: If the current picture is an IRAP picture, PicOrderCntMsb is set equal to 0. Otherwise, PicOrderCntMsb is derived as follows:

```
if( ( slice_pic_order_cnt_lsb < prevPicOrderCntLsb ) &&
     ( ( prevPicOrderCntLsb − slice_pic_order_cnt_lsb ) >= (MaxPicOrderCntLsb / 2) ) )
  PicOrderCntMsb = prevPicOrderCntMsb + MaxPicOrderCntLsb
else if( (slice_pic_order_cnt_lsb > prevPicOrderCntLsb ) &&
     ( ( slice_pic_order_cnt_lsb − prevPicOrderCntLsb ) > ( MaxPicOrderCntLsb / 2 ) ) )
  PicOrderCntMsb = prevPicOrderCntMsb − MaxPicOrderCntLsb
else
  PicOrderCntMsb = prevPicOrderCntMsb
```

PicOrderCntVal is derived as follows:

PicOrderCntVal=PicOrderCntMsb+slice_pic_order_cnt_lsb

All IRAP pictures will have PicOrderCntVal equal to 0 since slice_pic_order_cnt_lsb is inferred to be 0 for IRAP pictures and prevPicOrderCntLsb and prevPicOrderCntMsb are both set equal to 0. The value of PicOrderCntVal shall be in the range of $-2^{31}$ to $2^{31}-1$, inclusive. In one CVS, the PicOrderCntVal values for any two coded pictures shall not be the same. At any moment during the decoding process, the values of PicOrderCntVal & (MaxStPicOrderCntLsb−1) for any two short-term reference pictures in the DPB shall not be the same. At any moment during the decoding process, the values of PicOrderCntVal & (MaxLtPicOrderCntLsb−1) for any two reference pictures in the DPB shall not be the same.

The function PicOrderCnt(picX) is specified as follows:

PicOrderCnt(pic*X*)=PicOrderCntVal of the picture pic*X*

The function DiffPicOrderCnt(picA, picB) is specified as follows:

DiffPicOrderCnt(pic*A*,pic*B*)=PicOrderCnt(pic*A*)−PicOrderCnt(pic*B*)

The bitstream shall not contain data that result in values of DiffPicOrderCnt(picA, picB) used in the decoding process that are not in the range of $-2^{15}$ to $2^{15}-1$, inclusive. Let X be the current picture and Y and Z be two other pictures in the same CVS, Y and Z are considered to be in the same output order direction from X when both DiffPicOrderCnt (X, Y) and DiffPicOrderCnt(X, Z) are positive or both are negative.

Decoding process for reference picture lists construction.

This process is invoked at the beginning of the decoding process for each slice of a non-IRAP picture. Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list 1 (i.e., RefPicList[1]) are used in decoding of the slice data. At the beginning of the decoding process for each slice of a non-IRAP picture, the reference picture lists RefPicList[0] and RefPicList[1] are derived. The reference picture lists are used in marking of reference pictures or in decoding of the slice data. For an I slice of a non-IRAP picture that it is not the first slice of the picture, RefPicList[0] and RefPicList[1] may be derived for bitstream conformance checking purpose, but their derivation is not necessary for decoding of the current picture or pictures following the current picture in decoding order. For a P slice that it is not the first slice of a picture, RefPicList[1] may be derived for bitstream conformance checking purpose, but its derivation is not necessary for decoding of the current picture or pictures following the current picture in decoding order.

The reference picture lists RefPicList[0] and RefPicList [1] are constructed as follows:

```
for( i = 0; i < 2; i++ ) {
    for( j = 0; j < NumEntriesInList[ i ]; j++) {
        if( lt_ref_pic_flag[ i ][ j ] ) {
            if( there is a reference picA in the DPB with
PicOrderCntVal & ( MaxLtPicOrderCntLsb − 1)
                equal to poc_lsb_lt[ i ][ j ] )
              RefPicList[ i ][ j ] = picA
            else
              RefPicList[ i ][ j ] = "no reference picture"
        }
    }
}
for( i = 0; i < 2; i++ ) {
    for( j = 0; j < NumEntriesInList[ i ]; j++) {
        if( !lt_ref_pic_flag[ i ][ j ] ) {
            if( there is a short-term reference picture picA in the DPB
                with PicOrderCntVal & ( MaxStPicOrderCntLsb − 1 ) equal to
poc_lsb_st[ i ][ j ] )
              RefPicList[ i ][ j ] = picA
            else
              RefPicList[ i ][ j ] = "no reference picture"
        }
    }
}
```

For each i equal to 0 or 1, the following applies:

The first NumRefIdxActive[i] entries in RefPicList[i] are referred to as the active entries in RefPicList[i], and the other entries in RefPicList[i] are referred to as the inactive entries in RefPicList[i]. Each entry in RefPicList[i][j] for j in the range of 0 to NumEntriesInList[i]−1, inclusive, is referred to as an STRP entry if lt_ref_pic_flag[i][j] is equal to 0, and as an LTRP entry otherwise. It is possible that a particular picture is referred to by both an entry in RefPicList[0] and an entry in RefPicList[1]. It is also possible that a particular picture is referred to by more than one entry in RefPicList[0] or by more than one entry in RefPicList[1]. The active entries in RefPicList[0] and the active entries in RefPicList[1] collectively refer to all reference pictures that may be used for inter prediction of the current picture and one or more pictures that follow the current picture in decoding order. The inactive entries in RefPicList[0] and the inactive entries in RefPicList[1] collectively refer to all reference pictures that are not used for inter prediction of the current picture but may be used in inter prediction for one or more pictures that follow the current picture in decoding order. There may be one or more entries in RefPicList[0] or RefPicList[1] that are equal to "no reference picture" because the corresponding pictures are not present in the DPB. Each inactive entry in RefPicList[0] or RefPicList[0] that is equal to "no reference picture" should be ignored. An unintentional picture loss should be inferred for each active entry in RefPicList[0] or RefPicList[1] that is equal to "no reference picture."

It is a requirement of bitstream conformance that the following constraints apply: For each i equal to 0 or 1, NumEntriesInList[i] shall not be less than NumRefIdxActive[i]. The picture referred to by each active entry in RefPicList[0] or RefPicList[1] shall be present in the DPB and shall have TemporalId less than or equal to that of the current picture. Optionally, the following constraint may be further specified: the entry index of any inactive entry in RefPicList[0] or RefPicList[1] shall not be used as a reference index for decoding of the current picture. Optionally, the following constraint may be further specified: an inactive entry in RefPicList[0] or RefPicList[1] shall not refer to the same picture as any other entry in RefPicList[0] or RefPicList[1]. An STRP entry in RefPicList[0] or RefPicList[1] of a slice of a picture and an LTRP entry in RefPicList[0] or RefPicList[1] of the same slice or a different slice of the same picture shall not refer to the same picture. The current picture itself shall not be referred to by any entry in RefPicList[0] or RefPicList[1]. There shall be no LTRP entry in RefPicList[0] or RefPicList[1] for which the difference between the PicOrderCntVal of the current picture and the PicOrderCntVal of the picture referred to by the entry is greater than or equal to 224. Let setOfRefPics be the set of unique pictures referred to by all entries in RefPicList [0] and all entries in RefPicList[1]. The number of pictures in setOfRefPics shall be less than or equal to sps_max_dec_pic_buffering_minus1 and setOfRefPics shall be the same for all slices of a picture.

Decoding process for reference picture marking.

This process is invoked once per picture, after decoding of a slice header and the decoding process for reference picture list construction for the slice, but prior to the decoding of the slice data. This process may result in one or more reference pictures in the DPB being marked as "unused for reference" or "used for long-term reference." A decoded picture in the DPB can be marked as "unused for reference," "used for short-term reference" or "used for long-term reference," but only one among these three at any given moment during the operation of the decoding process. Assigning one of these markings to a picture implicitly removes another of these markings when applicable. When a picture is referred to as being marked as "used for reference," this collectively refers to the picture being marked as "used for short-term reference" or "used for long-term reference" (but not both). When the current picture is an IRAP picture, all reference pictures currently in the DPB (if any) are marked as "unused for reference." STRPs are identified by the Log2(MaxStPicOrderCntLsb) LSBs of their PicOrderCntVal values. LTRPs are identified by the Log2(MaxLtPicOrderCntLsb) LSBs of their PicOrderCntVal values.

The following applies: For each LTRP entry in RefPicList[0] or RefPicList[1], when the referred picture is an STRP, the picture is marked as "used for long-term reference." Each reference picture in the DPB that is not referred to by any entry in RefPicList[0] or RefPicList[1] is marked as "unused for reference."

Always signaling reference picture lists in slice headers without differentiation between short-term and long-term reference pictures.

This section describes another alternative embodiment of the disclosure. The description is relative to the latest VVC WD (i.e., only the delta relative to the latest VVC WD in JVET-K1001-v1 is described, while the texts in the latest VVC WD that are not mentioned below apply as they are). This alternative embodiment is summarized as follows: Reference picture list structures are signaled only in slice headers. No distinction is made between short-term and long-term reference pictures. All reference pictures are just named reference pictures. Reference pictures are identified by their POC LSBs, which may be represented by a number of bits that is different from number of bits used for representing the POC LSBs signaled in slice headers for derivation of POC values.

Abbreviations. Text in clause 4 of VVC WD applies.

NAL unit header syntax.

| | Descriptor |
|---|---|
| nal_unit_header( ) { | |
| forbidden_zero_bit | f(1) |
| nal_unit_type | u(5) |
| nuh_temporal_id_plus1 | u(3) |
| nuh_reserved_zero_7bits | u(7) |
| } | |

Sequence parameter set RBSP syntax.

| | Descriptor |
|---|---|
| seq_parameter_set_rbsp( ) { | |
| sps_seq_parameter_set_id | ue(v) |
| chroma_format_idc | ue(v) |
| if( chroma_format_idc = = 3 ) | |
| separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| log2_max_pic_order_cnt_lsb_minus4 | ue(v) |
| sps_max_dec_pic_buffering_minus1 | ue(v) |
| qtbtt_dual_tree_intra_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| max_mtt_hierarchy_depth_inter_slices | ue(v) |
| max_mtt_hierarchy_depth_intra_slices | ue(v) |

-continued

| | Descriptor |
|---|---|
| additional_ref_poc_lsb | ue(v) |
| rbsp_trailing_bits( ) | |
| } | |

Picture parameter set RBSP syntax.

| | Descriptor |
|---|---|
| pic_parameter_set_rbsp( ) { | |
| pps_pic_parameter_set_id | ue(v) |
| pps_seq_parameter_set_id | ue(v) |
| for( i = 0; i < 2; i++) | |
| num_ref_idx_default_active_minus1[ i ] | ue(v) |
| rbsp_trailing_bits( ) | |
| } | |

Slice header syntax.

| | Descriptor |
|---|---|
| slice_header( ) { | |
| slice_pic_parameter_set_id | ue(v) |
| slice_address | u(v) |
| slice_type | ue(v) |
| if ( slice_type != I ) | |
| log2_diff_ctu_max_bt_size | ue(v) |
| if( nal_unit_type != IRAP_NUT ) { | |
| slice_pic_order_cnt_lsb | u(v) |
| for( i = 0; i < 2; i++ ) | |
| ref_pic_list_struct( i ) | |
| if( slice_type = = P \| \| slice_type = = B ) { | |
| num_ref_idx_active_override_flag | u(1) |
| if( num_ref_idx_active_override_flag ) | |
| for( i = 0; i < ( slice_type = = B ? 2: 1 ); i++ ) | |
| num_ref_idx_active_minus1[ i ] | ue(v) |
| } | |
| } | |
| byte_alignment( ) | |
| } | |

Reference picture list structure syntax.

| | Descriptor |
|---|---|
| ref_pic_list_struct( listIdx ) { | |
| num_ref_entries[ listIdx ] | ue(v) |
| for( i = 0; i < NumEntriesInList[ listIdx ]; i++) | |
| poc_ref_lsb[ listIdx ][ i ] | u(v) |
| } | |

NAL unit header semantics.

A forbidden_zero_bit shall be equal to 0. nal_unit_type specifies the type of RBSP data structure contained in the NAL unit.

TABLE 7-1

NAL unit type codes and NAL unit type classes

| nal_unit_type | Name of nal_unit_type | Content of NAL unit and RBSP syntax structure | NAL unit type class |
|---|---|---|---|
| 0 | NON_IRAP_NUT | Coded slice segment of a non-IRAP picture slice_layer_rbsp( ) | VCL |
| 1 | IRAP_NUT | Coded slice of an IRAP picture slice_layer_rbsp( ) | VCL |
| 2-15 | RSV_VCL_NUT | Reserved VCL NAL Units | VCL |

TABLE 7-1-continued

| NAL unit type codes and NAL unit type classes | | | |
|---|---|---|---|
| nal_unit_type | Name of nal_unit_type | Content of NAL unit and RBSP syntax structure | NAL unit type class |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20, 21 | PREFIX_SEI_NUT SUFFIX_SEI_NUT | Supplemental enhancement information sei_rbsp( ) | non-VCL |
| 22-26 | RSV_NVCL | Reserved | non-VCL |
| 27-31 | UNSPEC | Unspecified | non-VCL |

A nuh_temporal_id_plus1 minus 1 specifies a temporal identifier for the NAL unit. The value of nuh_temporal_id_plus1 shall not be equal to 0. The variable TemporalId is specified as follows:

$$\text{TemporalId}=\text{nuh\_temporal\_id\_plus1}-1$$

When nal_unit_type is equal to IRAP_NUT, the coded slice belongs to an IRAP picture, TemporalId shall be equal to 0. The value of TemporalId shall be the same for all VCL NAL units of an access unit. The value of TemporalId of a coded picture or an access unit is the value of the TemporalId of the VCL NAL units of the coded picture or the access unit. The value of TemporalId for non-VCL NAL units is constrained as follows:

If nal_unit_type is equal to SPS_NUT, TemporalId shall be equal to 0 and the TemporalId of the access unit containing the NAL unit shall be equal to 0. Otherwise, if nal_unit_type is equal to EOS_NUT or EOB_NUT, TemporalId shall be equal to 0. Otherwise, TemporalId shall be greater than or equal to the TemporalId of the access unit containing the NAL unit. When the NAL unit is a non-VCL NAL unit, the value of TemporalId is equal to the minimum value of the TemporalId values of all access units to which the non-VCL NAL unit applies. When nal_unit_type is equal to PPS_NUT, TemporalId may be greater than or equal to the TemporalId of the containing access unit, as all picture parameter sets (PPSs) may be included in the beginning of a bitstream, wherein the first coded picture has TemporalId equal to 0. When nal_unit_type is equal to PREFIX_SEI_NUT or SUFFIX_SEI_NUT, TemporalId may be greater than or equal to the TemporalId of the containing access unit, as an SEI NAL unit may contain information that applies to a bitstream subset that includes access units for which the TemporalId values are greater than the TemporalId of the access unit containing the SEI NAL unit. nuh_reserved_zero_7 bits shall be equal to '0000000'. Other values of nuh_reserved_zero_7 bits may be specified in the future by ITU-T|ISO/IEC. Decoders shall ignore (i.e., remove from the bitstream and discard) NAL units with values of nuh_reserved_zero_7 bits not equal to '0000000'.

Sequence parameter set RBSP semantics.

log2_max_pic_order_cnt_lsb_minus4 specifies the value of the variable MaxPicOrderCntLsb that is used in the decoding process for picture order count as follows:

$$\text{Max}PicOrderCntLsb = 2^{(log2\_max\_pic\_order\_cnt\_lsb\_minus4+4)}$$

The value of log2_max_pic_order_cnt_lsb_minus4 shall be in the range of 0 to 12, inclusive. sps_max_dec_pic_buffering_minus1 plus 1 specifies the maximum required size of the decoded picture buffer for the CVS in units of picture storage buffers. The value of sps_max_dec_pic_buffering_minus1 shall be in the range of 0 to MaxDpbSize−1, inclusive, where MaxDpbSize is as specified somewhere else. additional_ref_poc_lsb specifies the value of the variable MaxRefPicOrderCntLsb that is used in the decoding process for reference picture lists as follows:

$$\text{Max}RefPicOrderCntLsb = 2^{(log2\_max\_pic\_order\_cnt\_lsb\_minus4+4+additional\_ref\_poc\_lsb)}$$

The value of additional_ref_poc_lsb shall be in the range of 0 to 32−log2_max_pic_order_cnt_lsb_minus4−4, inclusive.

Picture parameter set RBSP semantics.

A num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] shall be in the range of 0 to 14, inclusive.

Slice header semantics.

When present, the value of each of the slice header syntax elements slice_pic_parameter_set_id and slice_pic_order_cnt_lsb shall be the same in all slice headers of a coded picture . . . slice_type specifies the coding type of the slice according to Table 7-3.

TABLE 7-3

| Name association to slice_type | |
|---|---|
| slice_type | Name of slice_type |
| 0 | B (B slice) |
| 1 | P (P slice) |
| 2 | I (I slice) |

When nal_unit_type is equal to IRAP_NUT, i.e., the picture is an IRAP picture, slice_type shall be equal to 2 . . . slice_pic_order_cnt_lsb specifies the picture order count modulo MaxPicOrderCntLsb for the current picture.

The length of the slice_pic_order_cnt_lsb syntax element is log2_max_pic_order_cnt_lsb_minus4+4 bits. The value of the slice_pic_order_cnt_lsb shall be in the range of 0 to MaxPicOrderCntLsb−1, inclusive. When slice_pic_order_cnt_lsb is not present, slice_pic_order_cnt_lsb is inferred to be equal to 0. num_ref_idx_active_override_flag equal to 1 specifies that the syntax element num_ref_idx_active_minus1[0] is present for P and B slices and that the syntax element num_ref_idx_active_minus1[1] is present for B slices. num_ref_idx_active_override_flag equal to (specifies that the syntax elements num_ref_idx_active_minus1[0] and num_ref_idx_active_minus1[1] are not present. num_ref_idx_active_minus1[i], when present, specifies the value of the variable NumRefIdxActive[i] as follows:

$$NumRefIdxActive[i] = \text{num\_ref\_idx\_active\_minus1}[i] + 1$$

The value of num_ref_idx_active_minus1[i] shall be in the range of 0 to 14, inclusive. The value of NumRefIdxActive[i]−1 specifies the maximum reference index for reference picture list i that may be used to decode the slice. When the value of NumRefIdxActive[i] is equal to 0, no reference index for reference picture list i may be used to decode the slice. For i equal to 0 or 1, when the current slice is a B slice and num_ref_idx_active_override_flag is equal to 0, NumRefIdxActive[i] is inferred to be equal to num_ref_idx_default_active_minus1[i]+1. When the current slice is a P slice and num_ref_idx_active_override_flag is equal to 0, NumRefIdxActive[0] is inferred to be equal to num_ref_idx_default_active_minus1[0]+1. When the current slice is a P slice, NumRefIdxActive[1] is inferred to be equal to 0. When the current slice is an I slice, both NumRefIdxActive[0] and NumRefIdxActive[1] are inferred to be equal to 0. Alternatively, for i equal to 0 or 1, the following applies after the above: Let rplsIdx1 be set equal to ref_pic_list_sps_flag[i]?ref_pic_list_idx[i]:num_ref_pic_lists_in_sps[i], and numRpEntries[i] be equal to num_strp_entries[i][rplsIdx1]+num_ltrp_entries[i][rplsIdx1]. When NumRefIdxActive[i] is greater than numRpEntries[i], the value of NumRefIdxActive[i] is set equal to numRpEntries[i].

Reference picture list structure semantics.

The ref_pic_list_struct(listIdx) syntax structure may be present in a slice header. When it is present in a slice header, the ref_pic_list_struct(listIdx) syntax structure specifies reference picture list listIdx of the current picture (the picture containing the slice). num_ref_entries[listIdx] specifies the number of entries in the ref_pic_list_struct(listIdx) syntax structure. The variable NumEntriesInList[listIdx] is derived as follows:

NumRefPicEntriesInRpl[listIdx]=num_ref_entries[listIdx]

The value of NumRefPicEntries[listIdx] shall be in the range of 0 to sps_max_dec_pic_buffering_minus1, inclusive. poc_ref_lsb[listIdx][i] specifies the value of the picture order count modulo MaxRefPicOrderCntLsb of the picture referred to by the i-th entry in the ref_pic_list_struct(listIdx) syntax structure. The length of the poc_ref_lsb[listIdx][i] syntax element is Log2(MaxRefPicOrderCntLsb) bits.

The decoding process is discussed.

General decoding process.

The decoding process operates as follows for the current picture CurrPic: the decoding of NAL units is specified below. The processes below specify the following decoding processes using syntax elements in the slice header layer and above: variables and functions relating to picture order count are derived. This needs to be invoked only for the first slice of a picture. At the beginning of the decoding process for each slice of a non-IRAP picture, the decoding process for reference picture lists construction is invoked for derivation of reference picture list 0 (RefPicList[0]) and reference picture list 1 (RefPicList[1]). The decoding process for reference picture marking is invoked, wherein reference pictures may be marked as "unused for reference." This needs to be invoked only for the first slice of a picture. The decoding processes for coding tree units, scaling, transform, in-loop filtering, etc., are invoked. After all slices of the current picture have been decoded, the current decoded picture is marked as "used for reference."

NAL unit decoding process.

Inputs to this process are NAL units of the current picture and their associated non-VCL NAL units. Outputs of this process are the parsed RBSP syntax structures encapsulated within the NAL units. The decoding process for each NAL unit extracts the RBSP syntax structure from the NAL unit and then parses the RBSP syntax structure.

Slice decoding process.

Decoding process for picture order count.

Output of this process is PicOrderCntVal, the picture order count of the current picture. Picture order counts are used to identify pictures, for deriving motion parameters in merge mode and motion vector prediction, and for decoder conformance checking. Each coded picture is associated with a picture order count variable, denoted as PicOrderCntVal. When the current picture is not an IRAP picture, the variables prevPicOrderCntLsb and prevPicOrderCntMsb are derived as follows: let prevTid0Pic be the previous picture in decoding order that has TemporalId equal to 0. The variable prevPicOrderCntLsb is set equal to slice_pic_order_cnt_lsb of prevTid0Pic. The variable prevPicOrderCntMsb is set equal to PicOrderCntMsb of prevTid0Pic. The variable PicOrderCntMsb of the current picture is derived as follows: if the current picture is an IRAP picture, PicOrderCntMsb is set equal to 0. Otherwise, PicOrderCntMsb is derived as follows:

```
if( ( slice_pic_order_cnt_lsb < prevPicOrderCntLsb ) &&
    ( ( prevPicOrderCntLsb − slice_pic_order_cnt_lsb ) >= ( MaxPicOrderCntLsb / 2 ) ) )
  PicOrderCntMsb = prevPicOrderCntMsb + MaxPicOrderCntLsb
else if( (slice_pic_order_cnt_lsb > prevPicOrderCntLsb ) &&
    ( ( slice pic_order_cnt_lsb − prevPicOrderCntLsb ) > ( MaxPicOrderCntLsb / 2 ) ) )
  PicOrderCntMsb = prevPicOrderCntMsb − MaxPicOrderCntLsb
else
  PicOrderCntMsb = prevPicOrderCntMsb
```

PicOrderCntVal is derived as follows:

PicOrderCntVal=PicOrderCntMsb+slice_pic_order_cnt_lsb

All IRAP pictures will have PicOrderCntVal equal to 0 since slice_pic_order_cnt_lsb is inferred to be 0 for IRAP pictures and prevPicOrderCntLsb and prevPicOrderCntMsb are both set equal to 0. The value of PicOrderCntVal shall be in the range of $-2^{31}$ to $2^{31}-1$, inclusive. In one CVS, the PicOrderCntVal values for any two coded pictures shall not be the same. At any moment during the decoding process, the values of PicOrderCntVal & (MaxRefPicOrderCntLsb−1) for any two reference pictures in the DPB shall not be the same.

The function PicOrderCnt(picX) is specified as follows:

PicOrderCnt(pic*X*)=PicOrderCntVal of the picture pic*X*

The function DiffPicOrderCnt(picA, picB) is specified as follows:

DiffPicOrderCnt(pic*A*,pic*B*)=PicOrderCnt(pic*A*)−PicOrderCnt(pic*B*)

The bitstream shall not contain data that result in values of DiffPicOrderCnt(picA, picB) used in the decoding process that are not in the range of $-2^{15}$ to $2^{15}-1$, inclusive. Let X be the current picture and Y and Z be two other pictures in the same CVS, Y and Z are considered to be in the same output order direction from X when both DiffPicOrderCnt (X, Y) and DiffPicOrderCnt(X, Z) are positive or both are negative.

Decoding process for reference picture lists construction.

This process is invoked at the beginning of the decoding process for each slice of a non-IRAP picture. Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list 1 (i.e., RefPicList[1]) are used in decoding of the slice data. At the beginning of the decoding process for each slice of a non-IRAP picture, the reference picture lists RefPicList[0] and RefPicList[1] are derived. The reference picture lists are used in marking of reference pictures or in decoding of the slice data. For an I slice of a non-IRAP picture that it is not the first slice of the picture, RefPicList[0] and RefPicList[1] may be derived for bitstream conformance checking purpose, but their derivation is not necessary for decoding of the current picture or pictures following the current picture in decoding order. For a P slice that it is not the first slice of a picture, RefPicList[1] may be derived for bitstream conformance checking purpose, but its derivation is not necessary for decoding of the current picture or pictures following the current picture in decoding order. The reference picture lists RefPicList[0] and RefPicList[1] are constructed as follows:

```
for( i = 0; i < 2; i++ ) {
    for( j = 0, pocBase = PicOrderCntVal; j < NumEntriesInList[ i ]; j++) {
      if( there is a reference picA in the DPB with
PicOrderCntVal & ( MaxRefPicOrderCntLsb − 1 )
          equal to poc_ref_lsb[ i ][ j ] )
        RefPicList[ i ][ j ] = picA
      else
        RefPicList[ i ][ j ] = "no reference picture"
  }
}
```

For each i equal to 0 or 1, the first NumRefIdxActive[i] entries in RefPicList[i] are referred to as the active entries in RefPicList[i], and the other entries in RefPicList[i] are referred to as the inactive entries in RefPicList[i]. It is possible that a particular picture is referred to by both an entry in RefPicList[0] and an entry in RefPicList[1]. It is also possible that a particular picture is referred to by more than one entry in RefPicList[0] or by more than one entry in RefPicList[1]. The active entries in RefPicList[0] and the active entries in RefPicList[1] collectively refer to all reference pictures that may be used for inter prediction of the current picture and one or more pictures that follow the current picture in decoding order. The inactive entries in RefPicList[0] and the inactive entries in RefPicList[1] collectively refer to all reference pictures that are not used for inter prediction of the current picture but may be used in inter prediction for one or more pictures that follow the current picture in decoding order. There may be one or more entries in RefPicList[0] or RefPicList[1] that are equal to "no reference picture" because the corresponding pictures are not present in the DPB. Each inactive entry in RefPicList [0] or RefPicList[0] that is equal to "no reference picture" should be ignored. An unintentional picture loss should be inferred for each active entry in RefPicList[0] or RefPicList [1] that is equal to "no reference picture."

It is a requirement of bitstream conformance that the following constraints apply: For each i equal to 0 or 1, NumEntriesInList[i] shall not be less than NumRefIdxActive[i]. The picture referred to by each active entry in RefPicList[0] or RefPicList[1] shall be present in the DPB and shall have TemporalId less than or equal to that of the current picture. Optionally, the following constraint may be further specified: The entry index of any inactive entry in RefPicList[0] or RefPicList[1] shall not be used as a reference index for decoding of the current picture. Optionally, the following constraint may be further specified: An inactive entry in RefPicList[0] or RefPicList[1] shall not refer to the same picture as any other entry in RefPicList[0] or RefPicList[1]. The current picture itself shall not be referred to by any entry in RefPicList[0] or RefPicList[1]. There shall be no entry in RefPicList[0] or RefPicList[1] for which the difference between the PicOrderCntVal of the current picture and the PicOrderCntVal of the picture referred to by the entry is greater than or equal to 224. Let setOfRefPics be the set of unique pictures referred to by all entries in RefPicList[0] and all entries in RefPicList[1]. The number of pictures in setOfRefPics shall be less than or equal to sps_max_dec_pic_buffering_minus1 and setOfRefPics shall be the same for all slices of a picture.

Decoding process for reference picture marking.

This process is invoked once per picture, after decoding of a slice header and the decoding process for reference picture list construction for the slice, but prior to the decoding of the slice data. This process may result in one or more reference pictures in the DPB being marked as "unused for reference." A decoded picture in the DPB can be marked as "unused for reference" or "used for reference," but only one among these two at any given moment during the operation of the decoding process. Assigning one of these markings to a picture implicitly removes another of these markings when applicable. When the current picture is an IRAP picture, all reference pictures currently in the DPB (if any) are marked as "unused for reference." Reference pictures in the DPB are identified by the Log2(MaxRefPicOrderCntLsb) LSBs of their PicOrderCntVal values. Each reference picture in the DPB that is not referred to by any entry in RefPicList[0] or RefPicList[1] is marked as "unused for reference."

Yet another alternative embodiment.

This section describes an alternative embodiment to the approach specified above that is named "always signaling of reference picture lists in slice headers with differentiation between short-term and long-term reference pictures." In this alternative embodiment, in the slice header, a POC MSB cycle may be signaled for each LTRP entry, similarly as in HEVC or as in the approaches described above, and the following constraint is removed: At any moment during the decoding process, the values of PicOrderCntVal & (MaxLtPicOrderCntLsb−1) for any two reference pictures in the DPB shall not be the same.

Figure 6:
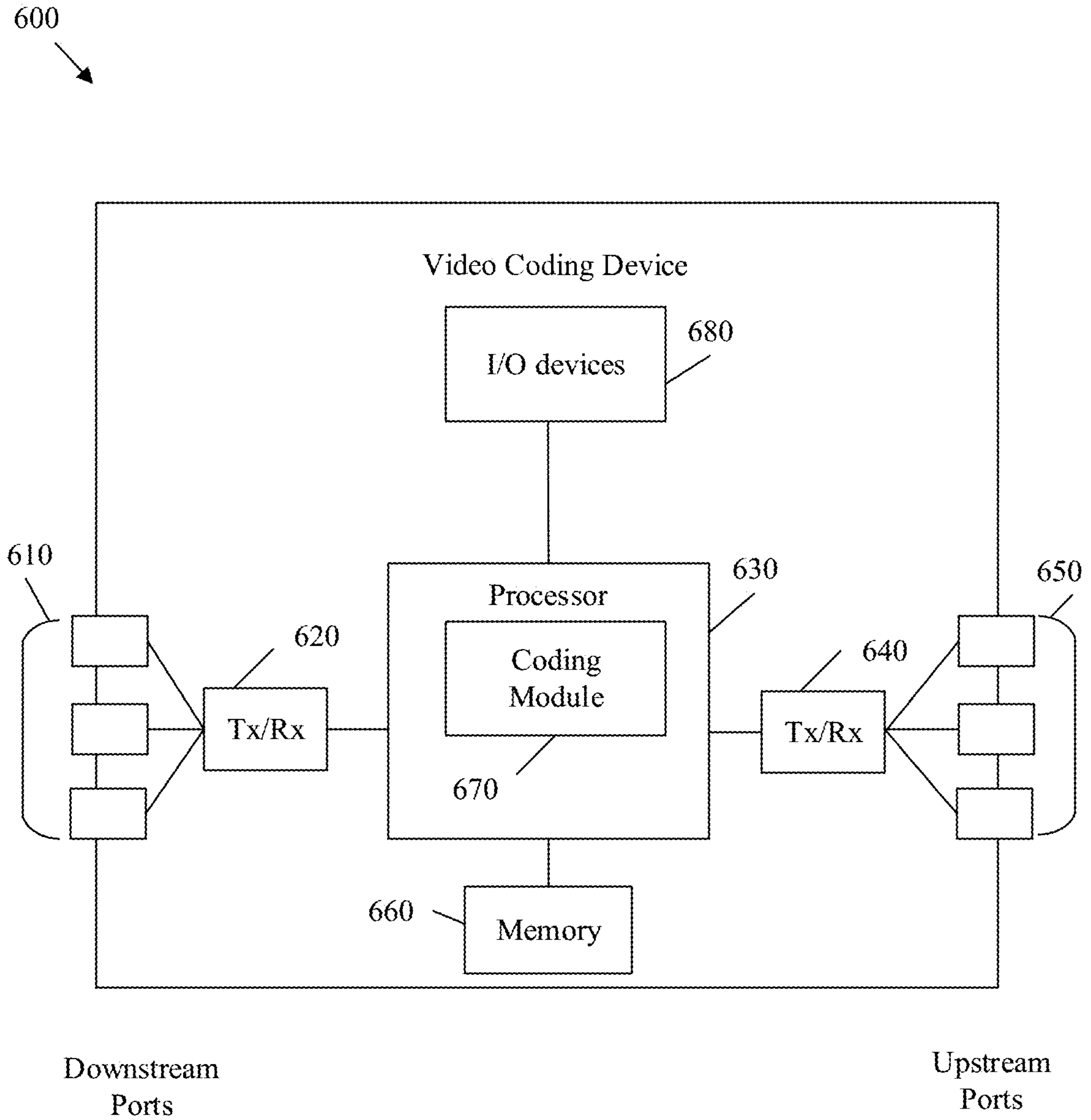
FIG. 6 is a schematic diagram of a video coding device.

FIG. 6 is a schematic diagram of a video coding device 600 (e.g., a video encoder 20 or a video decoder 30) according to an embodiment of the disclosure. The video coding device 600 is suitable for implementing the disclosed embodiments as described herein. The video coding device 600 comprises ingress ports 610 and receiver units (Rx) 620 for receiving data; a processor, logic unit, or central processing unit (CPU) 630 to process the data; transmitter units (Tx) 640 and egress ports 650 for transmitting the data; and a memory 660 for storing the data. The video coding device 600 may also comprise optical-to-electrical (OE) components and electrical-to-optical (EO) components coupled to the ingress ports 610, the receiver units 620, the transmitter units 640, and the egress ports 650 for egress or ingress of optical or electrical signals.

The processor 630 is implemented by hardware and software. The processor 630 may be implemented as one or more CPU chips, cores (e.g., as a multi-core processor), field-programmable gate arrays (FPGAs), application specific integrated circuits (ASICs), and digital signal processors (DSPs). The processor 630 is in communication with the ingress ports 610, receiver units 620, transmitter units 640, egress ports 650, and memory 660. The processor 630 comprises a coding module 670. The coding module 670 implements the disclosed embodiments described above. For instance, the coding module 670 implements, processes, prepares, or provides the various networking functions. The inclusion of the coding module 670 therefore provides a substantial improvement to the functionality of the video coding device 600 and effects a transformation of the video coding device 600 to a different state. Alternatively, the coding module 670 is implemented as instructions stored in the memory 660 and executed by the processor 630.

The video coding device 600 may also include input and/or output (I/O) devices 680 for communicating data to and from a user. The I/O devices 680 may include output devices such as a display for displaying video data, speakers for outputting audio data, etc. The I/O devices 680 may also include input devices, such as a keyboard, mouse, trackball, etc., and/or corresponding interfaces for interacting with such output devices.

The memory 660 comprises one or more disks, tape drives, and solid-state drives and may be used as an overflow data storage device, to store programs when such programs are selected for execution, and to store instructions and data that are read during program execution. The memory 660 may be volatile and/or non-volatile and may be read-only memory (ROM), random access memory (RAM), ternary content-addressable memory (TCAM), and/or static random-access memory (SRAM).

Figure 7:
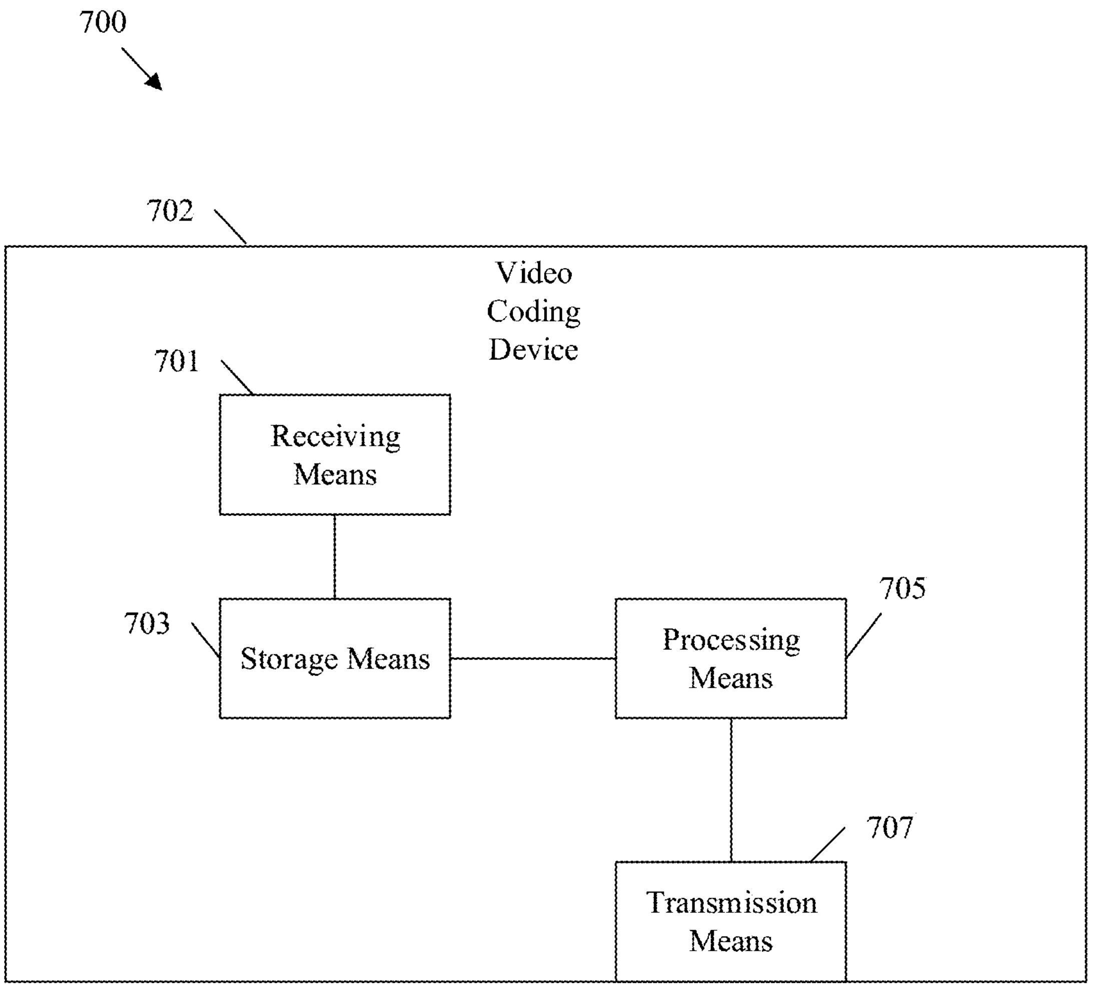
FIG. 7 is a schematic diagram of an embodiment of a means for coding.

FIG. 7 is a schematic diagram of an embodiment of a means for coding 700. In embodiment, the means for coding 700 is implemented in a video coding device 702 (e.g., a video encoder 20 or a video decoder 30). The video coding device 702 includes receiving means 701. The receiving means 701 is configured to receive a picture to encode or to receive a bitstream to decode. The video coding device 702 includes transmission means 707 coupled to the receiving means 701. The transmission means 707 is configured to transmit the bitstream to a decoder or to transmit a decoded image to a display means (e.g., one of the I/O devices 680).

The video coding device 702 includes a storage means 703. The storage means 703 is coupled to at least one of the receiving means 701 or the transmission means 707. The storage means 703 is configured to store instructions. The video coding device 702 also includes processing means 705. The processing means 705 is coupled to the storage means 703. The processing means 705 is configured to execute the instructions stored in the storage means 703 to perform the methods disclosed herein.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of encoding a coded video bitstream implemented by a video encoder, comprising:

encoding a reference picture list structure for a current slice into the coded video bitstream, wherein the reference picture list structure contains a number of entries;

determining a default number of active entries in a reference picture list for the current slice;

determining the reference picture list for the current slice, wherein the reference picture list contains a number of active entries and a number of inactive entries;

setting the number of active entries in the reference picture list equal to the number of entries in the reference picture list structure when the default number of active entries in the reference picture list is greater than the number of entries in the reference picture list structure;

encoding an override flag into the coded video bitstream, wherein the number of active entries in the reference picture list is set equal to the number of entries in the reference picture list structure when a value of the override flag is false; and obtaining a second syntax element from a slice header of the current slice when the value of the override flag is true, wherein an order of entries in the reference picture list structure is the same as an order of corresponding reference pictures in the reference picture list, wherein at least one active entry of the reference picture list is used for inter prediction of at least one reconstructed block, and wherein the inactive entries are not used for inter prediction of a current picture, wherein the reference picture list structure, ref_pic_list_struct (listIdx, rplsIdx), includes two separate indexes, listIdx and rplsIdx, wherein the default number of active entries in the reference picture list is determined based on a first syntax element from a picture parameter set represented in the coded video bitstream, and wherein a value of the first syntax element plus 1 is the default number of active entries in the reference picture list, and wherein the second syntax element plus 1 is the number of active entries in the reference picture list.

2. The method of claim 1, wherein the current slice is a P slice or a B slice.

3. The method of claim 1, wherein the listIdx has a value to specify a reference picture list, and wherein the rplsIdx specifies an index of a reference picture list syntax structure.

4. The method of claim 1, wherein the reference picture list structure, ref_pic_list_struct (listIdx, rplsIdx), is defined as:

| | Descriptor |
|---|---|
| ref_pic_list_struct( listIdx, rplsIdx ) { | |
| num_strp_entries[ listIdx ][ rplsIdx ] | ue(v) |
| for( i = 0; i < NumEntriesInList[ listIdx ][ rplsIdx ]; i++) { | |
| delta_poc_st[ listIdx ][ rplsIdx ][ i ] | se(v) |
| } | |
| } | |

wherein the ref_pic_list_struct (listIdx, rplsIdx) comprises a first parameter listIdx and a second parameter rplsIdx, wherein rplsIdx specifies an index of a reference picture list syntax structure, listIdx has a value to specify a reference picture list; wherein the value of the listIdx equals to 0 or 1, wherein the reference picture list syntax structure is represented in a sequence parameter set (SPS) and specifies a candidate for short-term reference picture list listIdx, and the current picture refers to each picture that 1) has one or more slices containing ref_pic_list_idx[listIdx] equal to an index into the list of the ref_pic_list_struct(listIdx, rplsIdx) syntax structures included in the SPS, and 2) is in a coded video sequence (CVS) that has the SPS as an active SPS, wherein num_strp_entries[listIdx][rplsIdx] specifies the number of short term reference picture (STRP) entries in the ref_pic_list_struct (listIdx, rplsIdx) syntax structure, and wherein delta_poc_st[listIdx][rplsIdx][i] specifies a difference between picture order count values of the current picture and the picture referred to by an i-th entry when the i-th entry is a first STRP entry in ref_pic_list_struct(listIdx, rplsIdx) syntax structure, or delta_poc_st[listIdx][rplsIdx][i] specifies the difference between the picture order count values of the pictures referred to by the i-th entry and by a previous STRP entry in the ref_pic_list_struct (listIdx, rplsIdx) syntax structure when the i-th entry is an STRP entry but not the first STRP entry in the ref_pic_list_struct (listIdx, rplsIdx) syntax structure.

5. An encoding device, comprising:

a memory storing instructions; and one or more processors coupled to the memory, the one or more processors configured to execute the instructions stored in the memory to cause the encoding device to:

encode a reference picture list structure for a current slice into a coded video bitstream, wherein the reference picture list structure contains a number of entries;

determine a default number of active entries in a reference picture list for the current slice;

determine the reference picture list for the current slice, wherein the reference picture list contains a number of active entries and a number of inactive entries;

set the number of active entries in the reference picture list equal to the number of entries in the reference picture list structure when the default number of active entries in the reference picture list is greater than the number of entries in the reference picture list structure;

encode an override flag into the coded video bitstream, wherein the number of active entries in the reference picture list is set equal to the number of entries in the reference picture list structure when a value of the override flag is false;

encode a second syntax element into a slice header of the current slice when the value of the override flag is true, and wherein an order of entries in the reference picture list structure is the same as an order of corresponding reference pictures in the reference picture list, wherein at least one active entry of the reference picture list is used for inter prediction of at least one reconstructed block, and wherein the inactive entries are not used for inter prediction of a current picture, and wherein the reference picture list structure, ref_pic_list_struct (listIdx, rplsIdx), includes two separate indexes, listIdx and rplsIdx, wherein the default number of active entries in the reference picture list is determined based on a first syntax element from a picture parameter set represented in the coded video bitstream, and wherein a value of the first syntax element plus 1 is the default number of active entries in the reference picture list, and wherein the second syntax element plus 1 is the number of active entries in the reference picture list.

6. The encoding device of claim 5, wherein the current slice is a P slice or a B slice.

7. The encoding device of claim 5, wherein the listIdx has a value to specify a reference picture list, and wherein the rplsIdx specifies an index of a reference picture list syntax structure.

8. The encoding device of claim 5, wherein the reference picture list structure, ref_pic_list_struct (listIdx, rplsIdx), is defined as:

| | Descriptor |
|---|---|
| ref_pic_list_struct( listIdx, rplsIdx ) { | |
| num_strp_entries[ listIdx ][ rplsIdx ] | ue(v) |
| for( i = 0; i < NumEntriesInList[ listIdx ][ rplsIdx ]; i++) { | |
| delta_poc_st[ listIdx ][ rplsIdx ][ i ] | se(v) |
| } | |
| } | |

wherein the ref_pic_list_struct (listIdx, rplsIdx) comprises a first parameter listIdx and a second parameter rplsIdx, wherein rplsIdx specifies an index of a reference picture list syntax structure, listIdx has a value to specify a reference picture list; wherein the value of the listIdx equals to 0 or 1, wherein the reference picture list syntax structure is represented in a sequence parameter set (SPS) and specifies a candidate for short-term reference picture list listIdx, and the current picture refers to each picture that 1) has one or more slices containing ref_pic_list_idx[listIdx] equal to an index into the list of the ref_pic_list_struct(listIdx, rplsIdx) syntax structures included in the SPS, and 2) is in a coded video sequence (CVS) that has the SPS as an active SPS, wherein num_strp_entries[listIdx][rplsIdx] specifies the number of short term reference picture (STRP) entries in the ref_pic_list_struct(listIdx, rplsIdx) syntax structure, and wherein delta_poc_st[listIdx][rplsIdx][i] specifies a difference between picture order count values of the current picture and the picture referred to by an i-th entry when the i-th entry is a first STRP entry in ref_pic_list_struct(listIdx, rplsIdx) syntax structure, or delta_poc_st[listIdx][rplsIdx][i] specifies the difference between the picture order count values of the pictures referred to by the i-th entry and by a previous STRP entry in the ref_pic_list_struct(listIdx, rplsIdx) syntax structure when the i-th entry is an STRP entry but not the first STRP entry in the ref_pic_list_struct(listIdx, rplsIdx) syntax structure.

9. A non-transitory computer program product comprising program code for performing a method when executed on a computer or one or more processors, the method comprising:

encoding a reference picture list structure for a current slice into a coded video bitstream, wherein the reference picture list structure contains a number of entries;

determining a default number of active entries in a reference picture list for the current slice;

determining the reference picture list for the current slice, wherein the reference picture list contains a number of active entries and a number of inactive entries;

setting the number of active entries in the reference picture list equal to the number of entries in the reference picture list structure when the default number of active entries in the reference picture list is greater than the number of entries in the reference picture list structure;

encoding an override flag into the coded video bitstream, wherein the number of active entries in the reference picture list is set equal to the number of entries in the reference picture list structure when a value of the override flag is false; and obtaining a second syntax element from a slice header of the current slice when the value of the override flag is true, wherein an order of entries in the reference picture list structure is the same as an order of corresponding reference pictures in the reference picture list, wherein at least one active entry of the reference picture list is used for inter prediction of at least one reconstructed block, and wherein the inactive entries are not used for inter prediction of a current picture, wherein the reference picture list structure, ref_pic_list_struct (listIdx, rplsIdx), includes two separate indexes, listIdx and rplsIdx, wherein the default number of active entries in the reference picture list is determined based on a first syntax element from a picture parameter set represented in the coded video bitstream, and wherein a value of the first syntax element plus 1 is the default number of active entries in the reference picture list, and wherein the second syntax element plus 1 is the number of active entries in the reference picture list.

10. The non-transitory computer program product of claim 9, wherein the current slice is a P slice or a B slice.

11. The non-transitory computer program product of claim 9, wherein the listIdx has a value to specify a reference picture list, and wherein the rplsIdx specifies an index of a reference picture list syntax structure.

12. The non-transitory computer program product of claim 9, wherein the reference picture list structure, ref_pic_list_struct (listIdx, rplsIdx), is defined as:

| | Descriptor |
|---|---|
| ref_pic_list_struct( listIdx, rplsIdx ) { | |
| num_strp_entries[ listIdx ][ rplsIdx ] | ue(v) |
| for( i = 0; i < NumEntriesInList[ listIdx ][ rplsIdx ]; i++) { | |
| delta_poc_st[ listIdx ][ rplsIdx ][ i ] | se(v) |
| } | |
| } | |

wherein the ref_pic_list_struct (listIdx, rplsIdx) comprises a first parameter listIdx and a second parameter rplsIdx, wherein rplsIdx specifies an index of a reference picture list syntax structure, listIdx has a value to specify a reference picture list; wherein the value of the listIdx equals to 0 or 1, wherein the reference picture list syntax structure is represented in a sequence parameter set (SPS) and specifies a candidate for short-term reference picture list listIdx, and the current picture refers to each picture that 1) has one or more slices containing ref_pic_list_idx[listIdx] equal to an index into the list of the ref_pic_list_struct(listIdx, rplsIdx) syntax structures included in the SPS, and 2) is in a coded video sequence (CVS) that has the SPS as an active SPS, wherein num_strp_entries[listIdx][rplsIdx] specifies the number of short term reference picture (STRP) entries in the ref_pic_list_struct(listIdx, rplsIdx) syntax structure, and wherein delta_poc_st[listIdx][rplsIdx][i] specifies a difference between picture order count values of the current picture and the picture referred to by an i-th entry when the i-th entry is a first STRP entry in ref_pic_list_struct(listIdx, rplsIdx) syntax structure, or delta_poc_st[listIdx][rplsIdx][i] specifies the difference between the picture order count values of the pictures referred to by the i-th entry and by a previous STRP entry in the ref_pic_list_struct(listIdx, rplsIdx) syntax structure when the i-th entry is an STRP entry but not the first STRP entry in the ref_pic_list_struct(listIdx, rplsIdx) syntax structure.

* * * * *